US009565080B2

(12) United States Patent
Jain

(10) Patent No.: US 9,565,080 B2
(45) Date of Patent: Feb. 7, 2017

(54) EVALUATING ELECTRONIC NETWORK DEVICES IN VIEW OF COST AND SERVICE LEVEL CONSIDERATIONS

(71) Applicant: Microsoft Corporation, Redmond, WA (US)

(72) Inventor: Navendu Jain, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 374 days.

(21) Appl. No.: 13/861,857

(22) Filed: Apr. 12, 2013

(65) Prior Publication Data
US 2014/0136690 A1 May 15, 2014

Related U.S. Application Data

(63) Continuation-in-part of application No. 13/677,302, filed on Nov. 15, 2012, now Pat. No. 9,325,748.

(51) Int. Cl.
*H04L 12/26* (2006.01)
*H04L 29/06* (2006.01)
(Continued)

(52) U.S. Cl.
CPC ............... *H04L 43/08* (2013.01); *H04L 29/06* (2013.01); *H04L 41/0663* (2013.01);
(Continued)

(58) Field of Classification Search
CPC .... H04L 29/06; H04L 41/5022; H04L 67/322; H04L 67/327
See application file for complete search history.

(56) References Cited

U.S. PATENT DOCUMENTS 4,816,994 A 3/1989 Freiling et al.
5,483,637 A 1/1996 Winokur et al.
(Continued)

FOREIGN PATENT DOCUMENTS

EP 2037625 A1 3/2009
WO 97/24839 A2 7/1997
(Continued)

OTHER PUBLICATIONS

Notice of Allowance Mailed May 29, 2015 from U.S. Appl. No. 13/535,366, 9 pages.
(Continued)

*Primary Examiner* — Chirag R Patel
(74) *Attorney, Agent, or Firm* — Nicholas Chen; Kate Drakos; Micky Minhas

(57) ABSTRACT

The described implementations relate to processing of electronic data. One implementation is manifest as one or more computer-readable storage devices comprising instructions which, when executed by one or more processing devices, cause the one or more processing devices to perform acts. The acts can include determining service levels provided by multiple network configurations, determining costs associated with the multiple network configurations, and evaluating the multiple network configurations based on both the costs and the service levels. The multiple network configurations can include redundantly-deployed devices. Furthermore, some implementations may determine cost/service level metrics that can be used to compare devices based on expected costs to provide a particular service level.

20 Claims, 19 Drawing Sheets

(51) Int. Cl.
*H04L 29/08* (2006.01)
*H04L 12/24* (2006.01)

(52) U.S. Cl.
CPC ........ *H04L 41/0826* (2013.01); *H04L 41/145* (2013.01); *H04L 41/5016* (2013.01); *H04L 41/5019* (2013.01); *H04L 41/5022* (2013.01); *H04L 67/322* (2013.01); *H04L 67/327* (2013.01); *H04L 41/064* (2013.01); *H04L 41/069* (2013.01); *H04L 41/0622* (2013.01); *H04L 41/0668* (2013.01); *H04L 41/0686* (2013.01); *H04L 41/0893* (2013.01); *H04L 41/22* (2013.01); *H04L 41/5074* (2013.01)

(56) References Cited

U.S. PATENT DOCUMENTS

| | | | |
|---|---|---|---|
| 6,118,936 | A | 9/2000 | Lauer et al. |
| 6,131,112 | A | 10/2000 | Lewis et al. |
| 6,249,755 | B1 | 6/2001 | Yemini et al. |
| 6,353,902 | B1 | 3/2002 | Kulatunge et al. |
| 6,742,141 | B1 | 5/2004 | Miller |
| 6,785,226 | B1 | 8/2004 | Oltman et al. |
| 6,820,221 | B2 | 11/2004 | Fleming |
| 6,829,734 | B1 | 12/2004 | Kreulen et al. |
| 7,010,593 | B2 | 3/2006 | Raymond |
| 7,039,827 | B2 | 5/2006 | Meyer et al. |
| 7,047,291 | B2 | 5/2006 | Breese et al. |
| 7,085,697 | B1 | 8/2006 | Rappaport et al. |
| 7,159,031 | B1* | 1/2007 | Larkin .............. H04L 41/18 370/355 |
| 7,209,923 | B1 | 4/2007 | Cooper |
| 7,228,453 | B2 | 6/2007 | O'Brien et al. |
| 7,246,159 | B2 | 7/2007 | Aggarwal et al. |
| 7,278,055 | B2* | 10/2007 | Talaugon ........... G06F 11/2028 714/21 |
| 7,313,736 | B2 | 12/2007 | Scrandis et al. |
| 7,315,887 | B1 | 1/2008 | Liang et al. |
| 7,451,210 | B2 | 11/2008 | Gupta et al. |
| 7,539,907 | B1 | 5/2009 | Johnsen et al. |
| 7,565,661 | B2 | 7/2009 | Sim-Tang |
| 7,580,956 | B1 | 8/2009 | Xin et al. |
| 7,596,083 | B2 | 9/2009 | Klos et al. |
| 7,813,298 | B2 | 10/2010 | Lidstrom et al. |
| 7,853,544 | B2 | 12/2010 | Scott et al. |
| 7,965,620 | B2 | 6/2011 | Gadgil et al. |
| 7,995,485 | B1 | 8/2011 | Anderson et al. |
| 8,032,489 | B2 | 10/2011 | Villella et al. |
| 8,046,637 | B2 | 10/2011 | Gross et al. |
| 8,107,363 | B1 | 1/2012 | Saluja |
| 8,112,667 | B2 | 2/2012 | Belluomini et al. |
| 8,135,995 | B2 | 3/2012 | Ngai et al. |
| 8,161,325 | B2 | 4/2012 | Calman et al. |
| 8,169,921 | B2 | 5/2012 | Yang et al. |
| 8,181,071 | B2 | 5/2012 | Cahill et al. |
| 8,195,692 | B2 | 6/2012 | Baek et al. |
| 8,260,893 | B1 | 9/2012 | Bandhole et al. |
| 8,429,449 | B2* | 4/2013 | Biran ............ G06F 11/008 714/10 |
| 8,738,968 | B2 | 5/2014 | Kanso et al. |
| 8,831,202 | B1 | 9/2014 | Abidogun et al. |
| 8,838,599 | B2 | 9/2014 | Xu et al. |
| 8,862,948 | B1 | 10/2014 | Lam |
| 8,892,550 | B2 | 11/2014 | Chu-Carroll et al. |
| 8,892,960 | B2 | 11/2014 | Sambamurthy et al. |
| 8,996,539 | B2 | 3/2015 | Agrawal et al. |
| 9,065,730 | B2 | 6/2015 | Craig et al. |
| 9,160,686 | B2* | 10/2015 | Boduch .............. H04L 49/1523 |
| 9,183,194 | B2 | 11/2015 | Verma et al. |
| 9,201,955 | B1 | 12/2015 | Quintao et al. |
| 2002/0124214 | A1 | 9/2002 | Ahrens et al. |
| 2002/0156817 | A1 | 10/2002 | Lemus |
| 2002/0161873 | A1 | 10/2002 | McGuire |
| 2002/0174384 | A1 | 11/2002 | Graichen et al. |
| 2003/0014462 | A1 | 1/2003 | Bennett et al. |
| 2003/0023719 | A1 | 1/2003 | Castelli et al. |
| 2003/0034995 | A1 | 2/2003 | Osborn et al. |
| 2003/0046615 | A1 | 3/2003 | Stone |
| 2003/0093481 | A1 | 5/2003 | Mitchell et al. |
| 2003/0110408 | A1 | 6/2003 | Wells et al. |
| 2003/0123446 | A1 | 7/2003 | Muirhead et al. |
| 2003/0172046 | A1 | 9/2003 | Scott |
| 2004/0088386 | A1 | 5/2004 | Aggarwas |
| 2004/0225952 | A1 | 11/2004 | Brown et al. |
| 2005/0138170 | A1 | 6/2005 | Cherkasova et al. |
| 2005/0138486 | A1 | 6/2005 | Gromyko |
| 2005/0154690 | A1 | 7/2005 | Nitta et al. |
| 2005/0171948 | A1 | 8/2005 | Knight |
| 2005/0181835 | A1 | 8/2005 | Lau et al. |
| 2005/0188240 | A1 | 8/2005 | Murphy et al. |
| 2005/0222811 | A1 | 10/2005 | Jakobson et al. |
| 2005/0276217 | A1 | 12/2005 | Gadgil et al. |
| 2006/0179432 | A1 | 8/2006 | Walinga et al. |
| 2006/0218267 | A1 | 9/2006 | Khan et al. |
| 2007/0028139 | A1 | 2/2007 | Wahl et al. |
| 2007/0192406 | A1* | 8/2007 | Frietsch et al. ............ 709/203 |
| 2008/0016412 | A1 | 1/2008 | White et al. |
| 2008/0049760 | A1* | 2/2008 | Bergeron ........... H04L 12/5695 370/395.21 |
| 2008/0077682 | A1* | 3/2008 | Nair et al. ................... 709/223 |
| 2008/0291822 | A1 | 11/2008 | Farkas et al. |
| 2008/0320482 | A1* | 12/2008 | Dawson ............... G06F 9/5027 718/104 |
| 2009/0055684 | A1 | 2/2009 | Jamjoom et al. |
| 2009/0063387 | A1 | 3/2009 | Beaty et al. |
| 2009/0138306 | A1 | 5/2009 | Coburn et al. |
| 2009/0183030 | A1 | 7/2009 | Bethke et al. |
| 2009/0262650 | A1 | 10/2009 | Shaikh et al. |
| 2010/0034080 | A1 | 2/2010 | Charzinski et al. |
| 2010/0049590 | A1 | 2/2010 | Anshul |
| 2010/0100775 | A1 | 4/2010 | Slutsman et al. |
| 2010/0124165 | A1 | 5/2010 | Yang et al. |
| 2010/0125745 | A1 | 5/2010 | Kogan et al. |
| 2010/0131952 | A1 | 5/2010 | Akiyama et al. |
| 2010/0138688 | A1* | 6/2010 | Sykes ................... H04L 41/147 714/4.1 |
| 2010/0189113 | A1 | 7/2010 | Csaszar et al. |
| 2010/0218104 | A1 | 8/2010 | Lewis |
| 2010/0287403 | A1 | 11/2010 | Jenkins et al. |
| 2010/0302940 | A1 | 12/2010 | Patel et al. |
| 2010/0313070 | A1 | 12/2010 | Joshi et al. |
| 2010/0332911 | A1 | 12/2010 | Ramananda et al. |
| 2011/0087522 | A1 | 4/2011 | Beaty et al. |
| 2011/0119381 | A1* | 5/2011 | Glover ................ G06F 9/5072 709/226 |
| 2011/0153539 | A1 | 6/2011 | Rojahn |
| 2011/0191623 | A1 | 8/2011 | Dennert |
| 2011/0239050 | A1 | 9/2011 | Malisetti et al. |
| 2011/0276836 | A1 | 11/2011 | Kahana et al. |
| 2011/0289076 | A1 | 11/2011 | Boyle et al. |
| 2011/0313962 | A1 | 12/2011 | Jones et al. |
| 2012/0185582 | A1 | 7/2012 | Graessley |
| 2012/0185735 | A1 | 7/2012 | Sambamurthy et al. |
| 2012/0213081 | A1 | 8/2012 | Imai |
| 2012/0213227 | A1 | 8/2012 | Jaeger |
| 2012/0218104 | A1 | 8/2012 | Lai |
| 2012/0239975 | A1 | 9/2012 | Bodke et al. |
| 2012/0245924 | A1 | 9/2012 | Brun |
| 2012/0254395 | A1 | 10/2012 | Bonas |
| 2012/0263044 | A1 | 10/2012 | Akahane et al. |
| 2012/0290715 | A1 | 11/2012 | Dinger et al. |
| 2013/0097304 | A1 | 4/2013 | Asthana et al. |
| 2013/0138419 | A1 | 5/2013 | Lopez et al. |
| 2013/0204808 | A1 | 8/2013 | Jiang et al. |
| 2013/0226525 | A1 | 8/2013 | Marwah et al. |
| 2013/0227115 | A1 | 8/2013 | Hobbs et al. |
| 2013/0232382 | A1 | 9/2013 | Jain et al. |
| 2013/0286852 | A1 | 10/2013 | Bowler et al. |
| 2013/0290783 | A1 | 10/2013 | Bowler et al. |
| 2013/0291034 | A1 | 10/2013 | Basile et al. |
| 2013/0332145 | A1 | 12/2013 | Bostick et al. |
| 2013/0332399 | A1 | 12/2013 | Reddy et al. |
| 2014/0006861 | A1 | 1/2014 | Jain et al. |
| 2014/0006862 | A1 | 1/2014 | Jain et al. |

(56) References Cited

U.S. PATENT DOCUMENTS

| | | |
|---|---|---|
| 2014/0047271 A1 | 2/2014 | Gray et al. |
| 2014/0136684 A1 | 5/2014 | Jain et al. |
| 2014/0325019 A1 | 10/2014 | Austin et al. |
| 2014/0379895 A1 | 12/2014 | Jain |
| 2015/0006519 A1 | 1/2015 | Jain et al. |
| 2015/0032500 A1 | 1/2015 | Cope et al. |
| 2015/0221109 A1 | 8/2015 | Klein et al. |
| 2015/0271192 A1 | 9/2015 | Crowley |
| 2015/0302094 A1 | 10/2015 | Bobick et al. |
| 2015/0317301 A1 | 11/2015 | Liang et al. |

FOREIGN PATENT DOCUMENTS

| | | |
|---|---|---|
| WO | 9847265 A1 | 10/1998 |
| WO | 2014/078592 A2 | 5/2014 |
| WO | 2014/078668 A2 | 5/2014 |

OTHER PUBLICATIONS

Ahonen et al., "Applying Data Mining Techniques for Descriptive Phrase Extraction in Digital Document Collections," 1998, IEEE, Proceedings of ADL '98, Apr. 22-24, pp. 1-10.

Non-Final Office Action Mailed Feb. 4, 2015 from U.S. Appl. No. 13/677,302, 17 pages.

Response Filed May 4, 2015 to Non-Final Office Action Mailed Feb. 4, 2015 from U.S. Appl. No. 13/677,302, 13 pages.

Response Filed Apr. 30, 2015 to Final Office Action mailed Feb. 12, 2015 from U.S. Appl. No. 13/535,366, 13 pages.

Final Office Action mailed Feb. 12, 2015 from U.S. Appl. No. 13/535,366, 13 pages.

Response Filed Dec. 1, 2014 to Non-Final Office Action mailed Sep. 24, 2014 from U.S. Appl. No. 13/535,366, 13 pages.

Non-Final Office Action mailed Sep. 24, 2014 from U.S. Appl. No. 13/535,366, 16 pages.

Wundsam et al., "OFRewind: Enabling Record and Replay Troubleshooting for Networks", Retrieved at <<http://www.usenix.org/event/atc11/tech/final_files/Wundsam.pdf>>, USENIXATC'11 Proceedings of the 2011 USENIX conference on USENIX annual technical conference, 2011, pp. 1-14.

"A Practitioner's Guide to More Efficient Network Management", Retrieved at <<http://h10124.www1.hp.com/campaigns/us/en/software/images/Practitioners_Guide.pdf>>, Retrieved Date: Feb. 8, 2012, 8 Pages.

"Enterprise Network and Data Security Spending Shows Remarkable Resilience", Retrieved at <<http://www.abiresearch.com/press/3591-Enterprise+Network+and+Data+Security+Spending+Shows+Remarkable+Resilience>>, Jan. 2011, 5 Pages.

Allman, Mark., "On the Performance of Middleboxes", Retrieved at <<http://citeseerx.ist.psu.edu/viewdoc/download?doi=10.1.1.77.9560&rep=rep1&type=pdf>>, In Proceedings of Sigcomm IMC. ACM, 2003, 6 Pages.

Biggadike et al., "Natblaster: Establishing TCP Connections between Hosts Behind NATs", Retrieved at <<http://sparrow.ece.cmu.edu/~adrian/projects/natblaster.pdf>>, In ACM Sigcomm Workshop, 2005, pp. 10.

Carpenter, B., "Middleboxes: Taxonomy and Issues", Retrieved at <<http://tools.ietf.org/pdf/rfc3234.pdf>>, Feb. 2002, pp. 1-27.

Casado et al., "Ethane: Taking Control of the Enterprise", Retrieved at <<http://yuba.stanford.edu/~casado/ethane-sigcomm07.pdf>>, ACM Sigcomm CCR, 2007, 12 Pages.

Case et al., "A Simple Network Management Protocol", Retrieved at <<http://www.ietf.org/rfc/rfc1157.txt>>, May 1990, 34 Pages.

Eppinger, Jeffrey., "TCP Connections for P2P Apps: A Software Approach to Solving the NAT Problem", Retrieved at <<http://reports-archive.adm.cs.cmu.edu/anon/isri2005/CMU-ISRI-05-104.pdf>>, CMU-ISRI-05-104, Jan. 2005, pp. 1-8.

Gill et al., "Understanding Network Failures in Data Centers: Measurement, Analysis, and Implications", Retrieved at <<http://www.cs.uccs.edu/~zbo/teaching/CS522/Projects/SIGCOMM11-DCFailure.pdf>>, In Proceedings of Sigcomm, 2011, pp. 350-361.

Greenberg et al., "VI2: A Scalable and Flexible Data Center Network", Retrieved at <<http://www.cs.cmu.edu/afs/.cs.cmu.edu/Web/People/prs/15-744-F11/papers/vl2.pdf>>, ACM Sigcomm CCR, 2009, 12 Pages.

Greenberg, et al., "A Clean Slate 4D Approach to Network Control and Management", Retrieved at <<http://www.cs.cmu.edu/~4d/papers/greenberg-ccr05.pdf>>, ACM Sigcomm CCR, 2005, 12 Pages.

Guo et al., "BCube: A High Performance, Server-Centric Network Architecture for Modular Data Centers", Retrieved at <<http://research.microsoft.com/pubs/81063/comm136-guo.pdf>>, In ACM Sigcomm CCR, 2009, 12 Pages.

Hancock et al., "Next Steps in Signaling (NSIS): Framework", Retrieved at <<http://cabernet.tools.ietf.org/pdf/rfc4080.pdf>>, Jun. 2005, pp. 1-49.

Johnson, D., "NOC Internal Integrated Trouble Ticket System", Retrieved at <<http://tools.ietf.org/pdf/rfc1297.pdf>>, Jan. 1992, pp. 1-12.

Joseph et al., "A Policy-aware Switching Layer for Data Centers", Retrieved at <<http://ccr.sigcomm.org/drupal/files/p51-josephA.pdf>>, In ACM Sigcomm CCR, 2008, pp. 51-62.

Kalchschmidt et al., "Inventory Management in a Multi-Echelon Spare Parts Supply Chain", Retrieved at <<http://read.pudn.com/downloads142/sourcecode/others/617477/inventory%20supply%20chain/04051312322413213(1).pdf>>, Journal of Production Economics, 2003, pp. 397-413.

Kandula et al., "Detailed Diagnosis in Enterprise Networks", Retrieved at <<http://ccr.sigcomm.org/online/files/p243.pdf>>, In ACM Sigcomm CCR, 2009, pp. 243-254.

Labovitz et al., "Experimental Study of Internet Stability and Backbone Failures", Retrieved at <<http://ieeexplore.ieee.org/stamp/stamp.jsp?tp=&arnumber=781062>>, In Fault-Tolerant Computing, IEEE, 1999, pp. 1-8.

Lockwood, John W., "An Open Platform for Development of Network Processing Modules in Reprogrammable Hardware", Retrieved at <<http://algo-logic.com/~jwlockwd/publications/designcon2001_fpx_platform.pdf>>, IEC DesignConaA 'Z01, 2001, pp. 1-10.

Markopoulou et al., "Characterization of Failures in an IP Backbone", Retrieved at <<http://ieeexplore.ieee.org/stamp/stamp.jsp?tp=&arnumber=4456903>>, IEEE/ACM Transactions on Networking, vol. 16, No. 4, Aug. 2008, pp. 749-762.

McCloghrie et al., "Management Information Base for Network Management of TCP/IP-based Internets", Retrieved at <<http://www.ietf.org/rfc/rfc1213.txt>>, Mar. 1991, 66 Pages.

Mudigonda et al., "NetLord: A Scalable Multi-Tenant Network Architecture for Virtualized Datacenters", Retrieved at <<http://www.hpl.hp.com/personal/Praveen_Yalagandula/papers/SIGCOMM2011-NetLord.pdf>>, In Proceedings of ACM Sigcomm, 2011, 12 Pages.

Mysore et al., "PortLand: A Scalable Fault-Tolerant Layer 2 Data Center Network Fabric", Retrieved at <<http://cseweb.ucsd.edu/~vahdat/papers/portland-sigcomm09.pdf>>, In Proceedings of Sigcomm CCR, ACM, 2009, 12 Pages.

Padmanabhan et al., "A Study of End-to-End Web Access Failures", Retrieved at <<http://citeseerx.ist.psu.edu/viewdoc/download?doi=10.1.1.71.4884&rep=rep1&type=pdf>>, In CoNext. ACM, 2006, 13 Pages.

Sekar et al., "The Middlebox Manifesto: Enabling Innovation in Middlebox Deployment", Retrieved at <<http://www.cs.unc.edu/~reiter/papers/2011/HotNets.pdf>>, In Proceedings HotNets, 2011, pp. 1-6.

Shaikh et al., "A Case Study of OSPF Behavior in a Large Enterprise Network", Retrieved at <<http://citeseerx.ist.psu.edu/viewdoc/download?doi=10.1.1.88.8850&rep=rep1&type=pdf, In ACM Sigcomm WIM, 2002, 14 Pages.

Srisuresh et al., "Middlebox Communication Architecture and Framework", Retrieved at <<http://www.ietf.org/rfc/rfc3303.txt>>, Aug. 2002, 32 Pages.

(56) References Cited

OTHER PUBLICATIONS

Stiemerling et al., "Middlebox Communication (MIDCOM) Protocol Semantics", Retrieved at <<http://citeseerx.ist.psu.edu/viewdoc/download?doi=10.1.1.182.7835&rep=rep1&type=pdf>>, Mar. 2008, pp. 1-70.
Swale et al., "Middlebox Communications Protocol Requirements", Retrieved at <<http://www.ietf.org/rfc/rfc3304.txt>>, Aug. 2002, pp. 1-9.
Turner et al., "California Fault Lines: Understanding the Causes and Impact of Network Failures", Retrieved at <<http://cseweb.ucsd.edu/~snoeren/papers/cenic-sigcomm10.pdf>>, In ACM Sigcomm CCR, 2010, 12 Pages.
Walfish et al., "Middleboxes No Longer Considered Harmful", Retrieved at <<http://www.usenix.org/event/osdi04/tech/full_papers/walfish/walfish.pdf>>, In Proceedings of SOSDI. USENIX Association, 2004, pp. 215-230.
Watson et al., "Experiences with Monitoring OSPF on a Regional Service Provider Network", Retrieved at <<http://www.eecs.umich.edu/techreports/cse/03/CSE-TR-477-03.pdf>>, In ICDCS. IEEE, 2003,12 Pages.
Harris, Chandler., "Data Center Outages Generate Big Losses", Retrieved at <<http://www.informationweek.com/news/hardware/data_centers/229500121>>, May 12, 2011, 9 Pages.
Abu-Libdeh et al., "Symbiotic routing in future data centers", Retrieved at <<http://research.microsoft.com/en-us/um/people/antr/publications/sigcomm10-camcube.pdf>>, Proceedings of SIGCOMM, 2010, Aug. 30-Sep. 3, 2010, 12 Pages.
Al-Fares et al., "A scalable, commodity data center network architecture", Retrieved at <<http://ccr.sigcomm.org/online/files/p63-alfares.pdf>>, Proceedings of SIGCOMM, 2008, Aug. 17-22, 2008, pp. 63-74.
Alizadeh et al., "Data Center TCP (DCTCP)". Retrieved at <<http://ccr.sigcomm.org/online/files/p63_0.pdf>>, Proceedings of SIGCOMM, 2010, Aug. 30-Sep. 3, 2010, pp. 63-74.
Bakkaloglu M. et al.; "On Correlated Failures in Survivable Storage Systems"; Technical Report CMU-CS-02-129; Carnegie Mellon University; Pittsburgh PA; May 2002; 37 pages.
Bansal N. et al.; "Towards Optimal Resource Allocation in Partial-Fault Tolerant Applications"; Infocom; 2008; 10 pages.
Benson et al., "Network traffic characteristics of data centers in the wild", Retrieved at <<http://conferences.sigcomm.org/imc/2010/papers/p267.pdf>>, Proceedings of IMC, 2010, Nov. 1-3, 2010, pp. 267-280.
Benson et al., "A first look at problems in the cloud", Retrieved at <<http://www.usenix.org/events/hotcloud10/tech/full_papers/Benson.pdf>>, Proceedings of Hot Cloud, 2010, pp. 1-7.
"Second Written Opinion from the International Preliminary Examining Authority" from PCT/US2013/070327, Mailed Oct. 29, 2014, 11 pages.
Potharaju et al., "Demystifying the Dark Side of the Middle: A Field Study of Middlebox Failures in Datacenters", IMC '13, Oct. 23-25, 2013, Barcelona, Span. ACM 2013, 14 Pages.
Sherry et al., "Making Middleboxes Someone Else's Problem: Network Processing as a Cloud Service," in SIGCOMM, Sep. 24, 2012, 12 Pages.
"Why Gmail went down: Google misconfigured load balancing servers," Online Retrieved From Why Gmail went down: Google misconfigured load balancing servers (Updated). Dec. 11, 2012, 4 Pages.
Sekar et al., "Design and Implementation of a Consolidated Middlebox Architecture," NSDI, Apr. 25-27, 2012, 14 Pages.
Dixon et al., "ETTM: A Scalable Fault Tolerant NetworkManager," NSDI, Mar. 30-Apr. 1, 2011, 14 Pages.
Greenhalg et al., "Flow Processing and the Rise of Commodity Network Hardware," ACM SIGCOMM Computer Communication Review, vol. 39, No. 2, Apr. 2009, 7 Pages.
Liu et al., "F10: Fault-Tolerant Engineered Networks," USENIX Association 10th USENIX Symposium on Networked Systems Design and Implementation, NSDI, Apr. 3-5, 2013, 14 Pages.

Wang et al., "An Untold Story of Middleboxes in Cellular Networks," SIGCOMM'11, Aug. 15-19, 2011, Toronto, Ontario, Canada, 13 Pages.
Mann et al., "On a Test of Whether One of Two Random Variables is Stochastically Larger than the Other," in The Annals of Mathematical Statistics, vol. 18, No. 1, Mar. 1947, 11 Pages.
Potharaju et al., "Juggling the Jigsaw: Towards Automated Problem Inference from Network Trouble Tickets," in 10th USENIX Symposium on Networked Systems Design and Implementation, NSDI, Apr. 3-5, 2013, 15 Pages.
Brown, C. E., "Coefficient of Variation," in Applied Multivariate Statistics in Geohydrology and Related Sciences 1998, pp. 155-157.
Mahimkar et al., "dFence: Transparent network-based denial of service mitigation," 4th USENIX Symposium on Networked Systems Design & Implementation, Apr. 11-13, 2007, 25 Pages.
Sakia, R., "The Box-Cox Transformation Technique: A Review," in The Statistician, Journal of the Royal Statistical Society, Series D, vol. 41, No. 2, 1992, 10 Pages.
Bailey et al., "Fitting a Mixture Model by Expectation Maximization to Discover Motifs in Bipolymers," in ISMB, Aug. 1994, 33 Pages.
Lilliefors, H. W., "On the Kolmogorov-Smirnov Test for Normality with Mean and Variance Unknown," JASA, vol. 62, No. 318, Jun. 1967, 5 Pages.
Argyraki et al., "Can Software Routers Scale?" in PRESTO'08, Aug. 22, 2008, Seattle, Washington, USA, 6 Pages.
Nedevschi et al., "Reducing Network Energy Consumption via Sleeping and Rate-adaptation," NSDI '08: 5th USENIX Symposium on Networked Systems Design USENIX Association and Implementation, Aug. 11, 2008, 14 Pages.
Kazemian et al., "Header space analysis: Static checking for networks," NSDI, Apr. 25, 2012, 14 Pages.
Handigol et al., "Where is the debugger for my software-defined network?", Proceedings of the first workshop on Hot topics in software defined networks. HotSDN'12, Aug. 13, 2012, Helsinki, Finland, 6 Pages.
Mai et al., "Debugging the Data Plane with Anteater," SIGCOMM'11, Aug. 15-19, 2011, Toronto, Ontario, Canada, 12 Pages.
Feamster et al., "Detecting BGP configuration Faults with Static Analysis," 2nd Symp. on Networked Systems Design and Implementation (NSDI), Boston, MA, May 2005, 14 Pages.
Feldmann et al., "IP network Configuration for Intra-domain Traffic Engineering," Network, IEEE, Sep./Oct. 2001, 27 Pages.
Behnel, S. et al.; "Cython: C-Extensions for Python"; retrieved at http://cython.org; published 2008; accessed Oct. 31, 2012, 3 pages.
Ellram, L., "Total Cost of Ownership: An Analysis Approach for Purchasing," Journal of PDLM, 1995,12 Pages.
Leland et al., "On the Self-Similar Nature of Ethernet Traffic (extended version)," IEEE ToN, Feb. 1994, 15 Pages.
Moon, T. K., "The Expectation-Maximization Algorithm," IEEE Signal Processing Magazine, Nov. 1996, 14 Pages.
Bendel et al., "Comparison of Skewness Coefficient, Coefficient of Variation, and GiniCoefficient as Inequality Measures within Populations," Oecologia, vol. 78, Issue 3, Mar. 1989, 7 Pages.
"2011 ADC Security Survey Global Findings," http://www.slideshare.net/f5dotcom/2011-f5-adc-security-survey-global-slideshare. Nov. 4, 2011, 10 Pages.
Scharf et al., "MP-TCP Application Interface Considerations," Nov. 29, 2010, 26 Pages.
"Cisco Data Center Network Architecture," http://www.cisco.com/c/dam/en/us/solutions/collateral/data-center-virtualization/net_brochure0900aecd80404988.pdf, 2006, 2 Pages.
Law et al., "An Integrated Case-Based Reasoning Approach for Intelligent Help Desk Fault Management", 1997, Expert Systems with Applications, vol. 13, No. 4, pp. 265-274.
Spasic et al., "Text Mining and Ontologies in Biomedicine: Making Sense of Raw Text", Sep. 2005, Briefings in Bioinformatics, vol. 6, No. 3, pp. 239-251.
Manning et al., "Introduction to Information Retrieval", Retrieved at <<http://www.math.unipd.it/~aiolli/corsi/0910/IR/irbookprint.pdf>>, In Book of Introduction to Information Retrieval, May 27, 2008, 504 Pages.

(56) References Cited

OTHER PUBLICATIONS

Marcus et al., "Building a Large Annotated Corpus of English: The Penn Treebank", Retrieved at <<http://delivery.acm.org/10.1145/980000/972475/p313-marcus.pdf>>, Journal of Computational Linguistics—Special Issue on Using Large Corpora, vol. 19, Issue 2, Jun. 1993, 18 Pages.

McCallum et al., "Early Results for Named Entity Recognition with Conditional Random Fields, Feature Induction and Web-Enhanced Lexicons", Retrieved at <<http://people.cs.umass.edu/~mccallum/papers/mccallum-conll2003.pdf>>, Proceedings of the Seventh Conference on Natural language learning at HLT-NAACL, vol. 4, May 31, 2003, 4 Pages.

Medem et al., "TroubleMiner: Mining Network Trouble Tickets", Retrieved at <<http://ieeexplore.ieee.org/stamp/stamp.jsp?tp=&arnumber=5195946>>, IFIP/IEEE International Symposium on Integrated Network Management-Workshops, Jun. 1, 2009, 7 Pages.

Melchiors et al., "Troubleshooting Network Faults Using Past Experience", Retrieved at <<http://ieeexplore.ieee.org/stamp/stamp.jsp?arnumber=00830413>>, IEEE/IFIP Network Operations and Management Symposium, Apr. 10, 2000, 14 Pages.

"SQL Server", Retrieved at <<http://www.microsoft.com/sqlserver/en/us/default.aspx>>, Aug. 8, 2012, 12 Pages.

Huang et al., "Diagnosing Network Disruptions with Network-Wide Analysis", Retrieved at <<http://www.cc.gatech.edu/~jx/reprints/metrics160.pdf>>, Proceedings of the ACM SIGMETRICS International Conference on Measurement and Modeling of Computer Systems, Jun. 12, 2007, 12 Pages.

Kandula et al., "What's Going on? Learning Communication Rules in Edge Networks", Retrieved at <<http://citeseerx.ist.psu.edu/viewdoc/download?doi=10.1.1.145.3918&rep=rep1&type=pdf>>, Proceedings of the ACM SIGCOMM Conference on Data Communication, Aug. 17, 2008, 12 Pages.

Loper et al., "NLTK: The Natural Language Toolkit", Retrieved at <<http://arxiv.org/pdf/cs/0205028v1.pdf>>, Proceedings of the Workshop on Effective Tools and Methodologies for Teaching Natural Language Processing and Computational Linguistics, May 17, 2002, 8 Pages.

Manber et al., "Suffix arrays: A New Method for on-Line String Searches", Retrieved at <<http://webglimpse.net/pubs/suffix.pdf>>, Proceedings of the First Annual ACM-SIAM Symposium on Discrete Algorithms, Jan. 22, 1990, 16 Pages.

Mitra et al., "Automatic Text Summarization by Paragraph Extraction", Retrieved at <<http://www.aclweb.org/anthology-new/W/W97/W97-0707.pdf>>, Proceedings of the Workshop on Intelligent Scalable Summarization at the ACL/EACL Conference, Jul. 7, 1997, 8 Pages.

Nagao et al., "A New Method of N-Gram Statistics for Large Number of N and Automatic Extraction of Words and Phrases from Large Text Data of Japanese", Retrieved at <<http://delivery.acm.org/10.1145/1000000/991994/p611-nagao.pdf>>, COLING '94 Proceedings of the 15th Conference on Computational linguistics, vol. 1, Aug. 5, 1994, 5 Pages.

Noy et al., "Ontology Development 101: A Guide to Creating Your First Ontology.", Retrieved at <<http://protege.stanford.edu/publications/ontology_development/ontology101.pdf>>, In Technical Report of Stanford Knowledge Systems Laboratory and Stanford Medical Informatics, Mar. 2001, 25 Pages.

Paolacci et al., "Running Experiments on Amazon Mechanical Turk", Retrieved at <<http://repub.eur.nl/res/pub/31983/jdm10630a[1].pdf>>, In Judgment and Decision Making, vol. 5, No. 5, Aug. 2010, 9 Pages.

Qiu et al., "What Happened in My Network? Mining Network Events from Router Syslogs", Retrieved at <<http://conferences.sigcomm.org/imc/2010/papers/p472.pdf>>, In Proceedings of the 10th ACM SIGCOMM Conference on Internet Measurement, Nov. 1, 2010, 13 Pages.

Raghavendra et al., "No Power Struggles: Coordinated Multi-level Power Management for the Data Center", Retrieved at <<http://www.cs.pitt.edu/~kirk/cs3150spring2010/2008_asplos_nopowerstruggles.pdf>>, In ACM SIGOPS Operating Systems Review, vol. 42, Issue 2, Mar. 1, 2008, 12 Pages.

Seemakurty et al., "Word Sense Disambiguation via Human Computation", Retrieved at <<http://www.cs.cmu.edu/~tomasic/doc/2010/SeemakurtyEtAIHCOMP2010.pdf>>, In Proceedings of the ACM SIGKDD Workshop on Human Computation, Jul. 25, 2010, 4 Pages.

Roughan et al., "IP Forwarding Anomalies and Improving their Detection Using Multiple Data Sources", Retrieved at <<http://citeseerx.ist.psu.edu/viewdoc/download?doi=10.1.1.1.5316&rep=rep1&type=pdf>>, In Proceedings of the ACM SIGCOMM Workshop on Network Troubleshooting, Aug. 30, 2004, 6 Pages.

Sorokin et al., "Utility Data Annotation with Amazon Mechanical Turk", Retrieved at <<http://ieeexplore.ieee.org/stamp/stamp.jsp?tp=&arnumber=4562953>>, In IEEE Computer Society Conference on Computer Vision and Pattern Recognition Workshops, Jun. 23, 2008, 8 Pages.

Toutanova et al., "Enriching the Knowledge Sources Used in a Maximum Entropy Part-of-Speech Tagger", Retrieved at <<http://nlp.stanford.edu/~manning/papers/emnlp2000.pdf>>, Proceedings of the Joint SIGDAT Conference on Empirical Methods in Natural Language Processing and Very Large Corpora, Oct. 7, 2000, 8 Pages.

Ukkonen, "On-Line Construction of Suffix Trees", Retrieved at <<http://www.cs.helsinki.fi/u/ukkonen/SuffixT1withFigs.pdf>>, In Journal of Algorithmica, Sep. 1995, 18 Pages.

Von Ahn, "Games with a Purpose", Retrieved at <<http://www.cs.cmu.edu/~biglou/ieee-gwap.pdf>>, In Computer, Volume, Jun. 2006, 3 Pages.

Von Ahn et al., "Labeling Images With a Computer Game", Retrieved at <<http://www.cs.cmu.edu/~biglou/ESP.pdf>>, In Proceedings of the SIGCHI Conference on Human Factors in Computing Systems, Apr. 24, 2004, 8 Pages.

Welch, "A Technique for High-Performance Data Compression", Retrieved at <<http://ieeexplore.ieee.org/stamp/stamp.jsp?tp=&arnumber=1659158>>, In Computer, vol. 17, Issue 6, Jun. 1984, 12 Pages.

Wu et al., "Open Information Extraction Using Wikipedia", Retrieved at <<http://www.cs.washington.edu/homes/weld/papers/wu-acl10.pdf>>, In Proceedings of the 48th Annual Meeting of the Association for Computational Linguistics, Jul. 11, 2010, 10 Pages.

Yamamoto et al., "Using Suffix Arrays to Compute Term Frequency and Document Frequency for All Substrings in a Corpus", Retrieved at <<http://acl.ldc.upenn.edu/J/J01/J01-1001.pdf>>, In Journal of Computational Linguistics, vol. 27, Issue 1, Mar. 2001, 30 Pages.

Yuan et al., "SherLog: Error Diagnosis by Connecting Clues from Run-time Logs", Retrieved at <<http://opera.ucsd.edu/paper/asplos10-sherlog.pdf>>, In Newsletter of ACM SIGARCH Computer Architecture News, vol. 38, Issue 1, Mar. 2010, 12 Pages.

Zhang et al., "Extraction of Chinese Compound Words—An Experimental Study on a Very Large Corpus", Retrieved at <<http://acl.ldc.upenn.edu/W/W00/W00-1219.pdf>>, In Proceedings of the Second Workshop on Chinese language Processing, Oct. 2000, 8 Pages.

Smadja, Frank, "Retrieving Collocations from Text: Xtract," Retrieved at <<http://acl.ldc.upenn.edu/J/J93/J93-1007.pdf>>, In Journal of Computational Linguistics—Special Issue on Using large Corpora, Mar. 1993, 35 pages.

Xu et al., "Detecting Large-Scale System Problems by Mining Console Logs", Retrieved at <<http://www.sigops.org/sosp/sosp09/papers/xu-sosp09.pdf>>, In Proceedings of the ACM SIGOPS 22nd Symposium on Operating Systems Principles, Oct. 11, 2009,16 Pages.

Barco, et al., "Automated Troubleshooting of Mobile Networks Using Bayesian Networks", Retrieved at <<http://www.lcc.uma.es/~eva/doc/materiales/barco.pdf>>, Proceedings of the IASTED International Conference Communication Systems and Networks, Sep. 9, 2002, 6 Pages.

Yamanishi et al., "Dynamic Syslog Mining for Network Failure Monitoring", Retrieved at <<http://citeseerx.ist.psu.edu/viewdoc/download?doi=10.1.1.96.8083&rep=rep1&type=pdf>>, In Proceedings of the Eleventh ACM SIGKDD International Conference on Knowledge Discovery in Data Mining, Aug. 21, 2005, 10 Pages.

(56) References Cited

OTHER PUBLICATIONS

Notice of Allowance Mailed Feb. 13, 2015, from U.S Appl. No. 13/409,111, 8 pages.
Second Written Opinion Mailed Oct. 29, 2014, from PCT Patent Application No. PCT/US2013/070188, 6 pages.
Response to Second Written Opinion Filed Nov. 21, 2014 from US Patent Application No. PCT/US2013/070188, 8 pages.
Kececioglu, D.; "Maintainability, availability, and operational readiness engineering handbook"; vol. 1; DEStech Publications, Inc.; 2002; pp. 24 and 27-29.
Response filed Dec. 11, 2014 to Non-Final Office Action mailed Sep. 9, 2014 from U.S. Appl. No. 13/409,111, 11 pages.
Non-Final Office Action mailed Jan. 16, 2014 from U.S. Appl. No. 13/409,111, 15 pages.
Response filed Apr. 11, 2014. To the Non-Final Office Action mailed Jan. 16, 2014, from U.S. Appl. No. 13/409,111, 14 pages.
Final Office Action mailed Jun. 2, 2014 from U.S. Appl. No. 13/409,111, 15 pages.
Amendment filed Sep. 2, 2014 in response to the Final Office Action mailed Jun. 2, 2014, from U.S. Appl. No. 13/409,111, 15 pages.
Non-Final Office Action mailed Sep. 12, 2014, from U.S. Appl. No. 13/409,111, 16 pages.
Bos, et al.; "Cascading style sheets, level 2 revision 1 CSS 2.1 specification"; W3C working draft; W3C; Jun. 2005; 220 pages.
Fruchterman et al.; "Graph drawing by force—directed placement"; Software: Practice and Experience; vol. 21, No. 11; Nov. 1991; pp. 1129-1164.
Gruschke, B.; "Integrated event management: Event Correlation Using Dependency Graphs";' Proceedings of the 9th IFIP/IEEE International Workshop on Distributed Systems: Operations & Management (DSOM 98); 1998; 12 pages.
Heim, I.; "Anaphora and Semantic Interpretation: A Reinterpretation of Reinhart's Approach"; MIT Working Papers in Linguistics 25; 1998; pp. 205-246.
Justeson et al.; "Technical terminology: some linguistic properties and an algorithm for identification in text"; Natural Language Engineering; vol. 1, No. 1; 1995; pp. 9-27.
"N-Gram Extraction Tools"; retrieved at http://goo.gl/VNTJa; accessed on Oct. 31, 2012; 3 pages.
Ziefle, M.; "Effects of display resolution on visual performance"; Human Factors: The Journal of the Human Factors and Ergonomics Society; vol. 40, No. 4; 1998; 13 pages.
"Jquery", Retrieved at <<http://jquery.com/>>, Retrieved Date: Aug. 7, 2012, 1 Page.
Zur Muehlen et al., "Developing Web Services Choreography Standards L The Case of REST vs. SOAP.", Retrieved at <<http://citeseerx.ist.psu.edu/viewdoc/download?doi=10.1.1.80.6494 &rep=rep1&type=pdf>>, In Journal of Decision Support Systems—Special Issue, Jul. 2005, 35 Pages.
Manning et al., "Foundations of Statistical Natural Language Processing", Retrieved at <<http://cs.famaf.unc.edu.ar/~laura/llibres/snlp.pdf>>, In Book of Foundations of Statistical Natural Language Processing, Jun. 18, 1999, 704 Pages.
Aguilera et al., "Performance Debugging for Distributed Systems of Black Boxes", Retrieved at <<http://pdos.csail.mit.edu/~athicha/papers/blackboxes:sosp03.pdf>>, In Proceedings of the Nineteenth ACM Symposium on Operating Systems Principles, Oct. 19, 2003, 16 Pages.
Aho et al., "Efficient String Matching: An Aid to Bibliographic Search", Retrieved at <<http://cisc-w09.isrl.kr/cgi-bin/TUBoard/db/seminar/upload/1183356194165246034173/p333-aho-corasick.pdf>>, In Communications of the ACM, vol. 18, No. 6, Jun. 1975, 8 Pages.
Barnes et al., "A Hierarchical O (N log N) Force-calculation Algorithm",Retrieved at <<http://www.ecs.umass.edu/~mettu/ece665/barnes_86.pdf>>, In Letters to Nature, vol. 324, Issue 4, Dec. 1986, 4 Pages.

Bostock et al., "D3: Data-Driven Documents.", Retrieved at <<http://vis.stanford.edu/files/2011-D3-InfoVis.pdf>>, In IEEE Transactions on Visualization and Computer Graphics, vol. 17, No. 12, Jan. 2011, 9 Pages.
Brauckhoff et al., "Anomaly Extraction in Backbone Networks using Association Rules", Retrieved at <<http://www.csg.ethz.ch/people/dimitroc/papers/imc09.pdf>>, In Proceedings of the 9th ACM SIGCOMM Conference on Internet Measurement Conference, Nov. 4, 2009, 7 Pages.
Bray et al., "Extensible Markup Language (XML)", Retrieved at <<http://www.w3.org/TR/PR-xml-971208>>, In Journal of World Wide Web Consortium, Dec. 8, 1997, 42 Pages.
Church et al., "Word Association Norms, Mutual Information, and Lexicography", Retrieved at <<http://acl.ldc.upenn.edu/J/J90/J90-1003.pdf>>, In Journal of Computational Linguistics, vol. 16, No. 1, Mar. 1990, 8 Pages.
Cohen et al., "Capturing, Indexing, Clustering, and Retrieving System History", Retrieved at <<http://www.research.rutgers.edu/~lekien/papers/Cohen_etalSOSP2005.pdf>>, In Proceedings of the Twentieth ACM Symposium on Operating systems Principles, Oct. 23, 2005, 14 Pages.
Cooley et al., "Web Mining: Information and Pattern Discovery on the World Wide Web", Retrieved at <<http://ieeexplore.ieee.org/stamp/stamp.jsp?tp=&arnumber=632303>>, In Proceedings of the Ninth IEEE International Conference on Tools with Artificial Intelligence, Nov. 3, 1997, 10 Pages.
Fielding, "Architectural Styles and the Design of Network-based Software Architectures", Retrieved at <<http://jpkc.fudan.edu.cn/picture/article/216/35/4b/22598d594e3d93239700ce79bce1/7ed3ec2a-03c2-49cb-8bf8-5a90ea42f523.pdf>>, In Doctoral Dissertation Architectural Styles and the Design of Network-based Software Architectures, Aug. 8, 2012, 180 Pages.
Garrett, "Ajax: A New Approach to Web Applications", Retrieved at <<http://scholar.googleusercontent.com/scholar?q=cache:DY1KmbMV5IMJ:scholar.google.com/+Ajax:+A+new+approach+to+web+applications&hl=en&as_sdt=0,5>>, Feb. 18, 2005, 6 Pages.
Goldstein et al., "Summarizing Text Documents: Sentence Selection and Evaluation Metrics", Retrieved at <<http://www.cs.cmu.edu/afs/cs.cmu.edu/Web/People/jgc/publication/Summarizing_Text_Documents_Sentence_SIGIR_1999.pdf>>, In Proceedings of the 22nd Annual International ACM SIGIR Conference on Research and Development in Information Retrieval, Aug. 15, 1999, 8 Pages.
Gruber, Thomas R., "Toward Principles for the Design of Ontologies Used for Knowledge Sharing", Retrieved at <<http://www.civ.utoronto.ca/sect/coneng/i2c/Civ1283/Civ1283-Ref-Final/Civ1283-Advanced%20Ref/Ontology/Gruber%20paper.pdf>>, In International Journal of Human-Computer Studies—Special Issue, Nov. 1995, 22 Pages.
"HTML5: A Vocabulary and Associated APIs for HTML and XHTML.", Retrieved at <<http://www.w3.org/TR/2010/WD-html5-20100624/>>, Aug. 7, 2012, 23 Pages.
Deerwester et al., "Indexing by Latent Semantic Analysis", Retrieved at <<http://www.cob.unt.edu/itds/faculty/evangelopoulos/dsci5910/LSA_Deerwester1990.pdf>>, In Journal of the American Society for Information Science, vol. 41, Issue 6, Sep. 1990, 17 Pages.
Khanna et al., "Automated Rule-Based Diagnosis through a Distributed Monitor System", Retrieved at <<http://ieeexplore.ieee.org/stamp/stamp.jsp?tp=&arnumber=4358702>>, In IEEE Transactions on Dependable and Secure Computing, vol. 4, Issue 4, Oct. 2007, pp. 266-279.
Konig et al., "Reducing the Human Overhead in Text Categorization", Retrieved at <<http://research.microsoft.com/pubs/68150/rtpp139-konig.pdf>>, In Proceedings of the 12th ACM SIGKDD International Conference on Knowledge Discovery and Data Mining, Aug. 20, 2006, 6 Pages.
Lim et al., "A Log Mining Approach to Failure Analysis of Enterprise Telephony Systems", Retrieved at <<http://ieeexplore.ieee.org/stamp/stamp.jsp?arnumber=04630109>>, In IEEE International Conference on Dependable Systems and Networks with FTCS and DCC, Jun. 24, 2008, 6 Pages.

(56) References Cited

OTHER PUBLICATIONS

Mackay, David J.C., "Information Theory, Inference, and Learning Algorithms", Retrieved at <<http://www.cs.toronto.edu/~mackay/itprnn/book.pdf>>, In Book of Information Theory, Inference & Learning Algorithms, Oct. 6, 2003, 640 Pages.

Mani et al., "The Tipster Summac Text Summarization Evaluation", Retrieved at <<http://acl.ldc.upenn.edu/E/E99/E99-1011.pdf>>, In Proceedings of the Ninth Conference on European Chapter of the Association for Computational Linguistics, Jun. 8, 1999, 9 Pages.

Notice of Allowance Mailed Aug. 20, 2014, from U.S. Appl. No. 13/536,782, 5 pages.

Non-Final Office Action Mailed Apr. 18, 2014, from U.S. Appl. No. 13/536,782, 10 pages.

Response filed Jul. 25, 2014 to Non-Final Office Action Mailed Apr. 18, 2014, from U.S. Appl. No. 13/536,782, 12 pages.

Response filed Sep. 5, 2014 to International Search Report and Written Opinion: Article 34 Demand, from PCT Patent Application No. PCT/US2013/070188.

"International Search Report" from Application No. PCT/US2013/070327 Mailed May 15, 2014.

"Microsoft Assessment and Planning Toolkit", Retrieved at <<http://www.microsoft.com/sam/en/us/map.aspx>>, Sep. 23, 2010, pp. 2.

"Network Management System", Retrieved at <<http://www.cisco.com/en/US/tech/tk869/tk769/technologies_white_paper09186a00800aea9c.shtml#inventorymanage>>, White Paper on Network Management System Best Practices—Cisco Systems, Aug. 9, 2003, pp. 17.

"International Search Report", Mailed Date: May 22, 2014, Application No. PCT/US2013/070188.

Song et al., "Availability Modeling and Analysis on High Performance Cluster Computing Systems", Proceedings of the First IEEE International Conference on Availability, Reliability, and Security, pp. 305-313, Apr. 20, 2006.

"Response to International Search Report & Written Opinion dated Mar. 28, 2014," from PCT Patent Application No. PCT/US2013/070327, Filed Sep. 5, 2014, 9 pages.

"International Preliminary Report on Patentability," from PCT Patent Application No. PCT/US2013/070327, Mailed Date: Feb. 19, 2015, 12 pages.

"Notice of Allowance," from U.S. Appl. No. 13/536,782, Mailed Date: Feb. 17, 2015, 6 pages.

"Better Predict and Prevent Network Failure—Monolith Software for Network Management", Retrieved at <<http://www.monolith-software.com/solutions/network-management.php>>, Retrieved Date: Oct. 19, 2011, 2 Pages.

Brodkin, Jon, "Amazon EC2 outage calls 'availability zones' into question", Retrieved at <<http://www.networkworld.com/news/2011/042111-amazon-ec2-zones.html>>, Apr. 21, 2011, 8 Pages.

Chen et al., "Declarative configuration management for complex and dynamic networks", Retrieved at <<http://www2.research.att.com/~kobus/docs/coolaid.pdf>>,Proceedings of CoNEXT, 2010, Nov. 30-Dec. 3, 2010, 12 Pages.

"Cisco: Data center: Load balancing data center services", Retrieved at <<http://www.cisco.com/en/US/solutions/collateral/ns340/ns517/ns224/ns668/>>, Mar. 2004, 15 Pages.

"Cisco. UniDirectional Link Detection (UDLD)", Retrieved at <<http://www.cisco.com/en/US/tech/tk866/tsd_technology_support_subprotocol_home.html>>, 2 Pages.

EMC Ionix Application Discovery Manager, Retrieved at <<http://www.emc.com/collateral/software/data-sheet/h2365-ionix-adm-ds.pdf>>,Proceedings of ICIDS 2008, Retrieved Date: Oct. 19, 2011, 5 Pages.

Ford et al., "Availability in globally distributed storage systems", Retrieved at <<http://www.usenix.org/event/osdi10/tech/full_papers/Ford.pdf>>, Proceedings of OSDI, 2010, pp. 1-14.

Greenberg et al., "Towards a Next Generation Data Center Architecture: Scalability and Commoditization", Retrieved at <<http://research.microsoft.com/pubs/79348/presto27-greenberg.pdf>>, Proceedings of the ACM Workshop on Programmable Routers for Extensible Services of Tomorrow, Aug. 22, 2008, pp. 57-62.

Guo et al., "DCell: A Scalable and Fault-Tolerant Network Structure for Data Centers", Retrieved at <<http://research.microsoft.com/pubs/75988/dcell.pdf>>, In Proceedings of the ACM SIGCOMM Conference on Data Communication, Aug. 17, 2008, pp. 75-86.

Gyarmati et al., "Scafida: A Scale-Free Network Inspired Data Center Architecture", Retrieved at <<http://ccr.sigcomm.org/drupal/files/p5-2v40n5b2-gyarmatiPS.pdf>>, In ACM SIGCOMM Computer Communication Review, vol. 40, Issue 5, Oct. 2010, pp. 4-12.

Kim et al., "Floodless in Seattle: a scalable ethernet architecture for large enterprises", Retrieved at <<http://www.cs.princeton.edu/courses/archive/fall10/cos561/papers/Seattle08.pdf>>, Proceedings of SIGCOMM, 2008, Aug. 17-22, 2008, 12 Pages.

McKeown et al., "Openflow: enabling innovation in campus networks", Retrieved at <<http://www.cs.illinois.edu/~pbg/courses/cs598fa10/readings/mabpprst08.pdf>>, Proceedings of SIGCOMM CCR, Mar. 14, 2008, 6 Pages.

Meykar, O.; "Definitions of Effectiveness Terms: A Report on the Purpose and Contents of MIL-STD-721B"; IEEE Transactions on Aerospace and Electronic Systems; vol. AES3, No. 2; Mar. 1967; pp. 165-170.

"Military Standard, Definitions of Terms for Reliability and Maintainability," Jun. 12, 1981; Department of Defense, Washington, D.C.; 18 pages.

O'Connor et al.; "Practical Reliability Engineering"; Wiley & Sons; 2012, pp. 147, 431, and 1.

Schroeder et al., "Disk failures in the real world: What does an MTTF of 1,000,000 hours mean to you?", Retrieved at <<http://www.usenix.org/event/fast07/tech/schroeder/schroeder.pdf>>, Proceedings of FAST '07: 5th USENIX Conference on File and Storage Technologies, pp. 1-16.

Schroeder et al., "DRAM errors in the wild: A large-scale field study", Retrieved at <<http://edpin.com/dram_sigmetrics09.pdf>>, Proceedings of SIGMETRICS, 2009., Jun. 15-19, 2009, 12 Pages.

"Security Information & Event Manager (SIEM)", Retrieved at <<http://www.enterasys.com/company/literature/siem-ds.pdf>>, Retrieved Date: Oct. 19, 2011, 7 Pages.

Singh et al., "DYSWIS: An Architecture for Automated Diagnosis of Networks", Retrieved at <<http://www.cs.columbia.edu/~vs2140/DYSWIS.pdf>>, May 1-10, 2011, 8 Pages.

Spanning Tree Protocol Root Guard Enhancement, Retrieved at <<http://www.cisco.com/application/pdf/paws/10588/74.pdf>>, Retrieved Date: Feb. 15, 2012, 6 Pages.

Tang et al., "Analysis and Modeling of Correlated Failures in Multicomputer Systems"; IEEE Transactions on Computers; vol. 41, No. 5; May 1992; 11 pages.

Thottan et al., "Anomaly Detection in IP Networks", Retrieved at <<http://users.ece.gatech.edu/jic/sig03.pdf>>, Proceedings of IEEE Transactions on Signal Processing, vol. 51, No. 8, Aug. 2003, pp. 2191-2204.

Vishwanath et al., "Characterizing cloud computing hardware reliability", Retrieved at <<http://research.microsoft.com/pubs/120439/socc088-vishwanath.pdf>>, Proceedings of Symposium on Cloud Computing (SOCC), 2010, Jun. 10-11, 2010, 11 Pages.

Wang et al., "MCube A High Performance and Fault-Tolerant Network Architecture for Data Centers", Retrieved at <<http://ieeexplore.ieee.org/stamp/stamp.jsp?tp=&arnumber=5540940>>, 2010 International Conference on Computer Design and Applications, Jun. 25, 2010, 5 pages.

Voluntary Amendments filed Nov. 13, 2015 from China Patent Application No. 201380059928.0, 12 pages.

Notice of Allowance mailed Sep. 14, 2015 from U.S. Appl. No. 13/924,452, 7 pages.

Notice of Allowance mailed Oct. 6, 2015 from U.S. Appl. No. 13/535,366, 6 pages.

Ellram et al., "Total Cost of Ownership a Key Concept in Strategic Cost Management Decisions", Journal of Business Logistics, vol. 19, No. 1, 1998, pp. 55-84, 28 pages.

Ellram, "Total Cost of Ownership: An Analysis Approach for Purchasing," PDLM Journal of Physical Distribution & Logistics Management, vol. 25, No. 8, 1995, pp. 4-23, 24 pages.

(56) References Cited

OTHER PUBLICATIONS

Notice of Allowance mailed Nov. 3, 2015 from U.S. Appl. No. 13/536,782, 6 pages.
"Attensity Text Analytics Software", Attensity White Paper, retrieved on Apr. 15, 2015, 14 pages.
"Enterprise Feedback Management", Published on: Jun. 30, 2012, retrieved at <<http://www.forumresearch.com/services-enterprise-feedback-management.asp>>, 2 pages.
Aciar, Silvana, "Mining Context Information from Consumer's Reviews", Proceedings of 2nd Workshop on Context-Aware Recommender Systems, Sep. 30, 2010, 5 pages.
Baysal, et al., "A Bug You Like: A Framework for Automated Assignment of Bugs", IEEE 17th International Conference on Program Comprehension, May 17, 2013, 2 pages.
Benson, M., "Collocations and General-Purpose Dictionaries," International Journal of Lexicography, 1990, 12 pages.
Bettenburg, et al., "Duplicate Bug Reports Considered Harmful Really?", IEEE International Conference on Software Maintenance, 2008, 9 pages.
Bettenburg, et al., "Extracting Structural Information from Bug Reports," ACM International Working Conference on Mining Software Repositories, 2008, 4 pages.
Bhattacharya, et al., "Automated, Highly-Accurate, Bug Assignment Using Machine Learning and Tossing Graphs", Journal of Systems and Software, vol. 85, Issue 10, Oct. 2012, 18 pages.
Brugnoni, et al., "An Expert system for Real Time Fault Diagnosis of the Italian Telecommunications Network," International Symposium on Integrated Network Management, 1993, 13 pages.
Goryachev, et al., "Implementation and Evaluation of Four Different Methods of Negation Detection," Tech. Rep., DSG, 2006, 7 pages.
Goyal, et al., "Streaming for Large Scale NLP: Language Modeling," Annual Conference of the Association for Computational Linguistics, 2009, 9 pages.
Heafield, K., "Kenlm: Faster and Smaller Language Model Queries," Workshop on Statistical Machine Translation, 2011, 11 pages.
Hooimeijer, et al., "Modeling Bug Report Quality," IEEE/ACM International Conference on Automated Software Engineering, 2007, 10 pages.
Jonsson, et al., "Automated Bug Assignment: Ensemble-based Machine Learning in Large Scale Industrial Contexts", Proceedings of Empirical Software Engineering, retrieved on Apr. 29, 2015, 52 pages.
Just, et al., "Towards the Next Generation of Bug Tracking Systems," IEEE Symposium on Visual Languages and Human-entric Computing, 2008, 4 pages.
Kittur, et al., "Crowdsourcing User Studies with Mechanical Turk," ACM SIGCHI Conference on Human Factors in Computing Systems, 2008, 4 pages.
Lang, et al., "Enhancing Business Intelligence with Unstructured Data", Proceedings of Conference on Database Systems in Business, Technology and Web, Mar. 2, 2009, pp. 469-485, 17 pages.
Runeson, P., et al., "Detection of Duplicate Defect Reports Using Natural Language Processing," IEEE International Conference on Software Engineering, 2007, 10 pages.
CodePlex, Project Hosting for Open Source Software, "SharpNPL—Open Source Natural Language Processing Tools", retrieved at https://web.archive.org/web/20120623043531/http://sharpnlp.codeplex.com/, Dec. 13, 2006, 2 pages.
Shokripour, et al., "Automatic Bug Assignment Using Information Extraction Methods", In Proceedings of International Conference on Advanced Computer Science Applications and Technologies, Nov. 26, 2012, 6 pages.
Simm, et al., "Classification of Short Text Comments by Sentiment and Actionability for VoiceYourView", In Proceedings of IEEE International Conference on Social Computing / IEEE International Conference on Privacy, Security, Risk and Trust, Aug. 20, 2010, pp. 552-557, 6 pages.
Sukumaran, et al., "Integrating Structured and Unstructured Data Using Text Tagging and Annotation", in the Data Administration Newsletter, May 29, 2007, 6 pages.
Weight, "Allegiance: How Text Analytics Changes Everything", Retrieved on Apr. 15, 2015, at <<https://www.allegiance.com/documents/text_analytics.pdf>>, 6 pages.
Wu et al., "NetPilot: Automating Datacenter Network Failure Mitigation", Annual Conference of the ACM Special Interest Group on Data Communication, Aug. 13, 2012, 12 pages.
Notice of Allowance mailed Aug. 5, 2015 from U.S. Appl. No. 13/677,302, 15 pages.
Notice of Allowance mailed Aug. 5, 2015 from U.S. Appl. No. 13/536,782, 6 pages.
Notice of Allowance mailed Jun. 19, 2015 from U.S. Appl. No. 13/924,452, 8 pages.
Notice of Allowance mailed Feb. 13, 2015 from U.S. Appl. No. 13/409,111, 8 pages.
Mysore et al., "PortLand: A Scalable Fault-Tolerant Layer 2 Data Center Network Fabric", Proceedings of the ACM SIGCOMM 2009 Conference on Data Communication, vol. 39, Issue 4, Oct. 2009, pp. 39-50, 12 pages.
Supplemental Notice of Allowability mailed Nov. 19, 2015 from U.S. Appl. No. 13/535,366, 7 pages.
Notice of Intention to Grant mailed Nov. 24, 2015 from European Patent Application No. 13802771.9, 53 pages.
Supplemental Notice of Allowability mailed Dec. 9, 2015 from U.S. Appl. No. 13/535,366, 11 pages.
Notice of Allowance mailed Dec. 23, 2015, 2015 from U.S. Appl. No. 13/677,302, 42 pages.
Corrected Notice of Allowance mailed Jan. 13, 2016 from U.S. Appl. No. 13/677,302, 21 pages.

* cited by examiner

EVALUATING ELECTRONIC NETWORK DEVICES IN VIEW OF COST AND SERVICE LEVEL CONSIDERATIONS

CROSS-REFERENCE TO RELATED APPLICATIONS

This patent application is a continuation-in-part of, and claims priority from, U.S. patent application Ser. No. 13/677,302 filed on Nov. 15, 2012, which is incorporated herein by reference in its entirety.

BACKGROUND

Applications are often deployed in data centers, where the applications execute on one or more servers. A data center generally has a network that includes a number of different network devices, such as various types of routers, switches, etc. A failure of any individual network device can sometimes cause the application to be unavailable from outside the data center. Thus, from the perspective of an end user, the availability of an application is dependent not only on whether the application itself is executing properly, but also on the proper functioning of intervening network devices that connect the application to the end user.

To address this issue, network devices may be deployed in redundant pairs or larger groups. Redundant network devices and/or links can provide some measure of protection against individual device failures or link failures, because when an individual device/link in a given group fails, the other device will sometimes continue functioning and, therefore, the application may still be reachable by end users. Thus, whether a particular application is reachable from outside the data center depends not only on the proper functioning of the individual network devices, but also on how effective the redundant groups are at preserving connectivity when one or more devices in the redundant groups fail.

When procuring devices for a data center or other network environment, cost is often a major consideration. For example, devices with equivalent functions can be compared directly in terms of currency cost, e.g., the cost in dollars of one access router model vs. another access router model. However, comparing devices in this manner does not account for variations in the service levels provided by different devices. For example, two device models with very different failure characteristics may appear to be very similar when compared based on functionality alone.

SUMMARY

The above listed example is intended to provide a quick reference to aid the reader and is not intended to define the scope of the concepts described herein.

This document relates to processing electronic data. One implementation is manifest as a system that can include an evaluation component and one or more processing devices configured to execute the evaluation component. The evaluation component can be configured to obtain first production data for a first device classification and characterize a first service level of the first device classification using the first production data. The evaluation component can also be configured to determine a first number of first devices of the first device classification that, when deployed, are expected to meet a service level constraint, based on the first service level. The evaluation component can also be configured to evaluate the first device classification based on first costs associated with deploying the first number of first devices that are expected to meet the service level constraint.

Another implementation is manifest as a technique that can include determining a first number of first devices of a first device classification that can be deployed subject to a cost constraint. The technique can also include determining a second number of second devices of a second device classification that can be deployed subject to the cost constraint. The technique can further include determining an expected first service level provided by the first number of devices and determining an expected second service level provided by the second number of devices. The technique can also include evaluating the first device classification and the second device classification based on the first service level and the second service level.

Another implementation is manifest as one or more computer-readable storage devices comprising instructions which, when executed by one or more processing devices, cause the one or more processing devices to perform acts. The acts can include determining service levels provided by multiple network configurations, determining costs associated with the multiple network configurations, and evaluating the multiple network configurations based on both the costs and the service levels. The multiple network configurations can include at least some redundantly-deployed devices.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

Figure 1:
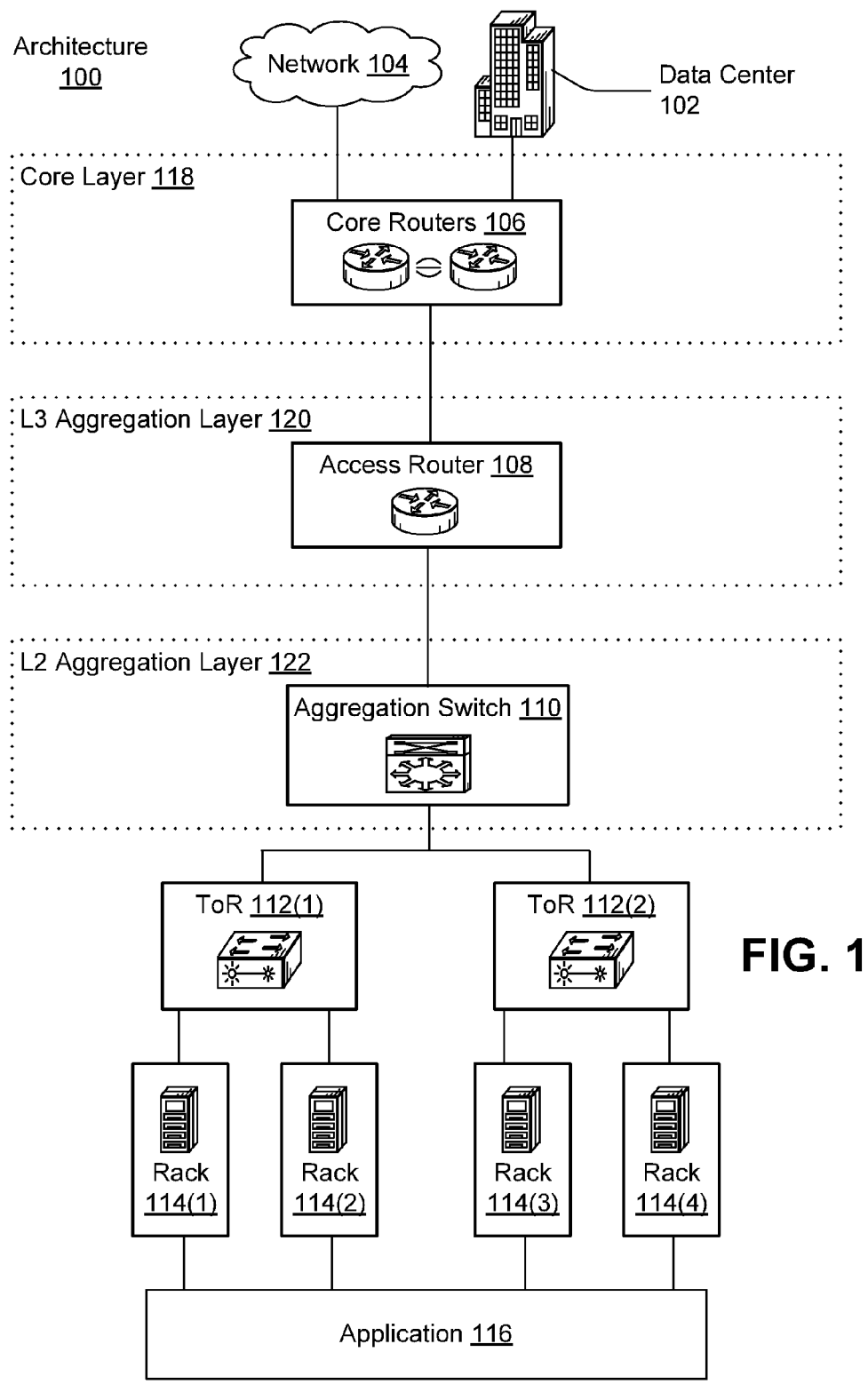
FIGS. 1-3 and 8 show exemplary data center architectures in which the present concepts can be employed in accordance with some implementations.

This discussion relates to characterizing service levels of devices or applications on an electronic network. For the purpose of this document, the term "service level" includes concepts such as reliability, availability, traffic flow/loss, etc. For example, availability relates to the fraction of time a given application, device, or hardware/software component is functioning on average over a given period of time, e.g., the "uptime" as measured on a time basis, such as an annual basis. Reliability relates to the likelihood of failure of a given application, device, or hardware component, e.g., the expected time until the next failure. Failure relates to instances when a given application, device, or component does not perform as intended.

Specific definitions of availability, reliability, and failure can be found in various references. Although the following definitions are not explicitly adopted herein, the following definitions may provide further clarity for the terms availability, reliability, and failure. For example, MIL-STD 721C defines availability as a measure of the degree to which an item is in an operable and committable state. MIL-STD 721C defines reliability as (1) the duration or probability of a failure-free performance under stated conditions or (2) the probability that an item will perform its intended function, without failure, for a specified interval under stated conditions. Failure can be defined as the inability of an item to function within its specified limits of performance (MIL-STD 721B) or as an event or inoperable state in which any item or part of any item does not or would not perform as previously specified (MIL-STD 721C).

Generally speaking, the disclosed implementations may characterize the service level of an individual network device, such as an access router, aggregation switch, etc. Additionally, the disclosed implementations may characterize the service level of an application that uses one or more network devices. The service level of an application can be a function of the service level of the network devices used by the application. Moreover, some of the network devices may be deployed in redundant groups of multiple devices. Thus, the service level of an application can be a function of how effective the redundant groups are at ensuring that application traffic can be routed without significant impact despite failures, e.g., some alternative path along alternative devices/links. The term "network service level" describes the service level of an application independently of failures of application code and/or computing devices executing the application, and relates to the service level of various network devices and links upon which an application depends for connectivity. For example, network service levels can be impacted by hardware failures (device or link failures), software failures (protocol, device operating system, firmware, etc.), as well as configuration failures. The term "network availability" is similarly independent of application code failures and failures of computing devices executing the application.

Some of the present techniques can leverage data center event logs, which may include events that are logged by various devices or applications. The events in the log can include error reports indicating failure of one or more devices in the data center. Event logs can be processed to evaluate the service levels of individual devices in the data center. In some implementations, the event logs can be filtered to provide a more compact data set for evaluating service levels, e.g., by filtering out duplicate events, merging simultaneous events, etc.

Data Center Example

FIG. 1 illustrates an example of a data center network architecture 100. The architecture can be manifest in a data center 102 that is connected to a network 104, such as the Internet. In this case, the architecture 100 includes devices or components such as one or more core routers 106, one or more access routers 108, one or more aggregation switches 110, one or more top-of-rack (ToR) switches 112(1) and 112(2), and one or more racks 114(1), 114(2), 114(3), and 114(4). Each of the racks 114 can include one or more server devices that host an application 116. Note that different instances of the various devices in FIG. 1 are distinguished by parenthetical references, e.g., 112(1) refers to a different ToR switch than 112(2). When referring to multiple devices collectively, the parenthetical will not be used, e.g., ToRs 112 can refer to either or both of ToR 112(1) or ToR 112(2). Note also that architecture 100 can include various devices or components not shown in FIG. 1, e.g., various intrusion detection and prevention systems, virtual private networks (VPNs), firewalls, load balancers, etc.

From a logical standpoint, the architecture 100 can be organized into a hierarchy that includes a core layer 118, an L3 aggregation layer 120, and a L2 aggregation layer 122. This logical organization can be based on the functional separation of Layer-2 (e.g., trunking, VLANs, etc.) and Layer-3 (e.g., routing) responsibilities. In FIG. 1, only one access router 108 and one aggregation switch 110 are shown, but examples with multiple access routers and multiple aggregation switches follow. In implementations with multiple access routers, the multiple access routers can be deployed in redundancy groups to provide redundancy at the L3 aggregation layer 120. Likewise, in implementations with multiple aggregation switches, the multiple aggregation switches can be deployed in redundancy groups to provide redundancy at the L2 aggregation layer 122. Generally, in a redundancy group, the group contains multiple members and individual members can perform the switching/routing functions when other member(s) of the redundancy group fail. Note also that FIG. 1 illustrates core routers 106 in a redundant configuration. While the following examples use redundant pairs of devices to explain certain inventive concepts, devices can be redundantly configured in groups of 2 or more. Thus, the term "group" as used herein encompasses both pairs of devices as well as larger groups.

Generally speaking, redundancy groups can be deployed in various configurations, including "active-standby" configurations and "active-active" configurations. In active-standby configurations, one or more devices are active (e.g., carrying traffic) and one or more other devices are on standby (e.g., not carrying traffic) and can be activated to take over for a failing device. In active-active configurations, the devices in the group are active and, when a device in the group fails, traffic that would have otherwise been carried by the failing device can be carried by the remaining members of the group.

ToRs 112 (also known as host switches) connect the servers hosted by the racks 114 to a remainder of the architecture 100 via an internal data center network represented by connecting lines in FIG. 1. Host ports in these ToR switches are often 10/100/1000 Ethernet, with the uplinks being Gigabit Ethernet or 10GE ports. The ToRs can be connected upstream to aggregation switch 110. These aggregation switches can serve as an aggregation point for Layer-2 traffic and typically support high-speed technologies such as 10 Gigabit Ethernet to carry large amounts of traffic (e.g., data).

Traffic from the aggregation switch 110 can be forwarded to the access router 108. The access router can use Virtual Routing and Forwarding (VRF) to create a virtual, Layer-3 environment for each tenant. (A tenant is an application, such as a service, hosted on servers which use network devices for connectivity—route traffic from/to users or other services to/from its hosted servers.) Thus, FIG. 1 illustrates a single tenant, application 116, although multiple tenants can execute on individual servers of racks 114. In some implementations, the L3 aggregation layer 120 can aggregate traffic from up to several thousand servers and route the traffic to core routers 106 that can connect to the rest of the architecture 100 and network 104.

Some implementations (especially user-facing applications) may use load balancers to improve the performance of hosted applications. Redundant pairs of load balancers can connect to the aggregation switch 110 and perform mapping between static IP addresses (exposed to clients through DNS) and dynamic IP addresses of the servers to process user requests to application 116. Load balancers can support different functionalities such as network address translation, secure sockets layer or transport layer security acceleration, cookie management, and data caching.

Firewalls can be deployed in some implementations to protect applications from unwanted traffic (e.g., DoS attacks) by examining packet fields at IP (Internet Protocol) layer, transport layer, and sometimes even at the application layer against a set of defined rules. Generally, software-based firewalls can be attractive to quickly implement new features. However, hardware-based firewalls are often used in data centers to provide performance-critical features.

Virtual private networks can augment the data center network infrastructure by providing switching, optimization and security for web and client/server applications. The virtual private networks can provide secure remote access. For example, the virtual private networks can implement secure sockets layer, transport layer security, or other techniques.

Considering FIG. 1, note that there are several points of failure which could result in the unavailability of application 116. For example, application 116 could have a software failure, hardware failure, misconfiguration, protocol error, or other malfunction that causes application 116 to stop executing properly on the servers of racks 114. Additionally, failure of both ToRs 112(1) and 112(2) can result in unavailability of application 116, as can concurrent failure of both of the redundantly-configured core routers 106. Note also that, since there is only a single aggregation switch 110 and a single access router 108 shown in FIG. 1, a failure of either of these individual devices could be sufficient to prevent users from accessing application 116 from outside data center 102.

For the purposes of this document, the network devices on which a given application depends to carry application traffic are referred to as the "network stamp" of the application. Thus, in FIG. 1, the network stamp of application 116 includes ToRs 112(1) and 112(2), aggregation switch 110, access router 108, and core routers 106. The following discussion will explain techniques for characterizing the service level of an application based on the network stamp of the application. In some implementations, the characterization of the service level can reflect redundant groups of network devices. Detailed examples are discussed herein with respect to the L2 aggregation layer 122 and the L3 aggregation layer 120. However, those skilled in the art will understand that these concepts are readily extensible to other network devices or layers of the network topology (e.g., core router redundancy, load balancer redundancy, etc.)

As a hypothetical example, for purposes of exposition, assume network 104, core routers 106, access router 108, aggregation switch 110, ToRs 112(1) and 112(2), racks 114(1)-114(4), and software of application 116 all exhibit perfect reliability—no failures ever. Also assume that application 116 is not hosted elsewhere and is only available via data center 102. Under this idealized set of circumstances, application 116 would exhibit 100% availability and infinite reliability. Now, assume that access router 108 is replaced with a device having 90% availability instead. Because there is no redundancy at the L3 aggregation layer 120, the availability of the application is now reduced to 90%. Note also that replacing aggregation switch 110, instead of access router 108, with a device having 90% availability would have a similar effect on the availability of application 116.

More generally, to compute network availability for a given application, network availability can be considered on an end-to-end basis for each component (link or device) carrying application traffic. Some implementations may assume statistical independence of failures among devices. Under such an assumption, if both aggregation switch 110 and access router 108 have 90% availability, the expected network availability of application 116 is (0.9*0.9)=0.81 or 81%. As discussed in more detail below, further implementations may consider the extent to which device failures are statistically correlated.

Data Center Example with L3 Redundancy

Figure 2:
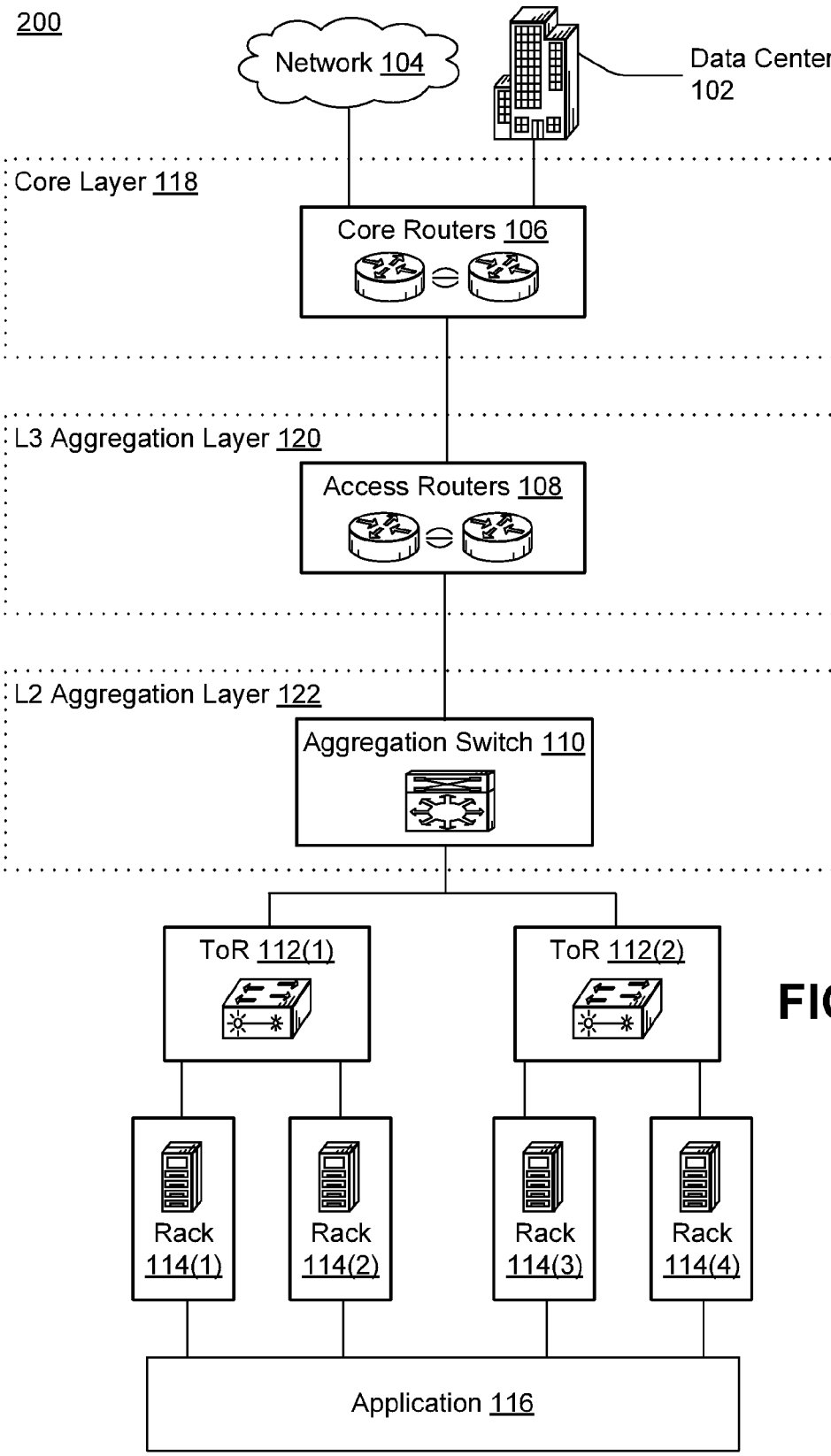

FIG. 2 illustrates data center 102 with a different architecture 200, e.g., in a different configuration to provide redundancy at the L3 aggregation layer 120. In FIG. 2, multiple access routers 108 are now deployed as a redundancy group, in this case, a redundancy pair. Thus, the difference between the network stamp of application 116 in FIG. 1 and FIG. 2 is the addition of an additional access router 108 in a redundant configuration in FIG. 2. The changes to the network stamp of application 116 can have different effects on the availability of application 116, as discussed more below.

Continuing with the hypothetical example introduced above, assume network 104, core routers 106, aggregation switch 110, ToRs 112(1) and 112(2), racks 114(1)-114(4), and software of application 116 all exhibit perfect reliability and 100% availability. Further, assume each individual device from access routers 108 exhibits 90% availability, and that a single access router can handle all of the application traffic in the event that the other access router fails (otherwise the remaining access router will drop traffic when the traffic is redirected to the remaining access router). The following scenarios illustrate how the effectiveness of the redundancy may vary depending upon whether failures of the individual access routers are closely correlated.

In one "zero redundancy" hypothetical circumstance, the addition of redundancy at the L3 aggregation layer 120 provides no additional benefit relative to a single, 90% available access router 108. Specifically, consider the case where the individual devices of access routers 108 always fail together. Under these circumstances, the availability of application 116 is still 90%, since the redundant pair of access routers 108 effectively still functions as a single point of failure.

Now, consider a different "perfect redundancy" hypothetical circumstance where the individual redundant access routers 108 never fail together. In this circumstance, the availability of application 116 is 100%. Hypothetically, two redundant access routers with perfect redundancy, i.e., never failing together, could provide 100% availability with only 50% availability for each individual device. Continuing with the hypothetical example, in a redundant group of 3 access routers 108, the individual devices need only exhibit availability ⅓ of the time, a group of 4 devices needs ¼ availability, etc.

In practice, redundant devices are not likely to provide zero redundancy or perfect redundancy. Rather, sometimes the individual devices in a redundancy group will fail together, e.g., due to a common cause such as a power outage at a location where the redundancy group is located. Other times, some of the devices in the redundancy group will fail while other devices in the group continue functioning properly. For example, a power supply for one device in a redundancy group may fail causing one device in the group to fail. The following discussion explores techniques for characterizing application and device service levels in view of these practical considerations.

As mentioned above with respect to FIG. 1, one practical approach used in some implementations is to assume statistical independence of failures. Here, given the assumptions above, the hypothetical network availability is the probability that at least one access router is available.

$Pr$(at least 1 access router is available)=1−$Pr$(no access router is available)=1−$Pr$(access router 1 isn't available)*$Pr$(access router 2 isn't available)=1−(1−0.9)*(1−0.9)=1−(1−0.9)^2=1−0.01=0.99

Thus, using redundancy, higher system availability can be achieved even though the individual components of the system have lower availability of 0.9 each. More generally, the equation:

$Pr$(at least 1 access router available)=1−(1−$Pr$(access router failing))^# of access routers can be used to generalize to different numbers of access routers. The equation can be generalized in a straightforward manner to other device types/links/numbers of data centers as well.

For example, the previous examples illustrate the notion of intra-data center redundancy, e.g., redundancy of devices or links within a given data center. Some implementations may consider service levels of inter-data center redundancy as well, e.g., circumstances where applications are hosted at multiple data centers. Inter-data center redundancy can be considered when evaluating the service level of an application in a manner similar to that set forth above. Thus, for example, the expected availability of an application hosted at two data centers with availability of 90% each is 99%, assuming statistical independence of failures by the two data centers and that each data center is individually capable of carrying the necessary application traffic.

Data Center Example with L2 and L3 Redundancy

Figure 3:
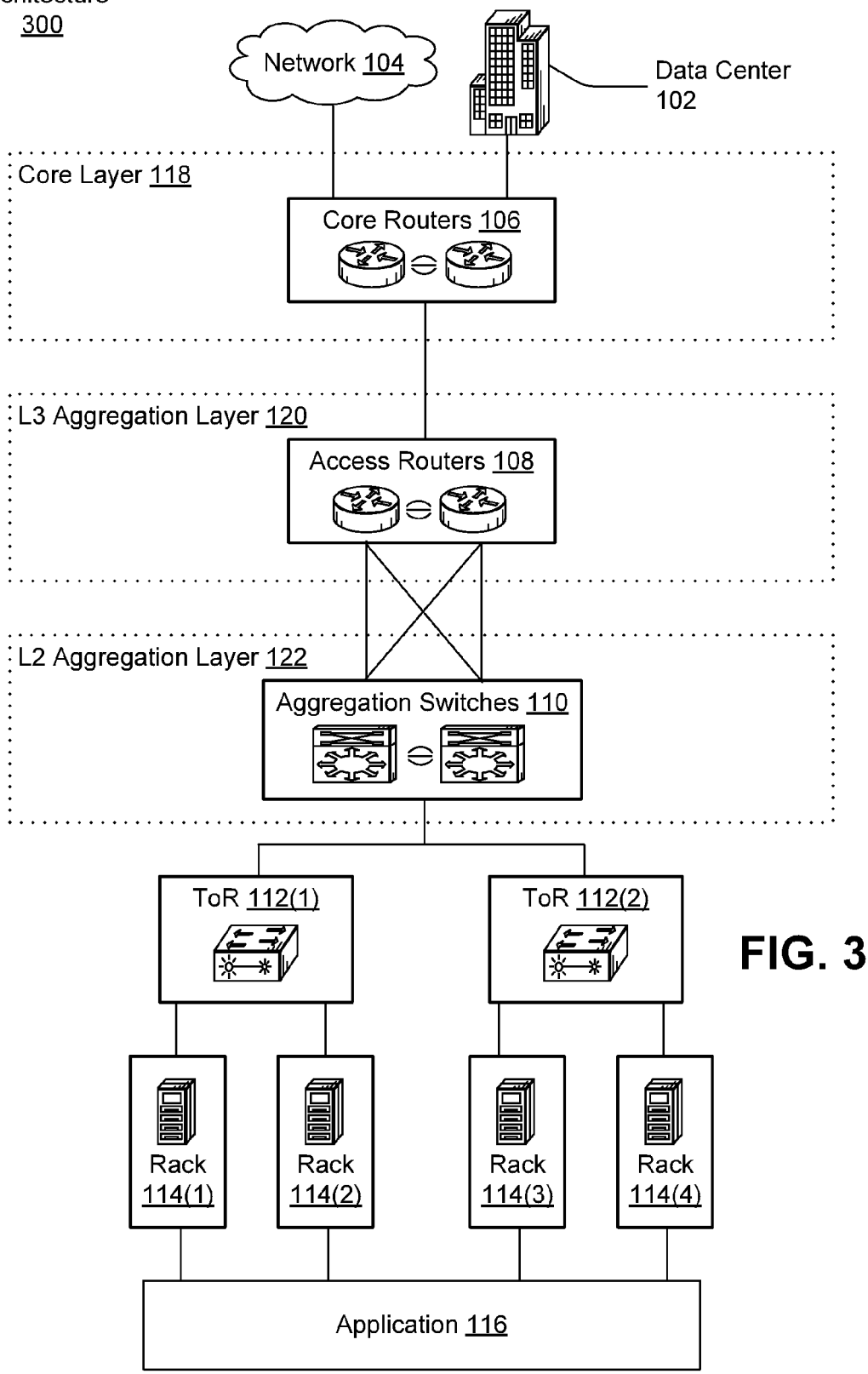

FIG. 3 illustrates an architecture 300, where data center 102 is in a different configuration to provide redundancy at both the L3 aggregation layer 120 and the L2 aggregation layer 122. In FIG. 3, a pair of aggregation switches 110 are now deployed as a redundancy group at the L2 aggregation layer 122 and are coupled to the redundant pair of access routers 108 in L3 aggregation layer 120. Thus, the difference between the network stamp of application 116 in FIG. 2 and FIG. 3 is the addition of an additional aggregation switch 110 in a redundant configuration in FIG. 3. Again, the changes to the network stamp of application 116 can have different effects on the availability of application 116 depending on the extent to which various device failures may be correlated.

Note that, in the example of FIG. 3, each aggregation switch 110 is connected to both access routers 108 from the redundant pair. Thus, as long as at least one access router 108 at the L3 aggregation layer 120 and one aggregation switch 110 at the L2 aggregation layer 122 is functioning, traffic can pass between ToRs 112(1) and 112(2) and core routers 106. This change to the network stamp of application 116 can have different effects on the availability of application 116, as discussed more fully below.

For example, consider another hypothetical scenario where network 104, core routers 106, ToRs 112(1) and 112(2), racks 114(1)-114(4), and software of application 116 continue to exhibit perfect reliability and 100% availability. Furthermore, assume that, collectively, the redundant group of access routers 108 at L3 aggregation layer 120 provides perfect redundancy—at least one of the two devices in the pair is always functioning properly and can handle the application traffic should the other device fail. In this hypothetical, the only point of failure is at the pair of aggregation switches 110 in L2 aggregation layer 122.

The "zero redundancy" hypothetical mentioned above with respect to the introduction of redundancy at the L3 aggregation layer 120 also applies to the redundant L2 aggregation layer 122 shown in FIG. 3. That is, if the individual aggregation switches in the redundant pair always fail together, there is no benefit to having multiple aggregation switches. Likewise, the "perfect redundancy" hypothetical also applies, e.g., if the individual aggregation switches 110 never fail together and can handle each other's application traffic, the availability of application 116 is 100%.

Moreover, note also that failures may occur at multiple layers and whether these failures tend to co-occur can affect the availability of application 116. Continuing with the hypothetical, assume that both the redundant pair of access routers 108 and the redundant pair of aggregation switches 110 exhibit 90% availability, e.g., 10% downtime. In other words, both access routers in the redundant pair are down 1 out of every 10 hours on average, and both aggregation switches in the redundant pair are down 1 out of every 10 hours. Note that, in a best-case hypothetical scenario, the failures of the redundant pairs at the L2 and L3 layers always occur together. Thus, the availability of application 116 is still 90%, because the failures always co-occur. In a worst-case scenario, the failure of the L2 layer may never co-occur with the L3 layer. In this case, the availability of application 116 is 80%, i.e., for every 10 hours of operation, one hour is lost to failure of the redundant aggregation switches at L2 and another is lost to the failure of the redundant access routers at L3.

For similar reasons as already discussed, neither the best-case scenario nor worst-case scenario is likely. Rather, sometimes the redundant pair of access routers will fail at the same time as the redundant pair of aggregation switches, and other times both devices in one pair will fail whereas at least one device in the other pair will continue functioning. Assuming statistical independence, the expected availability is 0.9*0.9 or 0.81 (81%). Since failures may or may not be statistically independent, some implementations may consider the extent to which failures at one layer may be correlated to failures at other layers when characterizing the service level of application 116.

System Example

Figure 4:
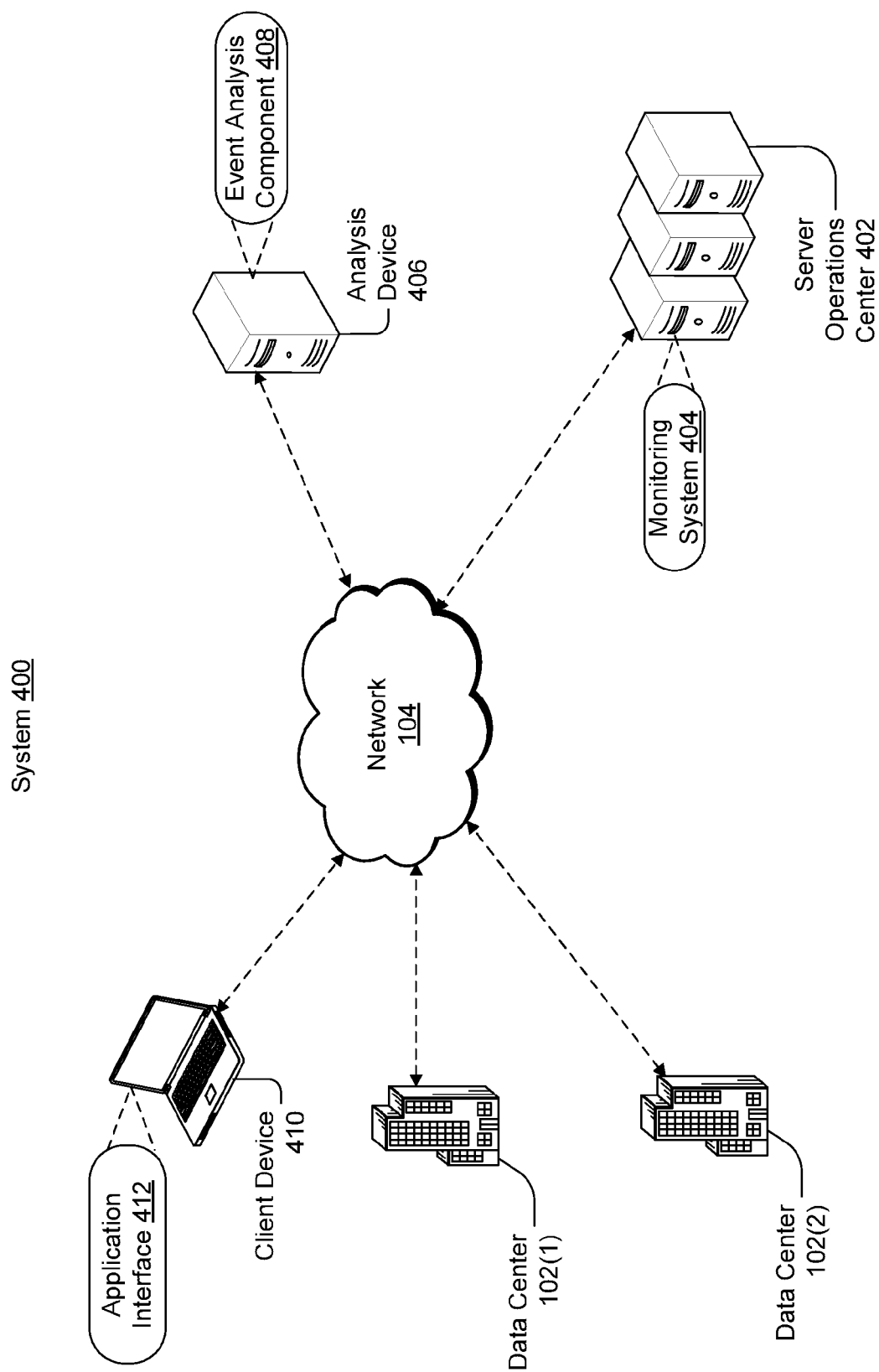
FIGS. 4 and 19 show example systems in which the present concepts can be employed.

FIG. 4 shows an exemplary system 400 that is consistent with the disclosed implementations. As shown in FIG. 4, system 400 includes network 104 connecting numerous entities, including a data center 102(1) and a data center 102(2), a server operations center 402 having a monitoring system 404, an analysis device 406 having an event analysis component 408, and a client device 410 having an application interface 412.

Network 104 can include various wired and/or wireless networks and combinations thereof. For example, network 104 can include the public Internet as well as various private networks or portions thereof that connect any of the devices/data centers shown in FIG. 4. For the purposes of the following discussion, it is generally sufficient that network 104 provides connectivity between devices or data centers that share information.

Each data center 102 can be configured as discussed above with respect to any of FIGS. 1-3, or in other suitable configurations. Client device 410 can interact with application 116 by communicating over network 104 with either data center 102(1) or data center 102(2). Application interface 412 can include logic for communicating with application 116, e.g., formatting functionality, display functionality, etc. For example, client device 410 can be employed by an end user that wishes to use various features made available by application 116.

Server operations center 402 can generally include one or more server devices configured to monitor the individual data centers for network problems. For example, monitoring system 404 can execute on the server devices to monitor data centers 102(1) and 102(2). In some implementations, network operators (e.g., network engineers) at server operations center 402 may attempt to resolve issues on either data center, and can track the issues using support tickets, diaries, or other techniques.

Event analysis component 408 of analysis device 406 can be configured to analyze various events in one or more data centers, e.g., to characterize the service level of various applications located at data center 102(1), 102(2), or both. The event analysis component can also be configured to characterize the service level of one or more network devices at one or both data centers. Generally speaking, the event analysis component 408 can be configured to analyze various events as well as support tickets and other data to characterize the service levels of applications and/or devices.

Note that the various devices shown in system 400 are illustrated with respect to logical roles that can be performed by the devices in operation of system 400. However, the geographical locations of the various devices are not necessarily reflected by system 400. For example, data centers 102(1) and/or 102(2) may be collocated with server operations center 402 and/or analysis device 406. As another example, the event analysis component 408 and/or monitoring system 404 can be implemented on one or more devices inside an individual data center, e.g., on one or more of server racks 114.

Furthermore, note that FIG. 4 illustrates server operations center 402 as multiple server devices whereas analysis device 406 and client device 410 are illustrated as individual computing devices. This reflects one particular implementation, and other implementations may provide characterization functionality and/or client functionality as discussed herein via multiple devices. Likewise, server operations center and/or data center functionality as discussed herein may be performed by individual devices.

In addition, functionality described herein with respect to a particular device or devices can be distributed across multiple devices or combined on a single device. For example, monitoring system 404 and event analysis component 408 can be collocated at a server operations center on a single device or multiple devices. As another example, the event analysis component and/or monitoring can be employed on a device at one or both data centers of system 400.

Further note that, in practice, there may be additional instances of each computing device mentioned herein, e.g., additional analysis devices, server operations centers, client devices, and data centers. As discussed in more detail below, each of the computing device(s) shown in FIG. 1 can include one or more processing devices, such as computer processors, executing instructions stored on one or more computer-readable storage media such as volatile or non-volatile memories, optical disks, hard drives, flash drives, etc.

Monitoring System

The monitoring system 404 on server operations center 402 can generally serve to obtain various data relating to the operation of data centers 102(1) and 102(2). The obtained data can be provided to event analysis component 408 for further processing, as discussed in more detail below. For example, the data obtained by the monitoring system can include events, trouble tickets, maintenance data, and traffic data.

With respect to events, the monitoring system can accept event log streams (e.g., from syslog) and can perform functions such as reformatting and filtering event data based on rules and routing messages to any installed rule engines or archival log files. For example, the event logs can be obtained from, and include events generated by, network devices such as core routers 106, access routers 108, aggregation switches 110, and/or ToRs 112 as well as various other network devices (firewalls, load balancers, etc.). The events in the event logs can contain information about what type of network component experienced an event, the event type, the other end-point of this component (e.g., the one-hop directly-connected neighbor), and a short machine-generated description of the event.

The monitoring system 404 on server operations center 402 can also obtain trouble tickets or data related to trouble tickets. For example, network operators may troubleshoot network faults through problem tracking systems or "ticketing" systems that coordinate among network operators working on the problem. Some troubleshooting systems can be built around a Request for Comments memo (e.g., RFC 1297) containing specifications for trouble ticket systems for network operations centers ("NOCs" such as server operations center 402). In such a case, a (possibly unique) identifier herein referred to as NOC TicketID is assigned to each failure event. These tickets contain structured information about when and how an event was discovered and diaries of steps taken by the network operators in troubleshooting and mitigating the problem.

The monitoring system 404 on server operations center 402 can also obtain maintenance data. For example, network operators can use a maintenance tracking and revision control system to track activities that can change the network such as device provisioning, configuration changes, and/or software upgrades throughout the system 400. The maintenance tracking and revision control system can be features of the monitoring system 404 or a separate system. Before debugging an outage, a network operator can check the maintenance tracking system for on-going and planned maintenance. The network operator can use the revision control system to detect any recent changes to the device configuration files. Maintenance data obtained from the maintenance tracking and revision control system can reflect the device provisioning, configuration changes, and/or software upgrades.

The monitoring system 404 on server operations center 402 can also obtain traffic data. For example, traffic carried on network interfaces (links) can be logged using Simple Network Management Protocol ("SNMP") polling that averages traffic seen every five minutes, for example. Other sources of traffic data can be obtained from sampling based approaches such as sFlow. Traffic monitoring systems can use the MIB format to store the data that includes fields such as the interface type (token ring, Ethernet etc.), the other end of the interface, the interface status (up/-down), timestamp, and/or the number of bytes sent or received by the interface, among others.

Using the monitoring system 404 as described above, the server operations center 402 may allow network operators to monitor status of the data centers 102(1) and 102(2) for various failures, e.g., a failed router, improper device configuration, slow response times, etc. Individual events obtained by the monitoring system can be processed to characterize service levels of applications and/or devices as discussed in more detail below.

Event Analysis Component

Event analysis component 408 can utilize event logs obtained by the monitoring system 404 to characterize application and/or device service levels. For instance, additionally or alternatively to the event logs obtained from the monitoring system, the event analysis component can utilize data collected by network operators. For example, network operators can detect faults from network devices and analyze root causes by using monitoring alarms, such as syslog and SNMP traps, and by monitoring device status via ping and SNMP polling. The event analysis component can obtain other device-related data to use in analyzing service levels of both applications and devices, including trouble tickets, maintenance data, and traffic data.

Event analysis component 408 can correlate the above mentioned data with failure events in the event logs to extract failures impacting network traffic and to reverse-engineer the topology information using link-level connectivity as the topology changes from time-to-time. As used herein, a failure can be thought of as an event that causes a device or a link to be unavailable to perform its intended task (e.g., carry traffic). Specifically, a link failure can be thought of as occurring when the connection between two devices is down. Similarly, a device failure can be thought of as occurring when the device is not functioning for routing/forwarding traffic.

Some implementations of event analysis component 408 can filter several types of spurious network events in event logs, such as inaccurate event logs, duplicate events caused by multiple devices reporting the same event, single events being recorded as multiple events, and "shadow" reports (e.g., chatty devices). In regard to inaccurate event logs, syslog messages can be spurious with devices sending multiple notifications that are logged as failure events even though a device is operational. In regards to multiple reporting devices, two or more devices (e.g., neighbors) may send notifications for the same event that are logged as separate events leading to redundant event logs (e.g., multiple redundant error reports). The error reports can be thought of as redundant if subsequent error reports relate to an error that was reported by an earlier error report. Regarding a single event being recorded as multiple events, a flapping device can generate multiple down and up messages which each get logged as different events.

Shadow events can be thought of as events being triggered due to devices which are being scheduled for replacement or have been detected as faulty by operators but which are awaiting repairs. In some cases this effect can be severe with some devices (e.g., "chatty" or "shadow" devices) sending more than a thousand device down notifications over a few hours because the notification system did not suppress them during the troubleshooting window. Techniques that the event analysis component 408 can employ to filter several types of spurious events from network event logs are described in more detail below. The filtered network event logs can be used by the event analysis component to characterize application and/or device service levels as discussed herein.

Specific Event Analysis Component Implementation

Figure 5:
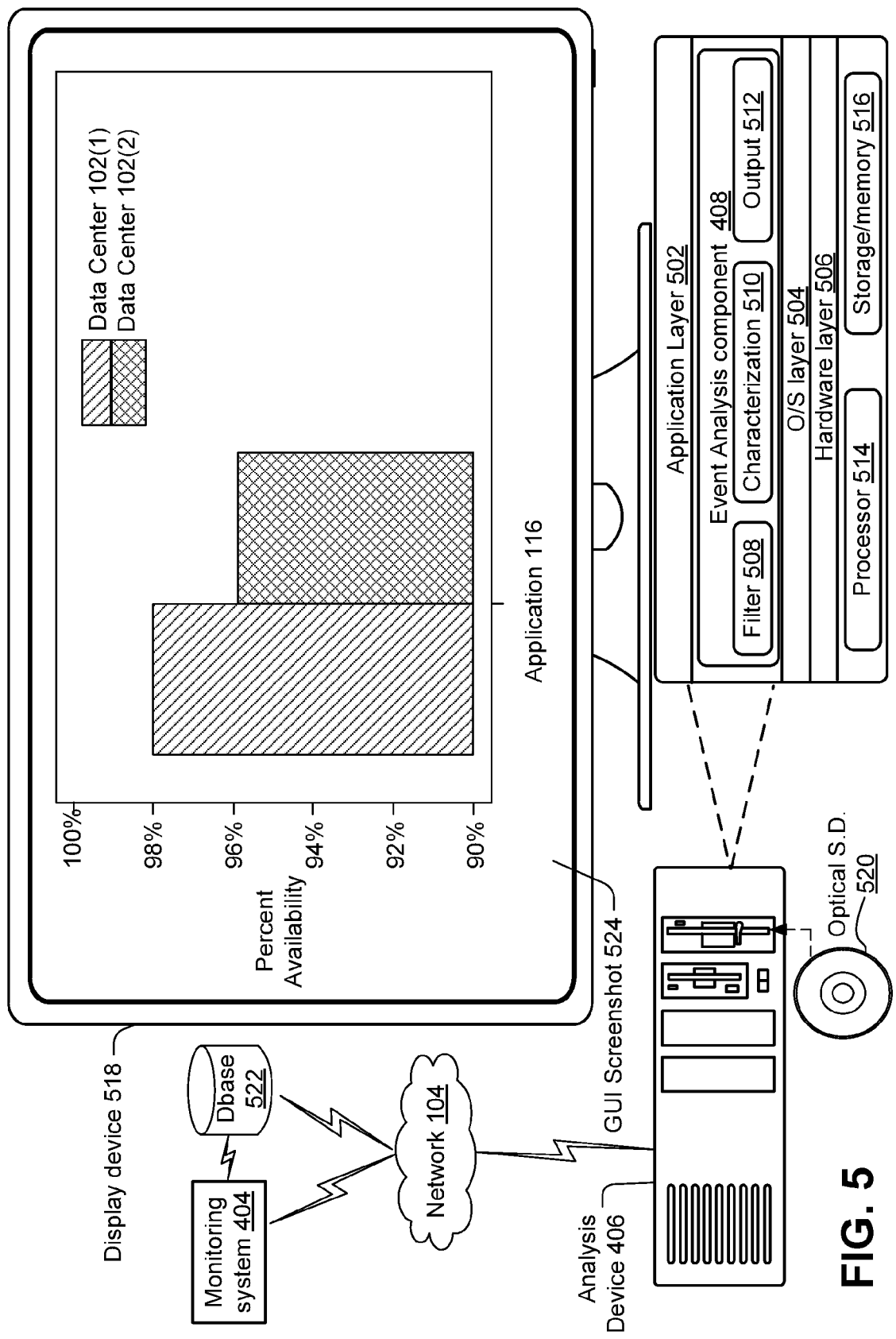
FIGS. 5 and 12 show examples of computers or computing devices that can be configured to accomplish certain concepts in accordance with some implementations.

FIG. 5 shows event analysis component 408 embodied on analysis device 406. The analysis device is one example of a system that can be configured to accomplish certain concepts, as discussed in more detail below. In this case, the analysis device is illustrated as a desktop computer. The terms "computer" or "computing device" are used interchangeably, and as used herein can mean any type of device that has some amount of processing capability. While specific examples of computers are illustrated for purposes of explanation, other examples of such computers can include traditional computing devices, such as personal computers, any of the devices introduced relative to FIGS. 1-4, cell phones, smart phones, personal digital assistants, or any of a myriad of ever-evolving or yet to be developed types of devices. Further, a system can be manifest on a single computing device or distributed over multiple computing devices.

In this case, analysis device 406 can include an application layer 502, an operating system layer 504, and a hardware layer 506. The event analysis component 408 can be manifest as a program or application of the application layer 502, among other configurations. In this example, the event analysis component can include a filter module 508, a characterization module 510, and an output module 512. The event analysis component can process data, such as event logs, provided over network 104 by monitoring system 404. Alternatively, monitoring system 404 can populate a database 522 with event data and the event analysis component can process the event data in the database.

The hardware layer 506 can include a processor 514, storage/memory (e.g., one or more computer-readable storage media) 516, a display device 518, and/or various other elements. For instance, the other elements can include input/output devices, optical disc readers, USB ports, etc.

Processor 514 can execute computer-readable instructions to provide a functionality, such as an event analysis component functionality. Data and/or computer-readable instructions can be stored on storage/memory 516 and/or received from another source, such as optical storage device 520. The storage/memory 516 can include any one or more of volatile or non-volatile memory devices, hard drive storage devices, flash storage devices (e.g., memory sticks or memory cards), and/or optical storage devices (e.g., CDs, DVDs, etc.), among others.

Alternatively to the illustrated configuration of analysis device 406, the computer can employ a system on a chip (SOC) type design. In such a case, functionality provided by the computer can be integrated on a single SOC or multiple coupled SOCs. For instance, the computer can include shared resources and dedicated resources. An interface(s) can facilitate communication between the shared resources and the dedicated resources. As the name implies, dedicated resources can be thought of as including individual portions that are dedicated to achieving specific functionalities. Shared resources can be storage, processing units, etc., that can be used by multiple functionalities.

Generally, any of the functions described herein can be implemented using software, firmware, hardware (e.g., fixed-logic circuitry), manual processing, or a combination of these implementations. The term "engine," "tool," "component," or "module" as used herein generally represent software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable storage/memory devices, such as computer-readable storage media. The features and techniques of the component are platform-independent, meaning that they may be implemented on a variety of commercial computing platforms having a variety of processing configurations.

As used herein, the term "computer-readable media" and "computer-readable medium" can include signals and hardware. In contrast, the terms "computer-readable storage media" and "computer-readable storage medium" exclude pure signals. Computer-readable storage media can include "computer-readable storage devices". Examples of computer-readable storage devices include volatile storage media, such as RAM, and non-volatile storage media, such as hard drives, optical discs, and flash memory, among others.

In some implementations, the filter module 508 can be configured to perform functionality relating to separating duplicate events from a remainder of events in one or more event logs. The filtered events can result in a sub-set of germane events that are used as a dataset for characterizing device or application service levels. The characterization module 510 can be configured to perform functionality relating to characterizing current or future service levels of individual network devices and/or applications at data centers 102(1) and/or 102(2). For example, the characterization module can be configured to characterize the service levels using individual events from the filtered sub-set of events as well as ticket data, maintenance data, and/or traffic data. The characterization module can infer relationships between the ticket data, maintenance data, and/or traffic data and the events based on time of occurrence, date of occurrence, duration of occurrence, physical location, type, property, configuration setup, and/or functional role of the involved devices. The output module 512 can be configured to output results of the characterizing. The output results can include values reflecting the characterized service levels (e.g., a percentage availability of a device or application). The output results can also identify various devices or device groups that tend to fail together, e.g., "risky" devices or device groups.

In the example of FIG. 5, the output module 512 can generate GUI screenshot 524 by obtaining data from monitoring system 404 and/or database 522. As mentioned, database 522 can be populated by the monitoring system and can include events from one or more data centers. Events obtained from, or relating to one or more data centers can be thought of as a dataset that is evaluated by the event analysis component 408. The event analysis component can separate individual events relating to network devices and links connecting these devices from those of other data center devices. The event analysis component can also determine the network stamp of an application, e.g., on a data center-by-data center basis and characterize the service level of the application based on the service levels of individual devices in the network stamp.

The GUI screenshot 524 shown in FIG. 5 can be generated by the event analysis component 408 from the dataset. GUI screenshot 524 illustrates that, at data center 102(1), application 116 has approximately 98% availability. At data center 102(2), application 116 has approximately 96% availability. The event analysis component 408 can infer these percentages using the individual network stamps of application 116 at the individual data centers, as discussed in more detail herein, including the various hypothetical examples. In other words, FIG. 5 illustrates a configuration where the network stamp of application 116 at data center 102(1) has 98% availability whereas the network stamp of application 116 at data center 102(2) has 96% availability.

To summarize, several features that can be offered by the event analysis component 408 are described above and below. These features can include characterizing device and/or application service levels. Another feature, discussed in more detail below, can involve identifying risky redundancy groups, e.g., redundancy groups of one or more devices that tend to fail together instead of individually. A further feature can involve evaluating the effectiveness of redundancy when a redundancy group has multiple devices and also evaluating the effectiveness of redundantly hosting an application at multiple data centers. These features are described in more detail below.

Event Filtering

Figure 6:
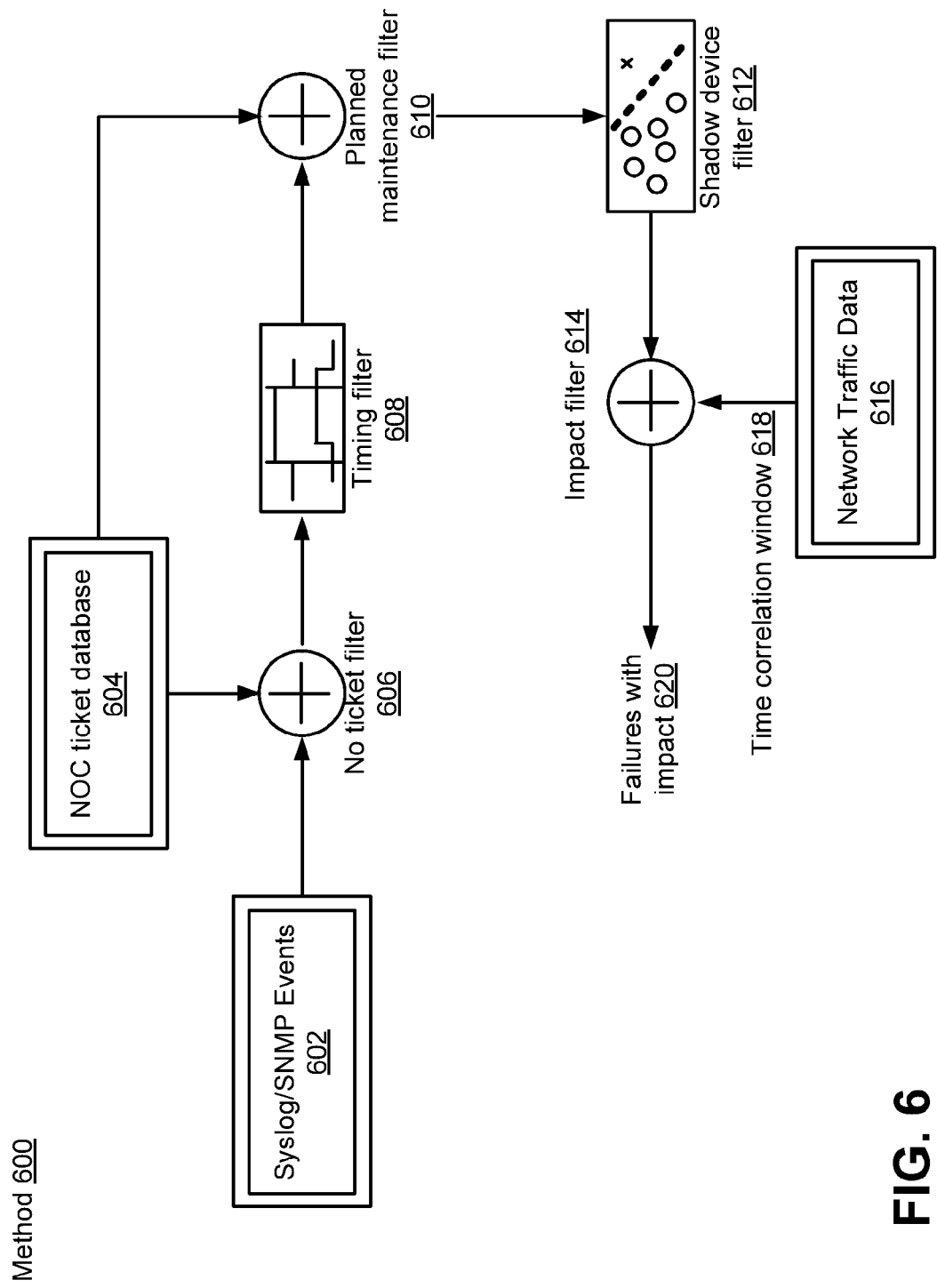
FIGS. 6, 7, 10, 13, 15, and 17 are flowcharts for accomplishing certain concepts in accordance with some implementations.

As mentioned above, some implementations employ filtering of events from event logs to obtain a dataset that can be used to characterize service levels of applications and/or devices. FIG. 6 shows a filtering method 600 for separating a sub-set of germane events from less informative events from a set to obtain a sub-set. This method can utilize events from various sources. In this case, the events can be manifest as Syslog/SNMP events 602 and can be filtered using tickets from a NOC ticket database 604. In this implementation, obtained events that do not have an associated NOC ticket can be removed by a "no ticket" filter at 606. This filter can be based upon the assumption that if an event was not dealt with by an operator, then it is likely that the event did not cause an impact. Thus, filter 606 can filter events based on associated ticket criteria relating to whether the events have associated NOC tickets.

The method can employ a timing filter 608 that filters events using timing-related criteria. The timing filter can be used to fix various timing inconsistencies. In one implementation, the timing filter can first group events with the same start and end time originating on the same interface into a single event. This process can remove duplicate events. Next, the timing filter can pick the earliest start and end times of multiple events that originated within a predefined time window on the same interface. For example, any events that happened within a predefined time of 60 seconds on the same interface can be grouped into a single event (e.g., characterized as a single event). This process can reduce or avoid any problems due to clock synchronization and log buffering. The timing filter can also be used to group two events using interface criteria, e.g., by identifying events that originate on the same interface. For example, events that have the same start time but different end times can be grouped into a single event that is assigned the earlier of the end times. The earliest end times can be utilized since events may not be marked as cleared long after their resolution.

The technique can employ a planned maintenance filter 610 that applies planned maintenance criteria. Events caused by planned maintenance can have less value in understanding device behavior than unplanned events (e.g., unexpected outages). Thus, the planned maintenance filter can remove events that are caused by planned maintenance activities.

The technique can employ a shadow device filter 612. The shadow device filter can apply shadow device criteria to filter events logged by devices that are scheduled for replacement or that have been detected as faulty by operators but are awaiting repairs. The shadow device filter can identify these shadow devices by arranging the devices in the descending order of their number of failures. In one implementation, for a top percentage of the devices in this list, all events are merged that have the same "NOC TicketID" field. This constitutes a merged event reflecting individual events with the same ticket ID that are likely to have the same symptoms. In one case the top percentage is defined as the top five percent, but other values can be employed in other implementations.

The technique can employ an impact filter 614 that applies impact criteria to filter events. An event can be defined as having an impact when the event affects application reliability e.g., throughput loss, number of failed connections or increased latency. In implementations without access to application-level logs, failure impact can be estimated by leveraging network traffic data 616 and computing the ratio of the median traffic on a failed device/link during a failure and its value in the recent past. For example, the value of the recent past can be set as the preceding eight-hour (or other duration) time correlation window 618. Other implementations can use other values. A failure has impact if this ratio is less than one, or another (e.g., lower) threshold on the ratio can be used. The above acts can collectively allow method 600 to identify the failures with impact at 620. Note that other filters can alternatively or additionally be utilized.

Characterizing Application Service Level

Figure 7:
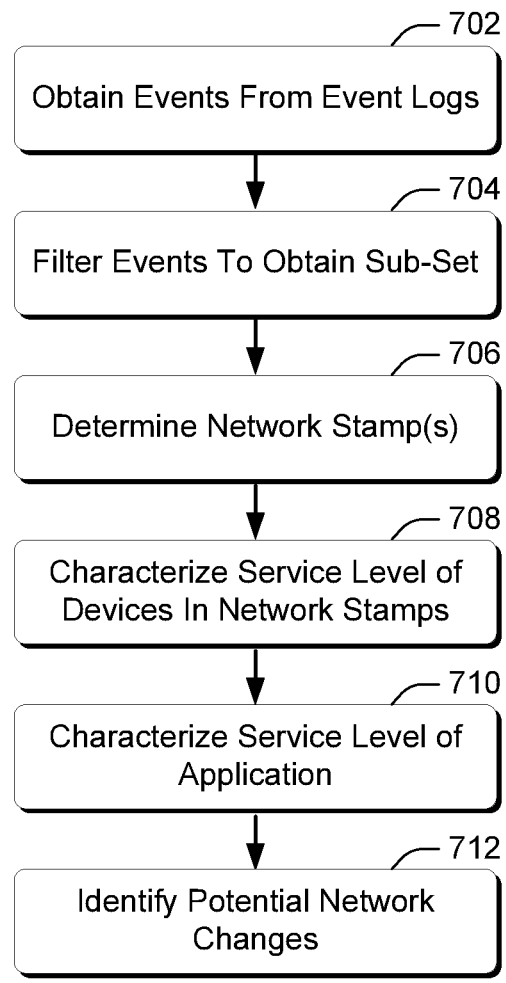

As mentioned above, some implementations may characterize the service level of an application hosted at one or more data centers. FIG. 7 shows a method 700 that can be applied in this context. For example, method 700 can be performed by event analysis component 408 to characterize the service level of an application.

At block 702, the method can obtain a set of events logged at one or more data centers. In one implementation, the set of events can be obtained from a data center monitoring system or from a database that stores the set of events on behalf of the data center monitoring system. The events can reflect failures by one or more network devices in the one or more data centers.

At block 704, the method can filter the events using one or more criteria. For example, the method can separate spurious and duplicate events to obtain a filtered sub-set of the events using method 600. In one implementation, the separating can be accomplished by applying a pipeline of event filters to the set of events to generate the filtered sub-set of the events. In some cases, the pipeline can be created by selecting individual filters from a set of available event filters. The individual event filters may each apply different criteria to filter different events to create the filtered sub-set.

At block 706, the method can determine one or more network stamps of an application. For example, each data center hosting an application can have an individual network stamp. In some cases, block 706 can include processing the filtered sub-set of events to determine the network stamp of the application in the data centers.

At block 708, the method can characterize the service level of one or more network devices in the network stamps. For example, the method can characterize the availability, reliability, and/or traffic loss of an individual access router, aggregation switch, etc. In addition, the method can characterize the service levels of the one or more network devices by characterizing the service level of a redundant group that includes multiple network devices.

At block 710, the service level of the application can be characterized using the service levels of the network devices, e.g., the service levels of individual devices and/or redundant groups of devices in the network stamp(s) where the application is hosted. In implementations where the application is hosted on a single data center, the service level can be the availability of the network stamp at the single data center. In implementations where the application is hosted on multiple data centers, the service level can be a function of availability of the application on each of the multiple data centers. Some implementations may assume statistical independence of the availability of the application on different data centers.

At block 712, the method can identify potential network changes relating to the application or network devices. For example, the method can identify a redundant configuration for the application based on one or more criteria, e.g., hosting the application at multiple data centers, adding a new redundancy group to a given layer of a network stamp, etc. As another example of a network change, the method can identify a suggested change to the ToR connectivity of one or more aggregation switches. In some implementations, the suggested change can be identified to meet a constraint, such as a service level agreement ("SLA") defined metric relating to reliability, availability, traffic loss, etc.

Note also that cost can be used as criteria for identifying potential network changes. For example, cost in terms of currency, time, resources, etc., can be determined for each potential change. For example, hosting an application at a new data center may cost approximately $10,000,000 and be expected to increase network availability of the application from 90% to 99.9%. Merely adding a redundant device to a data center where the device is already hosted may cost approximately $10,000 and be expected to increase network availability of the application from 90% to 99%. Depending on the specific requirements for application availability, either approach may be appropriate.

Further implementations may recommend one or more of the identified potential network changes using a cost-benefit analysis. For example, some implementations may recommend the least expensive potential network change that is expected to meet a given constraint such as an SLA requirement while excluding other potential network changes that are not expected to meet the constraint. Other implementations may rank various potential network changes on a cost-per-unit of availability (or reliability) expected to be obtained by making the respective network changes. A top-ranking subset can be recommended while discarding other, less cost-efficient possible changes. Additionally, some implementations may fix a cost budget and select one or more recommended changes that meet the cost budget. The recommended potential changes can include those changes that meet the cost budget and tend to maximize the expected service level. Other potential changes that do not meet the budget can be excluded from the recommended potential changes.

Network Topology

Note that some implementations may focus the service level of the application from a network-stamp perspective. In other words, such implementations may disregard the consequences of application code failure and/or failure of servers or racks hosting the application, and instead focus on the service levels provided by the network devices used by the application to communicate with other devices outside the data center. However, further implementations may characterize the service level of the application based on both the service level of the network stamp(s) of the application as well as the service levels of the application code and/or hosting servers/racks. The following discussion focuses on characterizing application service levels from a network stamp perspective, e.g., "network service levels."

In some implementations, the network stamp of an application can be determined by considering the connections between the various devices in an individual data center. Considering the example of FIG. 8, which shows an architecture 800 where data center 102 is configured with a second application 802. Note that application 116 is shown as hosted on two server racks 114(1) and 114(2) connected by a single ToR 112(1) through pairs of redundant aggregations switches 110(1), access routers 108(1), and core routers 106. Application 802 is shown as hosted in a similar configuration but with a single aggregation switch 110(2) and a single access router 108(2), also note that application 802 is hosted on racks 114(3) and 114(4) and connected via ToR 112(2).

Figure 8:
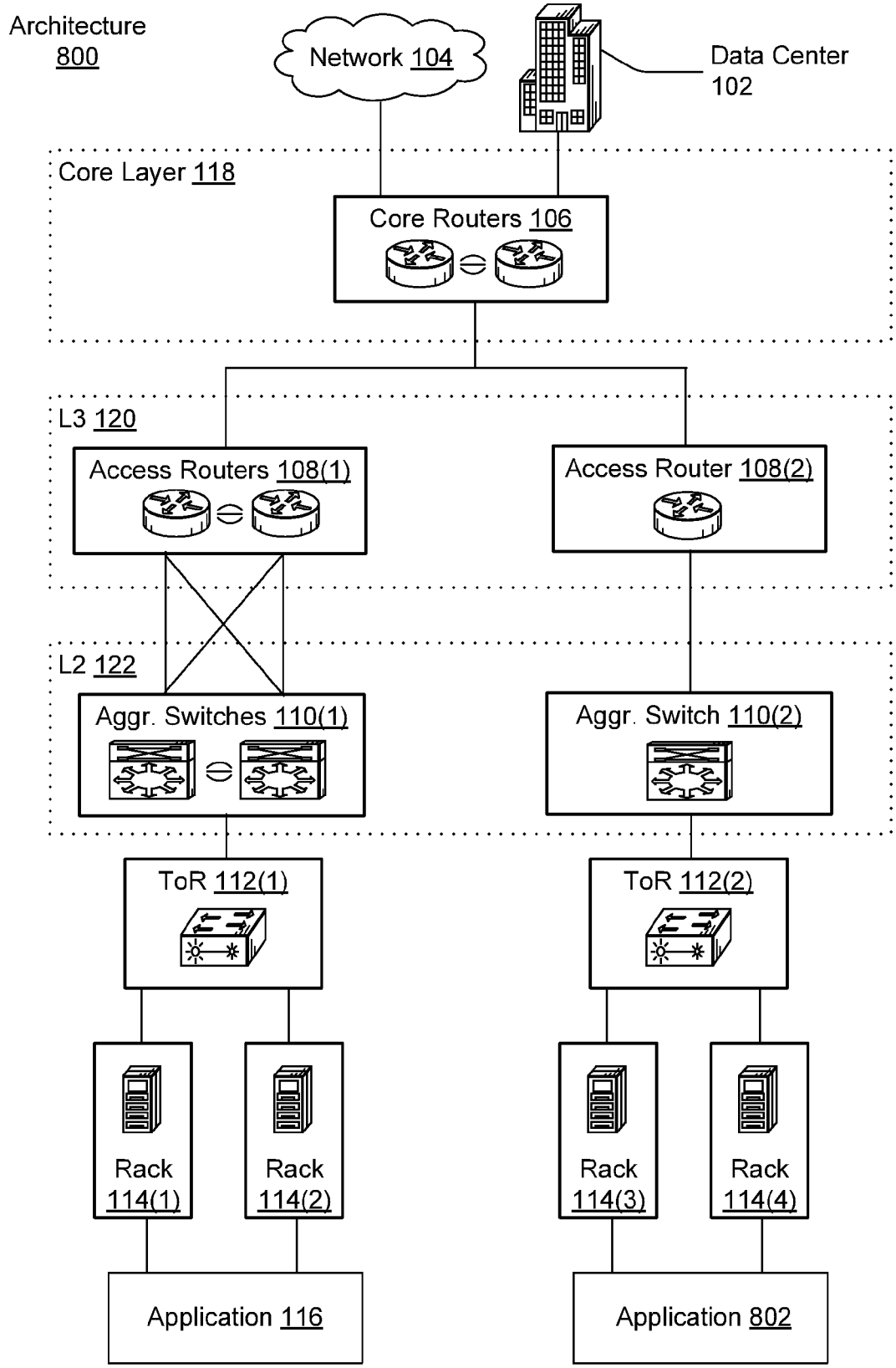

Note also that each application can be viewed as part of a common tree of devices that includes all of the devices in the data center. The individual application network stamps can include devices that are in different subtrees. In FIG. 8, application 116 has a subtree rooted at access routers 108(1) that is distinct from a second subtree rooted at access router 108(2) for application 802. The core routers are typically shared across multiple hosted applications and, therefore, in some implementations the core routers are not considered part of the application-specific network stamp.

In some implementations, a network operator can manually evaluate the physical and/or logical connections of the data center configuration to determine the network stamp of each application. For example, the network operator could identify ToR 112(1), aggregation switch pair 110(1), access router pair 108(1), and core router pair 106 as the network stamp of application 116. Likewise, the network operator could identify ToR 112(2), aggregation switch 110(2), access router 108(2), and core routers 106 as the network stamp of application 802.

In further implementations, application traffic can be leveraged to determine the network stamp of the application. For example, event analysis component 408 can evaluate traffic flows through the data center to determine through which devices application traffic flows (e.g., inbound or outbound network traffic). The event analysis component can also extract redundant device groups from the traffic by identifying individual devices that have common parents or children. For example, the event analysis component can infer from network traffic that individual aggregation switches of aggregation switch pair 110(1) are redundantly paired to ToR 112(1), because traffic to/from ToR 112(1) passes through both aggregation switches in the pair. As another example, since traffic from both aggregation switches 110(1) passes through both access routers 108(1), the event analysis component can infer that the access routers are redundantly paired with one another. The event analysis component can also infer that, since the network traffic from ToR 112(2) goes through single aggregation switch 110(2) and single access router 108(2), there is no redundancy for single aggregation switch 110(2) or single access router 108(2). Note that failure of a non-redundant device can cause the entire subtree rooted at the failed device to become unavailable due to loss of connectivity.

Some implementations may infer certain naming conventions that convey whether devices are redundantly paired. For example, access router pair 108(1) may include an individual access router named AR1_A and another individual access router named AR1_B. In contrast, individual access router 108(2) may be simply named AR2. In this instance, the naming convention suffix "_A" and "_B" imply two redundant devices that have the common prefix "AR1." Further implementations may infer redundancy by considering both traffic flows and redundancy.

Some implementations may also consider the connectivity of individual ToRs. For example, the service level provided by a given aggregation switch or access router may vary depending on how many ToR switches are connected (indirectly or directly) to the aggregation switch or router. Again, network operators can manually examine physical and/or logical connections in the data center to determine the number of ToRs that are connected to a given aggregation switch, and can also examine the number of ToRs connected to one or more aggregation switches in the subtree rooted at an individual access router. Some implementations may also infer the ToR connectivity or "ToR count" for aggregation switches and/or access routers by analyzing traffic data in a manner similar to that described above for identifying redundancy groups.

Characterization Metrics

Generally speaking, the disclosed implementations can characterize the service level of a device or collectively characterize the service level of a group of redundant devices. Filtered events can be grouped across several dimensions e.g., by individual device, redundancy group, device model, and/or device type, and metrics can be applied to measure the service levels using the grouped events. Exemplary metrics used to characterize the grouped events can include total outage time, traffic loss, and/or total tickets. The metrics can be computed using the filtered event data from one or more data centers.

In the case of total outage time, the event analysis component can determine the total outage time of an individual device in an additive fashion, e.g., summing the individual outage minutes for each event in the filtered data set. One example of a service level, availability, can be computed based on the total uptime of a particular device over a period, such as a year. Note that this is also true of redundancy groups, e.g., the availability of a redundancy group can be calculated without calculating the availability of individual group members by considering the total outage time of the redundancy group as a whole. This can also be done for device types, e.g., the average availability of access routers as a whole can be computed based on the total uptime of multiple (e.g., all) devices of a particular type. Similar processing can be performed for individual device models (e.g., a brand X model Y access router), the average availability of the model can be computed as the total outage minutes for all of the devices of that particular model divided by the total expected operational time of all of the devices of that particular model.

In the case of traffic loss, several equations can be used. The estimated average of median traffic loss per event for a device can be defined as:

$$\frac{\sum_{\forall \text{ events}} ((\text{traffic.before}_{median} - \text{traffic.after}_{median}) * \text{Failure Duration})}{\text{Total Events Contributed By Device}}$$

Here, the equation implies that the estimated average of median traffic loss of a given device per event can be represented by the sum, over all events, of the difference in median network traffic before and after an event multiplied by the duration of the failure, divided by the total events contributed by the device to normalize the loss on a per-event basis. To obtain this value, the median traffic before and after each event can be computed to determine the median traffic loss, and then the median traffic loss can be averaged for a given event. Note that, in this context, the term "event" can refer to any individual failure episode, and can refer to a single or multiple individual device and/or link failures that collectively relate to the event.

The estimated median traffic loss for a given device per day can be defined as:

$$\sum_{\forall \, events \, \in d} (\text{traffic.before}_{median} - \text{traffic.after}_{median}) * \text{Failure Duration}$$

Here, the equation implies that the loss for the device in a day is the sum, for each event associated with that device on that day, of the difference in median traffic before and after the event multiplied by the duration of the failure. Note also that traffic flow can be aggregated (e.g., summed) across links or devices in a redundant group.

For a given device model, the percentage of traffic lost by that device model can be computed as:

$$\frac{\text{Traffic Lost}}{\text{Traffic Carried}} * 100 = \frac{\text{Traffic Lost}}{\text{Throughput} * \text{Time}} * 100$$

where throughput is packets per second or bytes per second and Time is the total duration over which the calculation is performed.

In the case of total tickets, the number of total tickets for a given individual device, redundancy group, device type, or device model can be computed in a relatively straightforward fashion from the filtered events. For example, each filtered event can identify a single failed device or multiple failed devices (e.g., for merged events). The number of tickets (e.g., unique tickets) for that particular device can be computed in an additive fashion. Similarly, for a redundancy group, the number of tickets identifying at least one device from the group can be computed in an additive fashion. For a device type (e.g., access router) the number of tickets identifying any access router can be computed in an additive fashion. For a device model, (e.g., brand X model Y access router), the number of tickets identifying a particular model can be computed in an additive fashion. This concept is readily extensible to other concepts related to service levels, e.g., total downtime for a platform or group of devices can be another appropriate metric.

Using the above metrics, device service levels can be characterized and the service level of an application can be computed using the service levels of the individual devices/redundancy groups in the network stamp(s) of the application. Further implementations may consider other network configuration aspects, e.g., device properties, connectivity, etc.

Device properties for a network device can reflect configuration parameters, software or firmware revisions, the particular application that is communicating through the device, etc. Some implementations can calculate individual metrics on a property-by-property basis to capture how different device properties may influence service levels. For example, the availability of access routers having a particular model with a particular software/firmware revision can be determined. As another example, the availability of aggregation switches used to route traffic from a search application can be determined, and may be different than the availability of similarly-configured aggregation switches that route traffic for a different application (e.g., cloud storage).

Some implementations may also consider device connectivity or capacity and determine the aforementioned metrics for different levels of connectivity. For example, assume up to 80 ToR switches can be connected to a single aggregation switch. Some implementations may characterize the traffic loss of an aggregation switch based on the number of connected ToRs. To the extent the ToR connectivity influences the traffic loss of the aggregation switch, such implementations may uncover this relationship. This can also be the case at other layers, e.g., the number of aggregation switches connected to a given access router can be considered as well. Also note that this processing can be performed across multiple layers, e.g., some implementations may characterize service levels of access routers based on the total number of connected ToRs in the subtrees rooted at the access routers.

Numerical Examples

Referring back to FIG. 8, the following will introduce some simple numerical examples to elaborate on the concepts expressed above. As with the previous hypotheticals, unless otherwise indicated, assume all devices shown in FIG. 8 exhibit 100% availability. Considering application 802, note that a failure at either aggregation switch 110(2) or access router 108(2) causes the entire subtree rooted at the failing device to lose connectivity. For the purpose of this hypothetical, assume the access router 108(2) has 90% availability. Thus, the availability of application 802 in this instance is computed as 90%, since the only point of failure has 90% availability.

Now, consider application 116 and again assume only the access routers have any failures and have availability of 90%, or the probability of a failure at any given time is 10%. Since access routers 108(1) are employed in a redundant group, assuming statistical independence, the probability of a co-occurrence of failures is $(0.1)^n$, where n is the number of redundant devices in the group. In the example shown, there are two devices, so the probability of both devices failing is 0.01. Thus, deploying the access routers in a redundant pair results in 99% availability.

Given the above, one way to use ticket counts is to represent devices or device families (e.g., a particular model number) using an ordered tuple <availability, ticket count, traffic loss>. For device families, the ticket counts can be aggregated for each individual device from a given family. The tuples can be compared using lexicographic ordering e.g., if availabilities are the same or similar, then the device family with the lower ticket count is preferred because it implies that the number of impactful failures is smaller. Similarly, the traffic loss can be used for comparison–relatively small loss is preferred over device families (platforms) which cause high traffic loss during outages. Conversely, device families with high ticket counts and/or traffic loss can be considered "risky" device families. These risky families can be identified by lexicographically ordering device families based on ticket count/traffic loss and selecting the device families with high ticket counts/traffic loss. Risky device families can also be identified by applying thresholds to ticket counts/traffic loss, e.g., device families having greater than a threshold ticket frequency or greater than a threshold percentage traffic loss can be considered risky. Similar analyses can be performed using other metrics, e.g., device failure rates, etc.

The previous examples illustrate how the event analysis component can characterize the service level of an existing network configuration. The event analysis component can also estimate the service level of a proposed configuration reflecting one or more changes to the network. For example, assume a configuration change is contemplated to remove a single router from access router pair 108(1). In this case, the event analysis component could estimate the availability of application 116, after the configuration change, as 90% (e.g., n=1). Alternatively, the event analysis component can estimate the availability of application 116 if another access router were added as 99.9% (e.g., n=3). Further implementations may account for the extent to which access router failures may be correlated (e.g, simultaneous, at least partially overlapping, or in temporal succession).

Note that this analysis can also extend to different devices or data centers, e.g., assume application 802 is hosted on a single data center with 90% availability. A potential network change could be to host application 802 on 3 identical data centers, each providing 90% availability. Assuming statistical independence of the data centers, the estimated availability of application 802 would be 99.9% if this change were made. Alternatively, if the individual data centers provide different estimated availability and are assumed to be statistically independent, the individual network stamps of the application at each data center can be evaluated independently and multiplied to obtain an estimated availability. This is the case provided the individual data centers have enough capacity to handle the full application traffic load when other data centers are unavailable.

In some implementations, the event analysis component can identify various network changes that can meet a particular constraint. One type of constraint is defined by a Service Level Agreement ("SLA"). For example, the operator of the data center may be contractually obligated to provide 99.8% availability for application 116. Recall that, in the example of FIG. 8, application 116 has 99% availability at a single point of failure, the redundant pair of access routers 108(1). In this example, the event analysis component could identify hosting application 116 at an additional data center as one potential change, because two data centers with 99% individual availability would be expected to provide 99.99% availability. Alternatively, the event analysis component could identify configuring a third access router with the pair of access routers 108(1) in a redundant configuration as another potential change that would meet the SLA-required availability for application 802. This is the case since each individual access router is expected to provide 90% availability, resulting in an expected availability of 99.9% (assuming statistical independence).

Figure 9:
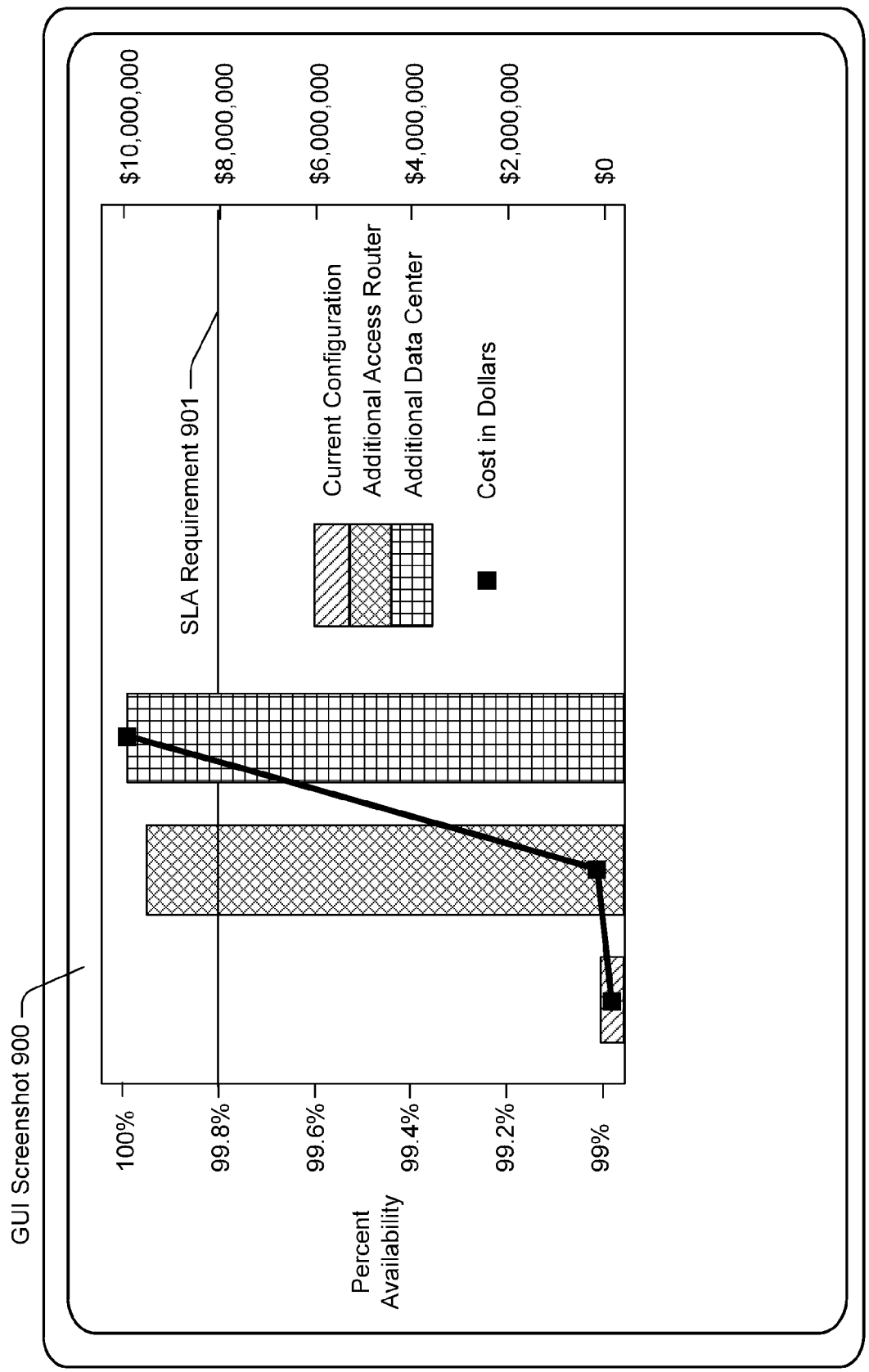
FIGS. 9, 11, 14A, 14B, 16A, 16B, 18A, and 18B show screenshots of graphical user interfaces that can be generated relative to certain concepts in accordance with some implementations.

FIG. 9 illustrates another GUI screenshot 900 that can be generated by the output module 512 of event analysis component 408. GUI screenshot 900 illustrates availability of application 116 in a current configuration at 99%, as well as availability of application 116 in the potential configuration with an additional access router as 99.9% and at an additional data center as 99.99%. GUI screenshot 900 also includes an SLA requirement 901, illustrated as a line reflecting the level of network availability defined by the SLA. Thus, a user viewing GUI screenshot 900 can see that, while the current configuration does not meet the SLA, the addition of a redundant access router to access router pair 108(1) will enable the network stamp of application 116 to meet the SLA, as would hosting the application at another identical data center.

Some implementations may also convey costs associated with the various potential configuration changes, e.g., adding currency, hourly, or other resource costs to GUI screenshot 900 for each potential change, e.g., on a secondary Y axis, textual representation, pie chart, etc. Some implementations may also represent the costs on a per-unit of availability basis, e.g., 1 additional "9" of availability (from 90% to 99%, 99% to 99.9%, etc.) is expected to cost a certain amount of resources. For example, FIG. 9 shows the cost in dollars for adding an additional data center is far higher than the cost to add an additional access router. In this instance, it may be appropriate to add the additional access router rather than add another data center, because both proposed configurations meet the SLA requirement and adding the access router is far cheaper.

Also note that some potential network changes may consider connectivity. For example, assume a different hypothetical where all of the devices except the aggregation switches exhibit 100% availability, and the availability of the aggregation switches varies with ToR connectivity. Specifically, consider an example where aggregation switches connected to 50 or fewer ToRs exhibit 90% availability and aggregation switches connected to 51 or more ToRs exhibit 80% availability. Now, assume that the network stamp of application 802 includes a total of 80 ToRs and two non-redundant aggregation switches, the first of which has 60 connected ToRs and the second of which has 20 connected ToRs. In this example, the event analysis component can compute estimated availability of 80% for the first aggregation switch and 90% for the second aggregation switch. Assuming statistical independence, the estimated availability for the subtree is 98% in this configuration. The event analysis component 408 can identify a potential change to move at least 10 of the connected ToRs over to the second aggregation switch, since this would not change the estimated availability of the second aggregation switch and would increase the estimated availability of the first aggregation switch to 90%, for a subtree with an estimated 99% availability. This is the case provided there remains sufficient capacity in place for any application from which the ToRs are moved.

Risky Devices

In the hypothetical examples discussed above, statistical independence between failures in various devices was assumed to allow for relatively simple exemplary computations. In practice, some devices may exhibit some statistical correlation in their failures. For example, a pair of redundant access routers may tend to fail together due to problems common to both of the access routers. For example, both access routers may have a bug in the software/firmware, power outages or spikes could cause both routers to fail, overload conditions could affect both routers concurrently, etc. However, note that highly correlated failures can be undesirable, particularly for redundant devices. This is because, as discussed above, when redundant devices in a group fail together, they are not available to take over functioning for each other.

Figure 10:
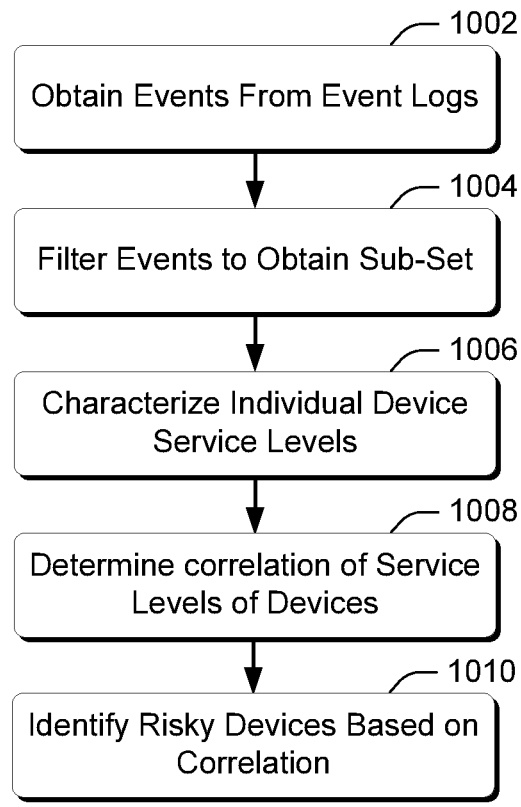

In view of the above, some implementations may identify certain groups of risky devices in a given network configuration. FIG. 10 shows a method 1000. For example, method 1000 can be performed by event analysis component 408 to characterize groups of devices as "risky," meaning the devices are relatively likely to fail together rather than individually.

At block 1002, the method can obtain a set of events logged at a data center. Block 1002 can be similar to block 702 of method 700.

At block 1004, the method can method can filter the events using one or more criteria. Block 1004 can be similar to block 704 of method 700.

At block 1006, the method can characterize service levels of one or more devices using the filtered sub-set of the events. For example, the method can determine the individual availability of multiple access routers in a redundancy group at the L3 aggregation layer, or multiple aggregation switches at the L2 aggregation layer.

At block 1008, the method can determine correlations between the service levels of the individual devices. For example, some implementations may compute the correlation (e.g., Pearson correlation) between tickets, outage minutes, or traffic loss for devices within an individual redundancy group. Some implementations may also compute the correlation between tickets, outage minutes, or traffic loss of connected devices at different layers, e.g., between an individual aggregation switch and an individual access router.

At block 1010, the method can identify risky devices based on the correlations. For example, the correlations can be compared to a threshold, and devices having a correlation exceeding the threshold can be identified as risky because these devices may tend to fail together (e.g., failures with a temporal relationship such as overlapping failures or tending to fail in succession). As one example, access routers or aggregation switches in a redundancy group that tend to fail together can be risky because the redundancy is less effective when the devices tend to fail together. As another example, failures of a device at one layer can tend to cause failures of devices at other layers, e.g., failed ToRs can tend to bring down upstream aggregation switches and this can be apparent from the correlations. Note also that individual devices that tend to fail frequently can also be identified at block 1010 (e.g., devices with a high number of failures).

The service levels used for method 1000 can include the various service levels mentioned above, e.g., total outage time, total tickets, traffic loss, etc. Note, however, that other metrics may be suitable. Furthermore, while the following implementations discuss Pearson correlation as a suitable measure of correlation, other correlation measures can also be used such as Spearman's rank correlation coefficient and/or Kendall tau rank correlation coefficient.

Considering total outage time, one way to correlate outage time between two devices is as follows. First, the total downtime of a device A and the total downtime of a device B are determined from filtered events, as discussed above. Next, the filtered events are also used to determine individual events where both device A and B were down together, or at least partially overlapping in terms of their time window of being unavailable. If there is a strong negative correlation between failures of devices A and B (e.g., Pearson coefficient close to −1), then the overlapping failures will tend to be relatively minimal relative to the individual failure rates of the devices—in other words, the devices are less likely to fail together than would be the case if there were no correlation. If there is minimal or no correlation (e.g., Pearson coefficient of approximately 0), then the devices tend to fail independently of one another, e.g., the failure of one device has little or no apparent impact on whether the other device fails. If there is a strong correlation (e.g., Pearson coefficient close to 1), there is a strong correlation and the devices are more likely to fail together than would be the case if the failures were independent.

This last case, relatively high correlation, can be problematic for devices in a redundant configuration for reasons already mentioned. Thus, in some implementations, risky devices can be devices deployed in a redundant configuration that have a correlation exceeding a certain threshold, e.g., 0.7. Similar processing can be employed with respect to network tickets by determining the Pearson coefficient for support tickets, e.g., determining the total number of tickets for each individual device and the intersection of these tickets that relate to both devices. Assuming an equivalent number of tickets, smaller intersections imply lower correlations and larger intersections imply higher correlations. Correlations can also be determined for losses of network traffic by individual devices, e.g., if traffic loss by one device in a redundant pair tends to be highly correlated to traffic loss by another device in the redundant pair, the pair can be flagged as a risky device pair.

Figure 11:
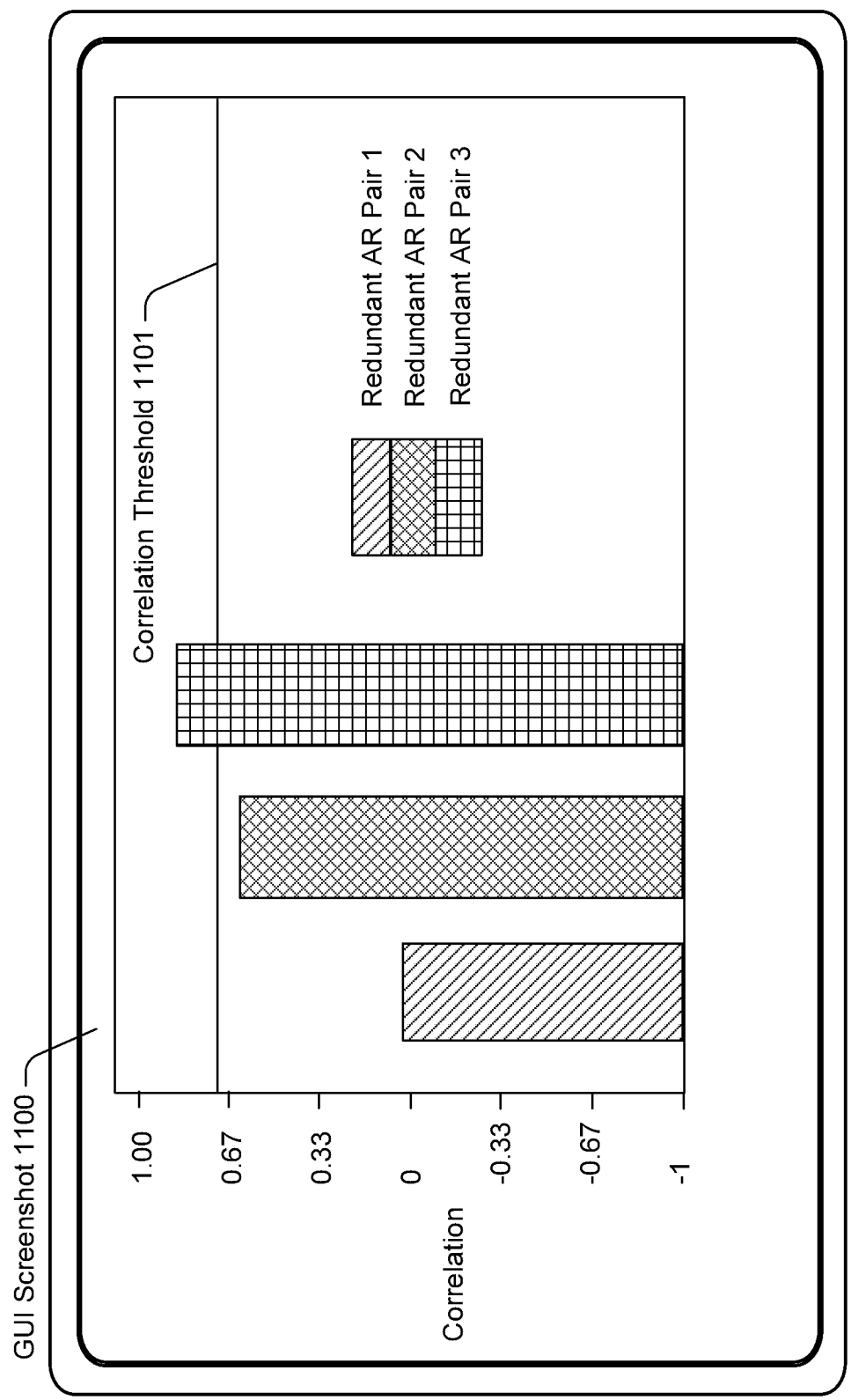

FIG. 11 illustrates another GUI screenshot 1100 that can be generated by the output component 512 of event analysis component 408. GUI screenshot 1100 shows correlations for three redundant access router pairs ("AR pairs"). GUI screenshot 1100 also shows a correlation threshold 1101, which is shown as a line representing the threshold for characterizing an individual device group as "risky." Thus, GUI screenshot 1100 shows that redundant AR pair 3 is risky because the correlation exceeds the threshold. In some implementations, GUI screenshot 1100 may allow user inputs to move the correlation threshold 1001 up or down and recharacterize device groups accordingly. For example, if the user moved the threshold down to 0.53, then redundant AR pair 2 would also be characterized as a risky AR pair.

Note that some implementations may perform processing similar to that discussed above with respect to method 1000 to determine risky device properties. For example, consider a data center with many physically identical network devices, a first group of which have a first software/firmware revision, Revision A and a second group of which have a second software/firmware revision, Revision B. One device property for these devices may reflect the current revision. If Revision A is highly correlated (e.g., using one or more of the correlation measures mentioned above) to tickets, outages, or traffic loss, then this property can be flagged as a risky property. In further implementations, the event analysis component may evaluate the data center topology to identify those devices having the risky property (e.g., Revision A). The event analysis component may also estimate the change in device availability if the Revision A devices were upgraded to revision B. Based on the estimated individual device availability, the event analysis component can also estimate the change in application availability for applications having network stamps that include one or more Revision A devices.

Cost Metrics

Often, it is useful to compare different devices based on factors such as cost, service levels, individual port and/or aggregate bandwidth, numbers of ports, management complexity, lifetime of operation, etc. For example, different device functional types, platforms, models, or revisions may have different costs and/or capabilities. For the purpose of this document, the term "device classification" can include device types, platforms, models, revisions, etc., from the same hardware vendor or across different vendors. As mentioned above, the term "service level" encompasses concepts such as reliability, availability, and traffic flow/loss, as well as related ideas such as expected repair time and time to failure, etc.

Generally, a device type refers to a functional type, e.g., access routers are one functional type, ToRs are another functional type, etc. A device platform is a group of related device models of a common functional type. For example a manufacturer may produce a Brand A 1000 series access router platform that includes different models such as model 1000, model 1010, etc. Thus, device model is a more specific device classification than device platform, and device platform is a more specific device classification than functional type. Different device models may have associated revisions, e.g., Brand A model 1010 may have a revision 1, revision 2, revision 3, etc., over the production life of the model 1010 access router. Thus, device revision is a more specific device classification than device model. The disclosed implementations can evaluate devices of different classifications, e.g., devices of different functional types, platforms, models, revisions, etc.

The following discussion employs various mathematical examples to convey certain concepts introduced herein. Note that the mathematical examples (costs, numbers of ports, service levels, etc.) are chosen largely for the sake of ease of exposition and computation, and are not intended to necessarily convey actual characteristics of presently available devices. Furthermore, note that device capabilities, service levels, and costs naturally tend to evolve, but the concepts discussed herein can be employed in any circumstances where pricing, device capacity, and service level information can be obtained.

The various techniques discussed above for characterizing service levels can also be employed to create metrics for comparing devices of different classifications. Consider a metric that compares device classifications on a cost-per-port basis, e.g., two different ToR switch models may each provide 48 1 Gbps ports at a cost of $100 per port for 1 Gbps (gigabit per second) of bandwidth per port. At first glance, both models may appear to be of roughly equivalent value. However, if the first ToR switch model provides four "nines" of availability (99.99%) and the second ToR switch model provides only one nine of availability (90.00%), the first ToR switch model seems to be a better deal, other things being equal.

In view of the above, the disclosed implementations can provide a cost/service level metric that can be used to compare devices of different classifications not only on a cost basis, but also in consideration of given service levels that the devices are expected to provide. For example, some implementations may fix a given level of availability, e.g., based on an SLA requirement, and compute a cost/service level metric that reflects how many devices in combination (e.g., a redundancy group) of a given device classification will provide that level of availability. One example of such a cost/service level metric is a cost/service level per port metric.

Continuing with the previous example, the following explains how a cost/service level per port metric can be computed. Assume a target availability of four nines, 99.99%. Further, assume statistical independence of failures of the second ToR model. Under these circumstances, a group of four redundantly-configured ToRs of the second model would exhibit 99.99% availability (computed as $1-(1-0.90)^4$), as would a single device of the first model. Thus, the cost/service level per port metric in this instance is $100 per port for the first model and $400 per port (4 devices×$100 per port) for the second model. Here, the cost/service level metric not only confirms the intuition that the first model is a better deal, but quantifies the extent to which this is the case.

Consider the consequences of a decision made in a data center context to purchase the second ToR model instead of the first. For 1000 servers in total having 1000 ports for network communication, it would cost approximately $100,000 (1000 ports*$100 per port) to replace all the ToRs with either device model. However, to add enough devices of the second model to meet the target SLA of 99.99% would cost $400,000 (1000 ports*$400 per port) instead, whereas this same level of availability can be obtained for $100,000 with the first model.

One difficulty for business entities at the time of making purchase decisions is that they may not have accurate information about the service levels provided by devices of different classifications, and thus it may be difficult for such entities to make informed purchasing decisions. In the previous example, a network operating entity that purchases the second ToR model without accurate service level data may not realize the repercussions of their decision. Instead, the network operating entity may eventually learn the second ToR model is not a cost-efficient decision when service level considerations are involved, but only after major purchasing decisions have been made. The disclosed implementations may offer such a network operating entity the ability to evaluate device classifications for cost efficiency before making purchase decisions to avoid such scenarios.

Note also that networks such as data centers may also include devices that have higher cost-per-port than the ToR estimates provided above. For example, aggregation switches and access routers may cost in the range of $500-$3000 per 10G port. Generally, the higher layers of the network hierarchy (closer to core routers 106), the more expensive devices tend to be on a per-port basis. In practice, a given network may have a very wide range of network gear including switches, routers, load balancers, WAN optimizers, NATs, VPNs, firewalls, etc. Moreover, such a network may include large numbers of these devices across different vendors and generations. The disclosed implementations can consider the cost of different combinations of various devices at different hierarchy layers while providing a given service level, e.g., to a hosted application. Other implementations may fix a cost budget and determine a configuration of network devices of various classifications that will tend to increase or maximize availability while meeting the cost budget.

Also, note that cost/service level metrics disclosed herein are extensible to different port bandwidths. For a first group of servers having 1 Gbps interfaces, a first cost/service level metric can be computed for two device classifications offering 1 Gbps bandwidth per port at a first service level (e.g., 99.9% availability). For a different group of servers having 10 Gbps interfaces, a second cost/service level metric for two other device classifications offering 10 Gbps bandwidth at a second service level (e.g., 99.99% availability). Thus, for devices connecting directly to servers having 1 Gbps interfaces, network devices that provide 1 Gbps per port can be compared for procurement purposes. Likewise, for devices connecting directly to servers having 10 Gbps interfaces, 10 Gbps per port devices can be compared for procurement. In some implementations, networking hardware vendors may use cost/service level metrics such as those disclosed herein in product datasheets to rate various devices that they produce.

Note that some layers of the network hierarchy may have ports rated at different bandwidths. For example, a ToR may be connected to 40 individual servers with 40 1 Gbps ports and may have 4 10 Gbps ports connected to an aggregation switch. In this case, one of the ports connected to the aggregation switch theoretically provides sufficient bandwidth to communicate traffic received from 10 of the ports connected to the servers. However, in practice, often each of the 10 Gbps ports is connected to a different access router and thus whether a given port actually provides sufficient capacity is a function of several factors, including how individual network devices are connected, the amount of bandwidth being used by the connected servers, and the paths taken by the traffic.

Evaluation Component

Figure 12:
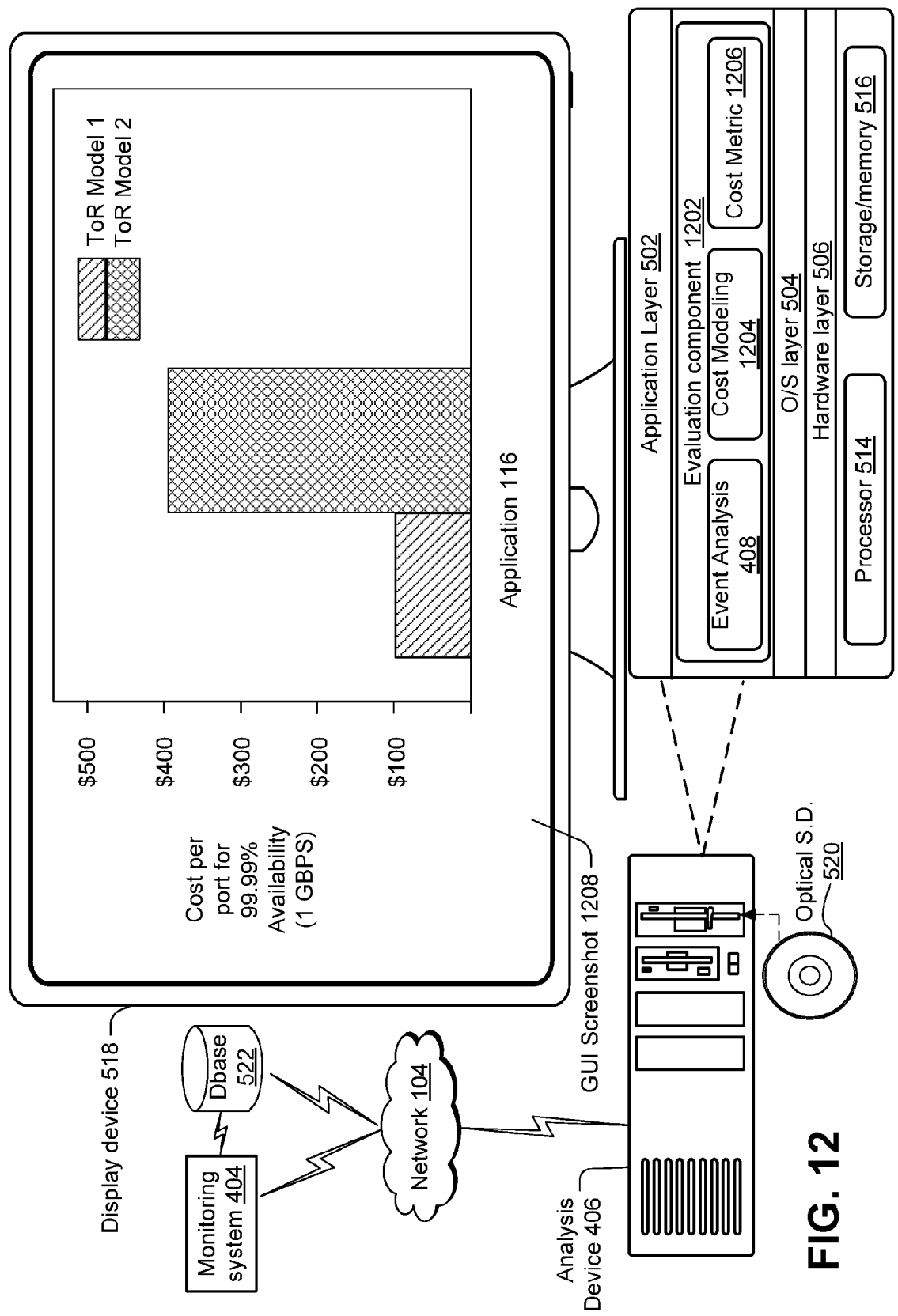

In some implementations, the analysis device 406 shown in FIGS. 4 and 5 can be configured to evaluate various device classifications, e.g., using the cost/service level metrics as discussed herein. For example, FIG. 12 shows analysis device 406 in a configuration having an evaluation component 1202 configured to evaluate various device classifications or network configurations, e.g., using cost/service level metrics as discussed herein. Evaluation component 1202 can include event analysis component 408, which, as discussed above, can be configured to determine service levels for various network devices. Evaluation component 1202 can also include a cost modeling component 1204 that can be configured to model costs associated with various network devices. Evaluation component 1202 can also include cost metric component 1206 configured to compute cost/service level metrics as discussed herein.

Evaluation component 1202 can be configured to generate various interfaces that convey information relating to the computed metrics. For example, the evaluation component can generate GUI screenshot 1208, which reflects cost/service level metrics determined for different device types. As shown in FIG. 12, GUI screenshot 1208 shows that the cost for 99.99% availability with ToR model 1 is $100 per port whereas ToR model 2 costs $400 per port for the same level of availability.

Example Service-Level Constrained Method

Figure 13:
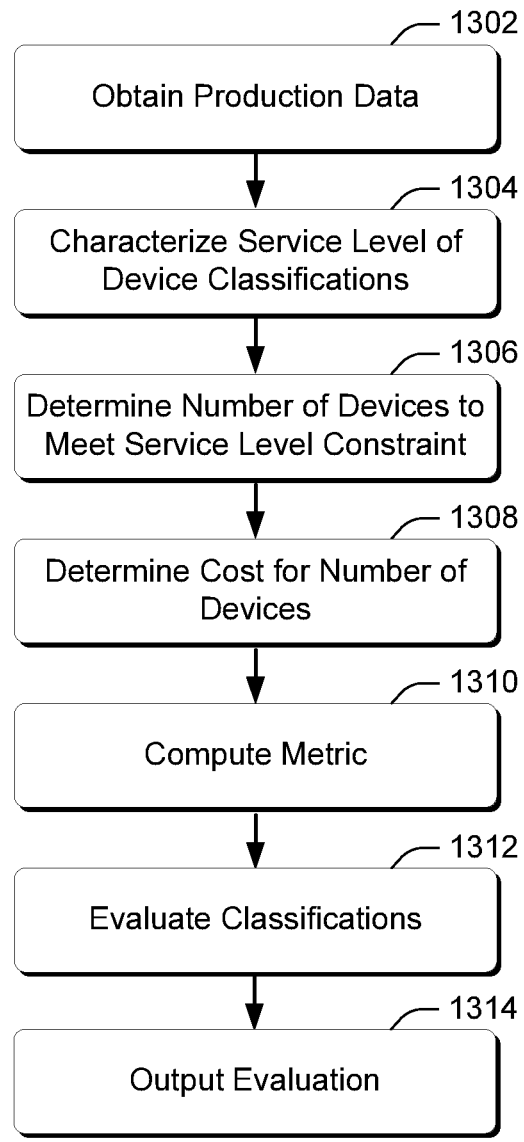

As mentioned above, evaluation component 1202 can include cost metric component 1206, which can be configured to determine cost/service level metrics for various device classifications. Generally, this can be accomplished by determining a number of devices that will meet a given service level constraint and then determining the costs for the determined number of devices. FIG. 13 shows a method 1300 that can be performed by evaluation component 1202 to compute cost/service level metrics for various device classifications and use the cost/service level metrics to rank the device classifications.

At block 1302, the method obtains production data for multiple different device classifications. For example, the production data can include events obtained from event logs as discussed above, as well as trouble tickets, maintenance data, traffic data, etc. The production data can also include cost information such as costs incurred over time for maintaining and/or replacing network devices of various classifications.

At block 1304, the method characterizes service levels of the different device classifications. For example, the production data (e.g., event logs) can be used to characterize the service levels, e.g., as discussed above with respect to method 700.

At block 1306, the method determines the number of devices of a given classification that are expected to meet a service level constraint. For example, meeting a constraint of 99.9% availability with aggregation switch model A may involve using three devices in a redundant configuration, whereas meeting the same constraint with aggregation switch model B may involve 2 devices in a redundant configuration.

At block 1308, the method determines costs for deploying the determined numbers of devices. In some implementations, purchase prices for the devices can be used. In further implementations, average costs of ownership amortized over the expected lifetime/refresh cycle of the various device classifications can be determined (often about 3-5 years). For example, the average cost of ownership can be determined based on the production data, e.g., costs incurred over time such as operation costs, management costs, etc.

At block 1310, the method determines cost/service level metrics for the different device classifications. For example, the costs determined at block 1308 can be divided by the number of ports supported by the device classifications. The resulting value is a cost/service level per port metric.

At block 1312, the method evaluates the device classifications based on the metric. For example, the device classifications may be ranked so that devices with lower cost/service level on a per-port basis are ranked more highly, e.g., the device classifications can be ranked inversely based on the values of the determined cost/service level metrics.

At block 1314, the method outputs results of the evaluation. For example, the ranked results can be output by displaying a graphical user interface, by saving the results to persistent storage, sending the results over a network, etc.

To provide a concrete example of how method 1300 can be applied, consider the following. Two different aggregation switch models each provide 200 ports, where aggregation switch model A costs $500 per port or $100,000 per switch and aggregation switch model B costs $600 per port or $120,000 per switch. Further, given a service level constraint of 99.9% availability, either three devices of model A or two devices of model B can be deployed. Thus, $300,000 invested in device model A provides 200 ports at 99.9% availability, or $300,000/200=$1500 per port. On the other hand, $240,000 invested in device model B provides 200 ports at 99.9% availability, or $240,000/200=$1200 per port. Thus, device model B at $1200 per port can be ranked higher than device model A at $1500 per port for 99.9% availability.

Note that the redundant group sizes in the previous examples will have different actual numbers of physical ports. For example, the group of three redundantly-configured aggregation switches of model A will have 3×200==600 total ports, and the group of two redundantly-configured aggregation switches of model B will have 2×200=400 ports. However, each redundant group only provides 200 port connectivity at the 99.9% availability service level constraint. Thus, 200 ports can be used as a basis of comparison of capacity for a given service level between the two device models. In a sense, the number of ports can be viewed as a normalized value for evaluating the device models in view of the service level constraints instead of as a physical number of ports on the devices themselves.

Note also that some implementations may omit expressly computing the metrics. For example, when two different device models have an equal number of ports, the cost per device can be used to directly compare the devices, since the number of ports is the same. In the above example, the cost per device can be multiplied by the number of devices to meet the service level constraint to obtain a cost/service level metric. The device classifications can then be ranked at block 1312 using the cost/service level metric without expressly computing the cost per individual port.

Example Interface

Figures 14A, 14B:
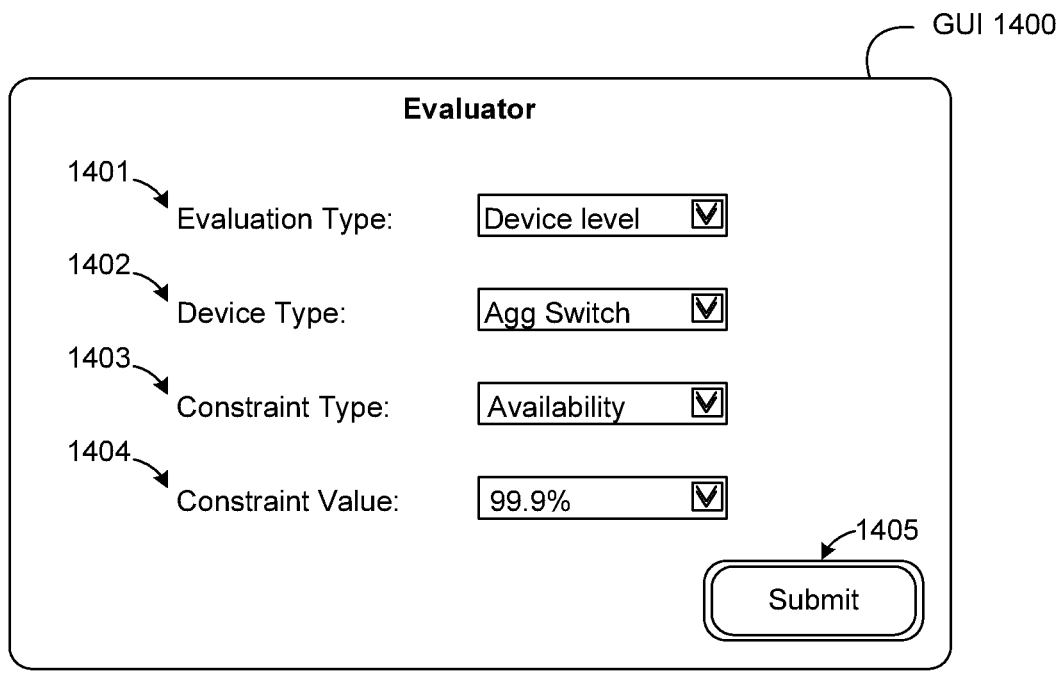

FIG. 14A illustrates an evaluator GUI 1400 that can be generated by evaluation component 1202. Evaluator GUI 1400 is an example interface that can be used to query the evaluation component. Evaluator GUI 1400 includes an evaluation type input 1401, a device type input 1402, a constraint type input 1403, a constraint value input 1404, and a submit button 1405.

Generally, evaluation type input 1401 can be used to configure various evaluation types, e.g., device-level or network-level evaluations. For example, a device-level evaluation can be used when the user wishes to compare various devices having a common functional type, e.g., aggregation switches to other aggregation switches, ToRs to other ToRs, etc. Network-level evaluations can be used when the user wishes to have a particular network evaluated and does not necessarily have a specific device type in mind. Here, the user has selected device-level evaluation, which can cause evaluator GUI 1400 to present inputs 1402-1404.

Using device type input 1402, the user can enter the particular device functional type they wish to evaluate in device type input 1402. Here, the user wishes to evaluate different aggregation switches. Constraint type input 1403 can be used to constrain various aspects of the evaluation, e.g., service level constraints on availability, reliability, etc., or cost constraints on costs of individual devices, redundant device groups, etc. Here, the user has selected to constrain availability. Constraint value input 1404 allows the user to input a particular value for the constraint. In this case, the user has elected to constrain availability to 99.9%. In other words, the user is interested in how various aggregation switches can be obtained that provide at least 99.9% availability, e.g., by deploying them in redundant configuration.

When the user presses the submit button 1405, this can trigger a corresponding query to evaluation component 1202. In turn, evaluation component 1202 can perform method 1300 based on query parameters configured via the evaluation GUI 1400. In this example, the query parameters indicate the query is for a device-level evaluation of aggregation switches subject to an availability constraint of 99.9%.

In response to the query, evaluation component 1202 can generate an evaluation result GUI 1450, as shown in FIG. 14B. Here, the evaluation result GUI continues with the previous example, e.g., ranking aggregation switch model B highest at a cost of $1200 per port for 99.9% availability, followed by models A, D, and C, respectively. Note that device models D and C provide 99.99% availability, this could reflect a situation where a certain number of these devices (e.g., a single device) do not quite meet the constraint of 99.9% and adding another device (e.g., a second device) is enough to not only meet the constraint, but comfortably exceed the constraint. In some cases, the user may then decide that device model D, while more expensive than models A and B on a per-port basis, is nonetheless a better option because of the relative higher availability provided by model D.

Evaluation result GUI 1450 can convey additional information such as the total capacity, i.e., port count, for each aggregation switch model. For example, models C and D may provide 400 ports in contrast to the 200 ports discussed above for models A and B. In further implementations, evaluator GUI 1400 can provide options to display or not display information such as port count, individual port capacity, and/or aggregate port capacity. Evaluator GUI 1400 can also include options to constrain the results to devices having port counts within a given range (e.g., 0-200 ports per device, 200-400 ports per device, etc.).

Further implementations may also account for oversubscription of devices. Generally, oversubscription is a technique that can be used to mitigate costs in network environments. For example, assume aggregation switch models E and F are being considered for connecting to 1000 servers each having 1 Gbps interfaces, for a total of 1000 Gbps of theoretical maximum bandwidth. A 1:1 subscription ratio would imply that the aggregation switches provide 1000 Gbps capacity, which could be very expensive in view of the relatively higher per-port cost of aggregation switches.

In contrast, assume a 5:1 oversubscription ratio is acceptable to the network engineer at the aggregation switches, e.g., the aggregation switches in this case need to provide a total capacity of 200 Gbps, which can result in substantial cost savings. Method 1300 can be performed in consideration of this additional constraint, e.g., determining not only a number of aggregation switches of each model needed to meet a given service level constraint, but also a number of ports needed to meet a specified oversubscription ratio. Here, either 20 ports with 10 Gbps of bandwidth or 200 ports with 1 Gbps will suffice.

Cost Modeling

As mentioned above, evaluation component 1202 can include cost modeling component 1204, which can be configured to model costs for various device types. These costs can, in turn, be used at block 1308 of method 1300. In some implementations, the costs used can simply be the up-front costs of the various device classifications, e.g., the purchase price.

Further implementations may consider more refined approaches such as measuring the average cost of ownership of various device classifications over a given period of time, e.g., the average lifetime. Such implementations may consider capital costs, depreciation, operational costs, enhancement costs, etc. For example, capital costs can include the up-front costs of the devices themselves. Depreciation costs can consider the residual value of equipment when disposed of by a network operating entity, e.g., resale and/or scrap value. Operational costs can include power costs, space costs, personnel costs, etc. Enhancement costs can include personnel costs such as time spent upgrading various devices (e.g., patching software/firmware), time spent training individuals to use new device models/revisions/brands, etc.

Note that some of the cost factors mentioned above can be continuously modeled over time using various production data such as events, trouble tickets, maintenance data, and/or traffic data. For example, one device classification (e.g., revision 1) may exhibit relatively high costs when initially deployed because of frequently-malfunctioning firmware or software. A subsequent software/firmware patch or hardware change (revision 2) may substantially reduce the associated maintenance costs for that model. Thus, the cost modeling component can refine the cost of ownership modeling for a given device classification to reflect improvements or new-found problems.

One way to model cost of ownership (TCO) is as follows. The average yearly cost can be computed as: Service contract cost+engineer hourly rate*expected setup time in hours (e.g., one-time setup)+operator hourly rate*average downtime in hours due to maintenance/failures over each year of the lifetime+depreciation cost per year (e.g., using linear, declining balance, sum of years depreciation techniques)+ hosted service downtime cost per hour*Probability (service down due to device down). Then, the overall average cost over lifetime can be computed as the sum of per year average costs. Note the above example assumes an "engineer" performs the initial setup and then an "operator" performs associated maintenance/handles failures by the device.

Note that the upfront purchase cost can be handled in several different ways. The upfront purchase cost can be charged initially, and then the total ownership cost can be computed over the entire lifetime of a given device (3-5 years) in a single equation. The above equation can be adjusted by multiplying per-hour values in the above equation by downtime hours per year and multiplying per-year values by the expected device lifetime for each year of operation. Alternatively, the upfront purchase cost can be removed from the equation and considered as some portion of it as the depreciation cost per year.

Also, note that some implementations can consider device redundancy as part of the cost modeling. For example, redundantly-configured devices may have higher associated costs than devices that are not deployed redundantly, e.g., maintaining multiple redundant devices may involve higher power costs, more time to patch the multiple devices, etc. This concept also applies as the number of redundant devices in a group increases. Thus, the cost model for a given device classification may have a cost component that is based on the number of devices used to provide a given service level. For redundancy related costs, the total redundancy-related cost can be computed as the sum of per device costs+engineer hourly rate*# hours to set up and maintain redundancy+component purchase and service/repair cost of interconnecting components such as cables, and configuring failover protocols.

Service Levels

As mentioned above, service levels for various device types can be determined by event analysis component 408, and service levels can be defined in terms of individual device availability, network stamp availability, etc. Further implementations can consider other service level metrics such as annualized failure rate, time-to-failure, time-to-repair, probability of failure, failure recurrence, failure burstiness, etc. As mentioned above, such service level metrics can be computed over the average or expected lifetime of a given device classification.

Sometimes failure rates are relatively high very early in device life cycles, and this phenomenon is sometimes referred to as "infant mortality." Thereafter, failure rates tend to stabilize or plateau, e.g., the probability of the next failure is relatively stable for some time. As devices begin to age, the likelihood of the next failure tends to increase again toward the end of the useful lifetime of the device. This can be mathematically modeled as the conditional probability of Pr (device X has n+1 failures given device X has n failures). Some implementations may use the various data obtained by monitoring system 404 to model device failures over time to quantify these effects. For example, some implementations may quantify the cost to keep a device in operation or to replace with a new device.

Further implementations may also characterize particular failures using different failure types. For example, some implementations may divide failures into hardware failures (e.g., bad power supply, bad chip), software failures (e.g., software bugs), and configuration failures (e.g., device configured incorrectly). These failure types can be used to characterize expected service levels across device classifications. For example, if a new device model is very similar from a hardware perspective to a previous model but utilizes all new software, the hardware failure characteristics of the previous model can be used to model failure characteristics of the new model. However, since the software in this example is all new, there is not necessarily an expectation that the two device types will exhibit similar software failure characteristics.

Generally, the observed failure modes of various device types can be used to develop a probabilistic model of device failures. The model may account for the lifecycle considerations mentioned above as well as different failure classifications. Some implementations may also consider the "few bad apples" effect where relatively few failures by certain devices can cause ripple effects that result in relatively widespread device failures in a given network environment.

Various probabilistic models may be suitable for modeling probabilities of failures in association with determining service levels. For example, log normal distributions can be used for time between failures and time to repair, and bi-exponential models can be used for distribution of failure sizes (under correlated failures). A Gaussian distribution of expected lifetime of a device in a given set of devices can be used for device lifetime modeling, and an exponential distribution can be used for modeling a "few bad apples" effect in terms of number of failures observed or downtime caused by relatively few devices that fail causing more widespread issues in a given network.

Example Cost-Constrained Method

Figure 15:
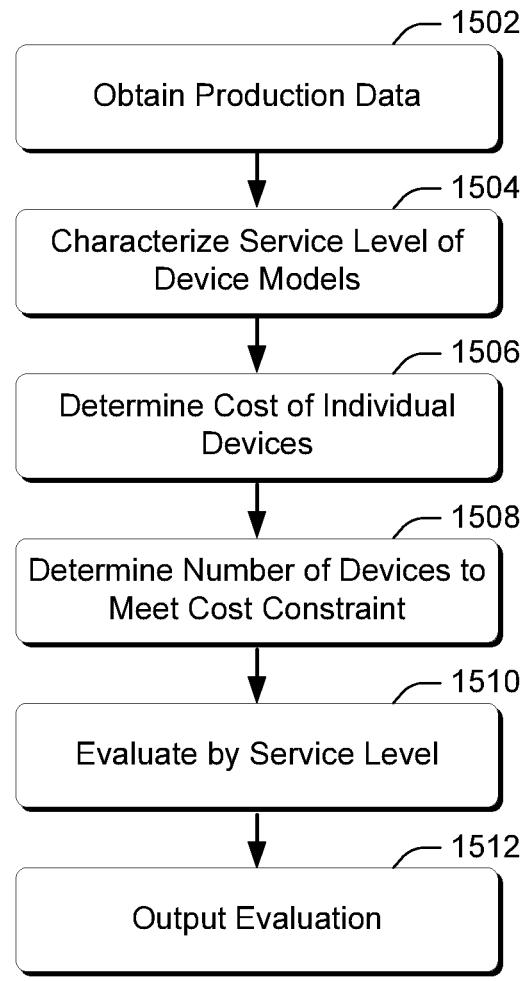

In examples provided above, costs were computed for different device classifications given a given service level constraint, e.g., a given level of availability. Some implementations may use an alternative approach by fixing a cost constraint and determining service levels provided by different device classifications given the cost constraint. FIG. 15 shows a method 1500 that can be performed by evaluation component 1202 to evaluate device classifications based on service levels that are determined subject to a cost constraint.

At block 1502, the method obtains production data for multiple different device classifications, e.g., as discussed above with respect to block 1302 of method 1300.

At block 1504, the method characterizes service levels of the different device classifications, e.g., as discussed above with respect to block 1304 of method 1300.

At block 1506, the method determines costs for individual devices of the different device classifications. For example, the method can determine the cost for a single brand A access router and a single brand B access router. In some implementations, purchase prices for the devices can be used. In further implementations, an average cost of ownership of the various device classifications can be determined. For example, the average costs of ownership of brand A access routers and brand B access routers can be determined based on the production data, e.g., costs such as operation costs, management costs, etc.

At block 1508, the method determines the number of devices that can be purchased subject to a cost constraint. For example, brand A access routers may be less expensive than functionally equivalent brand B access routers, so more brand A access routers can be purchased within a given budget. Note that the cost constraint can be expressed in different ways, e.g., as an acquisition cost constraint relating to the up-front costs of the devices or as a cost-of-ownership constraint reflecting both up-front costs and additional costs incurred over time. Note that block 1508 can also consider additional constraints such as the number of ports needed at a given network layer to meet an associated oversubscription ratio.

At block 1510, the method evaluates the device classifications based on the service levels. For example, the evaluation may determine that brand A access routers offer higher service levels than brand B access routers.

At block 1512, the method outputs results of the evaluating, e.g., as discussed above with respect to block 1314 of method 1300.

To provide a concrete example of how method 1500 can be applied, consider the following. Two different access router models each provide 50 ports, where access router A costs $2000 per port or $100,000 per router and access router B costs $3000 per port or $150,000 per router. Further, given a cost constraint of $300,000, either three devices of model A can be deployed at a cost of $300,000 or two devices of model B can be deployed at a cost of $300,000. Now, assume three redundantly-configured devices of router A are expected to provide 99.5% availability, whereas two redundantly-configured devices of router B are expected to provide 99.3% availability. Thus, device model A at 99.5% availability can be ranked higher than device model B at 99.3% availability.

Figures 16A, 16B:
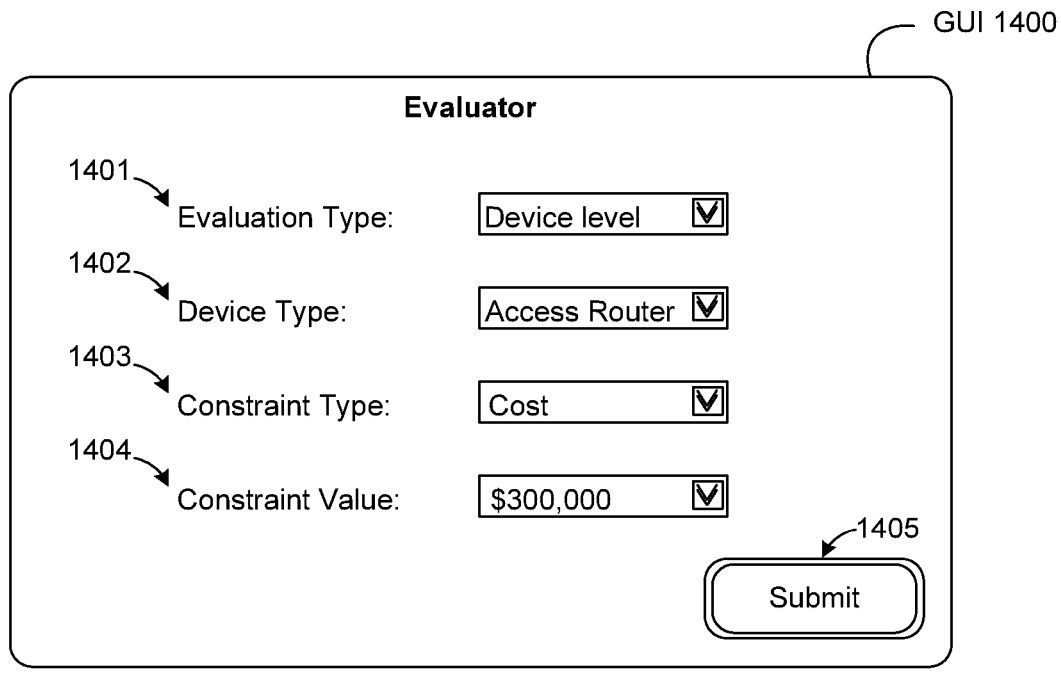

FIG. 16A illustrates evaluator GUI 1400 in a configuration where the user has requested an evaluation corresponding to the preceding example discussed with respect to method 1500. Here, the user has requested a device-level evaluation of access routers subject to a cost constraint of $300,000.

When the user presses the submit button 1405, evaluation component 1202 can perform method 1500 based on query parameters configured via the evaluation GUI 1400. In this example, the query parameters indicate the query is for the device-level evaluation of the access routers subject to the cost constraint of $300,000.

In this example, the evaluation result GUI 1450 generated by the evaluation component 1202 is shown in FIG. 16B. Here, the evaluation result GUI continues with the previous example by showing a ranking of router A as the device model having the highest service level available for $300,000 or less. Note also that the total cost for the devices does not necessarily equal the cost constraint, e.g., models D and C could cost $90,000 each and thus $270,000 will provide 3 devices each of these models, whereas a fourth device would exceed the cost constraint.

As previously discussed with respect to aggregation switches, result GUI 1450 can convey additional information such as the total capacity, i.e., port count, for each access router model. Likewise, as previously discussed, evaluator GUI 1400 can provide options to display or not display port counts and/or constrain the port counts in the results. Additional inputs can constrain oversubscription ratios for access routers in a manner similar to that discussed above with respect to aggregation switches. In other words, the number of ports that will meet the specified oversubscription ratio can be determined in method 1500. Then, the number of access routers that can be purchased given the cost constraint is determined. The number of access routers of each model that can be redundantly deployed while meeting the specified oversubscription ratio is determined based on the port bandwidth of the various access router models. Then, availability is computed given the number of access routers of each model that can be deployed redundantly.

For example, assume the access router models will be connected to aggregation switches with 200 ports at 10 Gbps, or 2000 Gbps total bandwidth. At an oversubscription ratio of 2:1, this would involve 100 ports at 10 Gbps each on the access routers. In this case, the specified oversubscription ratio could be met with 2 access routers having 50 ports at 10 Gbps each, e.g., models A or B, or 3 access routers having 40 ports each, e.g., models C and D. The costs to purchase enough access routers of each model to meet the 2:1 oversubscription ratio can be computed first and subtracted from the specified cost constraint. Any remaining funds can be applied to determine how many, if any, redundant backups of each model can be purchased and the corresponding service levels can be computed.

Example Multi-Criteria Method

The implementations provided above can be used to minimize or reduce costs subject to service level constraints or to maximize or improve service levels subject to cost constraints. In some cases, network operating entities may wish to determine various network configurations that provide a good balance of cost and service levels. In other words, both cost and service levels may be important criteria to the network operators even in the absence of fixed constraints. Thus, some implementations may identify one or more network configurations that are determined in view of both cost and service level considerations.

Figure 17:
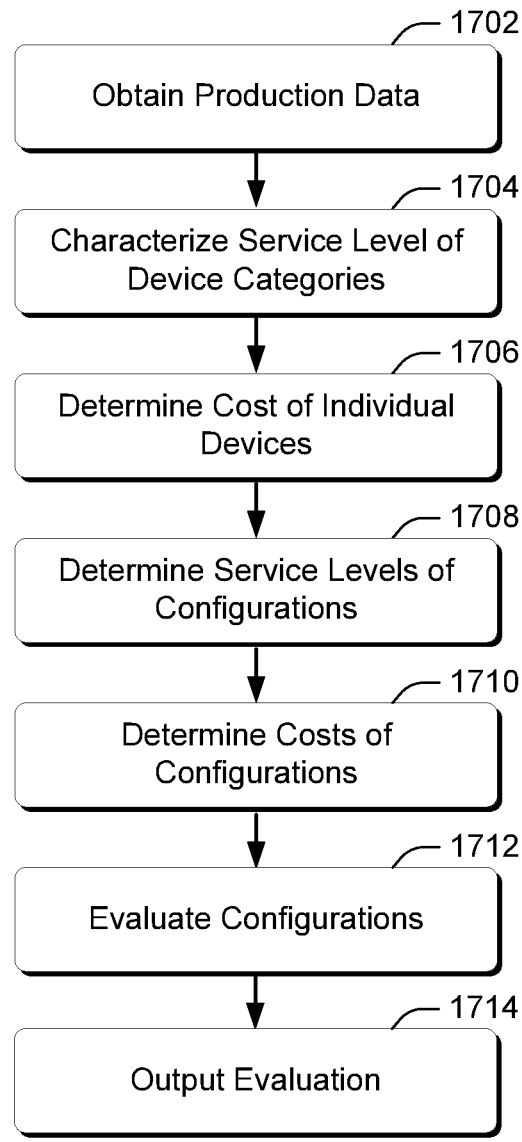

FIG. 17 shows a method 1700 that can be performed by evaluation component 1202 to evaluate different network configurations in view of both cost and service level criteria. Note that method 1700 can be applied to evaluate whether to replace one or more devices of an existing network and can also be applied to plan a new network.

At block 1702, the method obtains production data for multiple different device classifications, e.g., as discussed above with respect to block 1302 of method 1300.

At block 1704, the method characterizes service levels of the different device classifications, e.g., as discussed above with respect to block 1304 of method 1300.

At block 1706, the method determines costs for individual devices of the different device classifications, e.g., as discussed above with respect to block 1506 of method 1500.

At block 1708, the method determines service levels provided by various network configurations. For example, the service levels can be determined for multiple devices of a single classification in various redundant configurations, as well as for multiple devices of different classifications in various redundant and non-redundant configurations, etc. Note that block 1708 can also consider additional constraints such as a number of ports needed to meet specified oversubscription ratios at different network layers. Oversubscription ratios can be applied as fixed constraints so that costs and/or service levels are not necessarily computed for network configurations that do not meet the specified oversubscription ratios. In other words, each configuration that is considered provides at least the minimum number of ports necessary so that the specified oversubscription ratios are not exceeded.

At block 1710, the method determines costs for the various network configurations. For example, the method can determine the costs by multiplying the number of devices of each classification by the associated costs by the costs determined at block 1706.

At block 1712, the method evaluates different network configurations based on the service levels and costs. For example, the method may rank the different network configurations using a function of both costs and service levels.

At block 1714, the method outputs results of the evaluating, e.g., as discussed above with respect to block 1314 of method 1300.

Note that the term "network configuration" as used herein can refer to a range of concepts. For example, evaluating two different network configurations can involve simply comparing two different device configurations, e.g., in consideration of both costs and service levels provided by a given device model. Alternatively, evaluating network configurations can involve comparing many different data center plans involving thousands of devices of different models, functional types, ages, etc.

Multi-Layer—Application Stamp

In certain examples discussed above, devices of particular functions were compared with other devices of equivalent or similar functions, e.g., ToRs compared to other ToRs, aggregation switches to other aggregation switches, etc. However, the disclosed implementations can also be applied to consider changes to network configurations using devices having different types of functionality at different layers of a network hierarchy.

For example, assume that a data center has 400 ToRs and 4 aggregation switches, none of which are redundantly configured. Further, assume the data center hosts a single application that is not hosted elsewhere, and thus the data center is the entire network stamp for the application. In the present configuration, the data center may provide 98% availability, but a new agreement may expect the data center to provide 99% availability. Some implementations may consider various network configurations that would be expected to provide 99% availability, including replacing/adding one or more ToRs, replacing/adding one or more aggregation switches, or combinations thereof.

In this case, since the constraint is a service level constraint, method 1300 can be applied to consider various combinations of devices that are expected to meet the service level constraint of 99% availability. For example, replacing all of the aggregation switches with a newer model (model A) may be expected to provide 99% availability. Likewise, replacing all of the ToRs with a newer model (model B) may be expected to provide 99.9% availability. However, it may be that the lowest-cost configuration that achieves 99% availability may involve replacing less than all of the ToRs and less than all of the aggregation switches. Thus, in this example, method 1300 may output 10 ToRs of the new model and 1 aggregation switch of the new model as a proposed lowest-cost configuration that meets the availability constraint. This could occur, for example, if the network stamp availability is expected to improve from 98% to 98.9% by upgrading a single aggregation switch and then upgrading 10 ToRs is sufficient to obtain 99% availability without upgrading a second aggregation switch, which may be more expensive than the 10 ToRs.

Note that method 1500 can also consider different network configurations that use devices of different classifications at different layers of the network hierarchy. For example, method 1500 could output different network configurations that provide different service levels subject to a cost constraint. For example, a first configuration that involves adding two model A access routers and one model X aggregation switch to a data center could be ranked as a highest service level configuration that meets the cost constraint, and another configuration that involves adding three model B access routers to the data center could be the next highest service level configuration that meets the cost constraint.

Likewise, method 1700 can also consider multi-layer network configuration options. For example, method 1700 could output different network configurations that provide different service levels and different costs that are relatively highly ranked by a function. For example, a highest-ranked configuration that involves adding three model E access routers to the data center could be expected to provide 99.8% availability at a cost of $240000, and a next highest-ranked configuration that involves adding two model F access routers and one model X aggregation switch to a data center could be expected to provide 99.9% availability at a cost of $300,000.

Figure 18A:
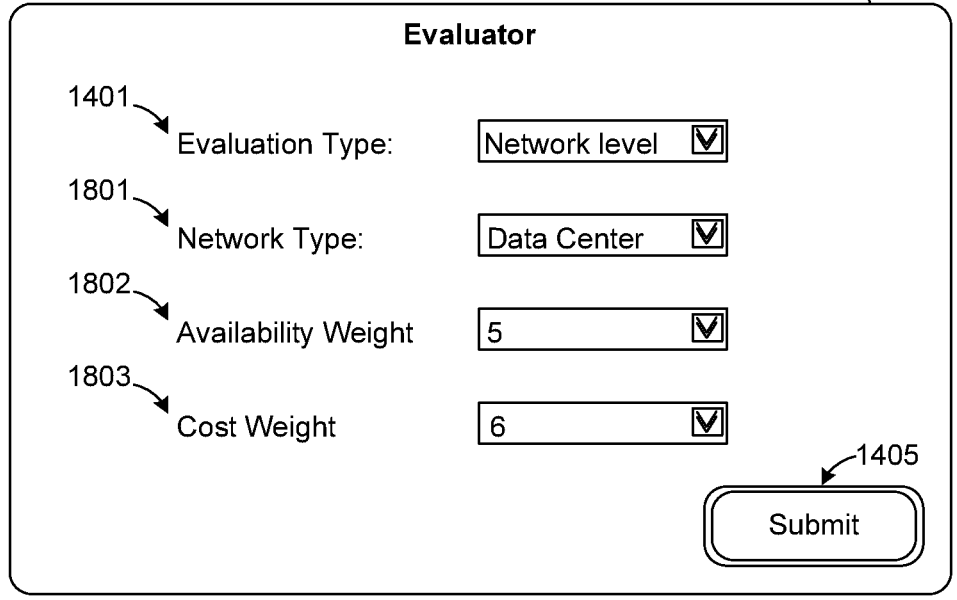

FIG. 18A illustrates evaluator GUI 1400 in a configuration where the user has requested an evaluation corresponding to the immediately preceding example discussed with respect to method 1700. Here, the user has requested a network-level evaluation via evaluation type input 1401.

In response to the user selecting the network-level evaluation, evaluator GUI 1400 is populated with a network type input 1801, an availability weight input 1802, and a cost weight input 1803. Here, the network type input identifies the particular network to evaluate, e.g., a data center in this example. Availability weight input 1802 can be used to configure a weight indicating the relative importance of availability to the user, and cost weight input 1803 can be used to configure another weight indicating the relative importance of cost to the user. Here, the user considers cost slightly more important than availability, so the cost weight is slightly higher than the availability weight. A technique for normalizing the cost and availability weights is discussed below.

When the user presses the submit button 1405, evaluation component 1202 can perform method 1700 based on query parameters configured via the evaluator GUI 1400. In this example, the query parameters indicate the query is for a network-level evaluation of a data center with weights indicating that cost is slightly more important than availability.

Figure 18B:
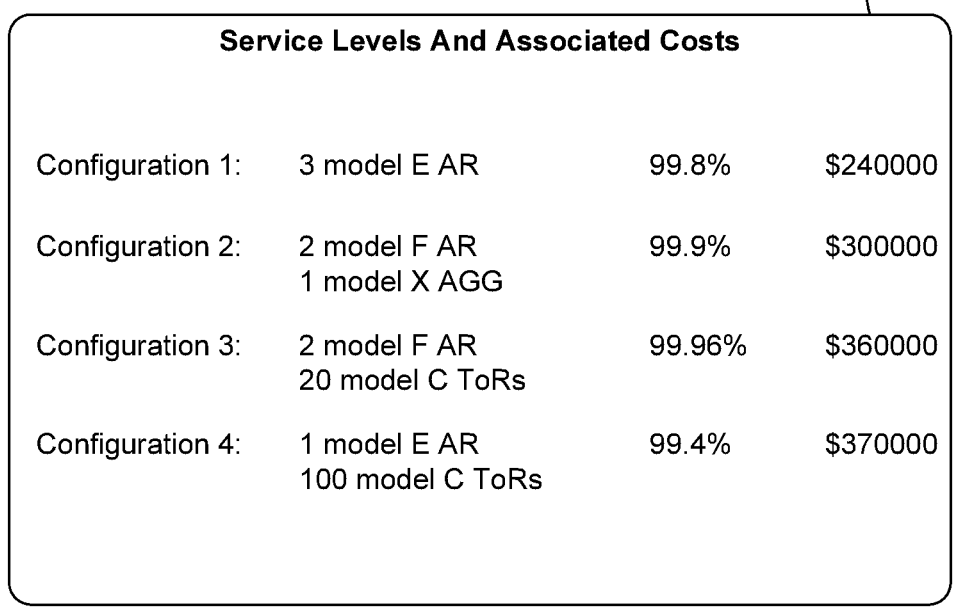

In this example, the evaluation result GUI 1450 generated by the evaluation component 1202 is shown in FIG. 18B. Here, the evaluation result GUI shows multiple different device configurations on a ranked basis. As previously discussed, three model E access routers are ranked most highly, followed by two model F access routers and a model X aggregation switch, and so on. Note that the above examples assume adding or replacing devices on an existing network, but the disclosed techniques can also be used for designing new networks as well.

As previously discussed with respect to aggregation switches and access routers, result GUI 1450 can convey additional information not shown in FIG. 18B due to space constraints such as the total capacity, i.e., port count, for device model shown in each configuration. Likewise, as previously discussed, evaluator GUI 1400 can provide options to display or not display port counts and/or constrain the port counts in the results. Additional inputs can constrain oversubscription ratios for different layers of the network hierarchy so that a minimum number of ports is deployed to avoid exceeding the specified oversubscription ratios at each layer of the network.

Algorithmic Details

As discussed above, the disclosed cost/service level metric can be used to minimize or reduce network costs to achieve a target network availability (e.g., method 1300), to maximize or increase network availability to achieve a specified cost budget (e.g., method 1500), or to evaluate various network configurations according to multiple criteria such as cost and service levels (e.g., method 1700). The following discusses some specific techniques that can be used to implement these methods.

One specific implementation of method 1300 is to treat the method as an optimization problem with an objective of minimizing cost subject to a target availability constraint. For the purposes of the following discussion, let $X_i$ be a variable denoting a number of devices of classification or "class" i. For example, $X_i$ can represent the number of devices of classification i on an existing network, the number of devices proposed to be procured for an existing network, the number of devices that meet the availability constraint, etc. Let $C_i$ be a cost of ownership metric of device classification i as discussed herein, e.g., a cost/service level metric that can, in some cases, be normalized by the number of ports provided by the devices under consideration. In this case, the optimization problem can be modeled using the following algorithm:

```
Minimize Σ_i C_i * X_i
s.t. for each network level I,
    1 - Π_{j:X_j can be deployed a level 1}^{#devices at level 1} Pr(Device class_j fails) >
        Pr(target availability of level 1)
    for the end-to-end network path
    Π_{k-1}^{#levels} Pr(level_k is available) >
        Pr(target network availability)
    where
    Pr(level_k is available) =
    1 - Π_{j:X_j can be deployed a level 1}^{#devices at level 1} Pr(Device class_j fails)
```

In the case of method 1500, one specific implementation treats the method as an optimization problem with an objective of maximizing availability subject to a cost constraint. Thus, the formulation can be similarly written for maximizing end-to-end availability in the objective function and modeling the network cost as a constraint:

$$\Sigma_i C_i * X_i < B$$

where B is the specified cost budget.

In the case of method 1700, one specific implementation treats the method as an optimization problem where the objective function considers both different costs and different levels of availability. For example, the formulation can be written for example as a weighted linear combination of the two terms: a*cost metric+(1−a)*target availability, where $0 \le a \le 1$, and the two terms can be normalized for linear addition, e.g., using a mixed-integer linear program.

Additional Uses

In the examples discussed above, the techniques discussed herein were used to evaluate the utility of various possible replacement devices. A related scenario involves evaluating when to replace a particular network device or devices. For example, consider a scenario where a data center has 10 aggregation switches in the network stamp of application 116. Further assume that, at the current age of these aggregation switches, the network stamp as a whole is expected to provide 99.9% availability and thus meet an SLA associated with the application.

Now, further assume that one of the aggregation switches fails, and the data center operator has the choice of (A) repairing the faulty aggregation switch or (B) replacing the faulty aggregation switch with a new identical switch or a different model. The disclosed implementations can rank and/or suggest various options to the data center operator along with expected lifetime costs and associated service levels that should be provided by the different choices.

One approach for a device replacement algorithm is simply to replace any device that fails regardless of whether the device can be repaired. More refined approaches consider factors including (1) computing a cost of ownership (COO) for devices to include capital, operational, and repair and maintenance costs and (2) adopting a data-driven approach to compute the conditional probability of the next failure given the observed previous failures, $P(N+1|N)=P((N+1)_{th} \text{ failure} | N_{th} \text{ failure})$, for a device classification (e.g., type/platform). The conditional probability of the next failure can be compared with both a threshold T based on the configuration's annualized failure rate and $P(N|N-1)$, probability of experiencing an (n)th failure given (n−1) observed failures for the device classification. Note that if $P(N+1|N) > T*P(N|N-1)$, the probability of the device experiencing a subsequent failure is higher and thus it becomes a candidate for replacement.

In other implementations, the data center operator may use the disclosed techniques to determine whether to retire an existing device type entirely, e.g., replace all 10 aggregation switches with a newer model. Viewed from one perspective, if the 10 aggregation switches are currently providing 99.9% availability at the L2 aggregation layer 122, then the L2 layer in isolation is providing sufficient availability to meet the SLA. However, the network stamp as a whole may begin to degrade as devices age and the SLA may no longer be met.

In some cases, it may be possible to replace the devices at the L2 aggregation layer to defer incurring other expenses, e.g., higher expenses at the L3 aggregation layer 120. For example, suppose that evaluation component 1202 estimates that replacing 10 aggregation switches immediately with a newer model will increase the availability of the L2 aggregation layer 122 to 99.99% and an overall network stamp availability of 99.95%. Alternatively, 3 access routers at the L3 aggregation layer 120 could be replaced at an identical cost with an overall network stamp availability of 99.91%. Here, the evaluation component can output a recommendation to replace the aggregation switches immediately and defer replacement of the access routers because the costs of both new network configurations are identical and replacing the access routers is expected to provide a higher service level.

Note also that the evaluation component 1202 can also account for the amount of data available in making certain recommendations or rankings. For example, if the time window in which a given device type has been deployed is relatively small, it may make sense to wait and acquire more data before making recommendations based on this small time window. This could avoid making unnecessary network changes because of relatively short-term issues such as the aforementioned infant mortality phenomenon.

In addition to purchase timing decisions, the disclosed implementations can also be used to inform decisions such as how many spare devices of various types to keep on hand at a particular network operation. For example, it may only take a relatively short amount of time to diagnose and repair a failure of a given network device, e.g., an hour. However, the time to procure a replacement may be much longer, e.g., days or weeks. Some implementations may estimate the downtime for a given network stamp given different numbers of spares and output associated levels of availability/cost. For example, keeping no spares on hand may result in 98% availability but adding just one spare may improve estimated availability to 99% simply because the amount of time it takes to replace with a spare is significantly less than the time to procure a replacement. Adding a second spare may improve availability as well but to a lesser extent, e.g., to 99.2%. Further implementations may also consider spares of different models, e.g., whether to replace a first device type with spares of the same type or with different models. Note also that the number of spares to keep on hand may be set in a service contract based on an expected number of devices to fail in a year, e.g., computed as an annualized failure rate.

Figure 19:
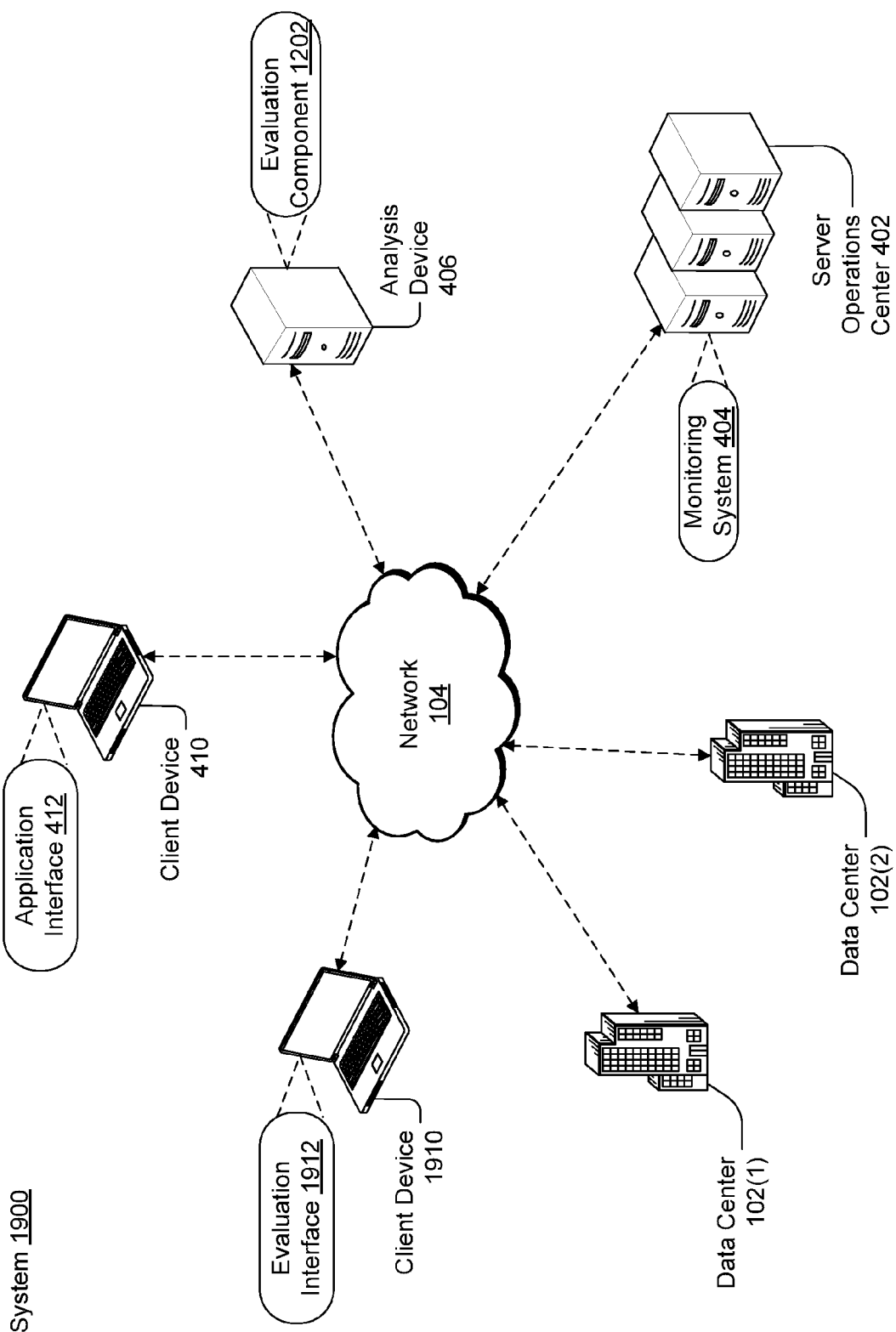

Applications:

In some implementations, the disclosed techniques can be provided as a network service. For example, FIG. 19 shows a system 1900 similar to system 400 of FIG. 4. Note that FIG. 19 shows analysis device 406 hosting evaluation component 1202, and also shows a client device 1910. Client device 1910 can include an evaluation interface 1612 which includes logic for providing certain information to evaluation component 1202 and receiving and/or displaying information received from the evaluation component. For example, client device 1910 can be associated with an entity that operates data center 102(1), and the entity can interact with the evaluation component to make procurement decisions for their data center. Although not shown in FIG. 19, client device 1910 can be similarly associated with an Internet Service Provider, small business network, government network, or other network operation instead of a data center. Likewise, analysis device 406 can be operated by an analysis entity that provides cost/service level analyses to various network operators using the techniques discussed herein.

In some implementations, evaluation interface 1912 can access anonymized failure and process logs produced by data center 102(1), e.g., events, trouble tickets, maintenance data, and traffic data. This information can be provided to analysis device 406, perhaps with configuration data identifying the particular network devices, connections, and other aspects of the architecture of data center 102(1). Analysis device 406 can then perform processing such as that discussed above to rank and/or suggest various devices and/or network configurations to the operator of data center 102(1). Thus, in these implementations, evaluation component 1202 can be viewed as a cost-sensitive and service-level-sensitive network configurator.

In this case, while the data center operator provides their data center configuration to the analysis entity, the anonymization prevents the analysis entity from learning who the data center operator is. Similarly, the analysis entity may have proprietary data for multiple different device types, e.g., failure rates, expected availability, usable lifetime, etc., that is not available to the data center operator. The analysis entity can provide recommended device types and/or network configurations without sharing the proprietary data.

In further implementations, the evaluation component 1202 can be provided to the data center operator. For example, the evaluation component can be a downloaded application that executes directly on client device 1910. In this case, the data center operator can avoid sharing their network configuration data entirely. In some implementations, the evaluation component can periodically update production data by accessing a database associated with the analysis entity. In further implementations, encryption or other obfuscation techniques can be provided in the deployed evaluation component so that the data is usable for the purposes discussed herein but the data center operator cannot recover the specific production data directly. This could be important for analysis entities that expend significant resources to obtain the production data, e.g., by performing intensive studies on various devices.

The above description provides some ways in which the disclosed concepts are employed, e.g., in data centers. However, the concepts discussed herein are applicable in environments other than data centers and are not necessarily tied to the hierarchical network topology shown herein. Rather, the disclosed implementations can be used in both data center and enterprise environments, Internet Service Providers, or other contexts where it is useful to understand the relationships between costs and service levels provided by various network devices. For example, even a purchase of a single network device intended for use in a non-redundant configuration could be informed by the cost/service level metrics disclosed herein. Note that the algorithmic details mentioned above can be modified to accommodate network topologies that are not hierarchical in nature or that are not organized in different levels.

Also, note that the disclosed implementations can be employed for purposes ranging from replacing network devices on an individual basis to planning entirely new networks before any devices are procured. In some implementations, the methods disclosed herein can be performed repeatedly over time as devices on a network are replaced incrementally. This has consequences for budgeting, because the network can be upgraded in installments. This also has consequences for network stability, because replacing a few devices at a time may minimize disruptions to the network and allow any device changes to stabilize before a subsequent round of devices are procured.

CONCLUSION

The order in which the disclosed methods are described is not intended to be construed as a limitation, and any number of the described blocks can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Although techniques, methods, devices, systems, etc., pertaining to characterizing service levels are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:
1. A method performed by one or more processing devices, the method comprising:
    determining a first number of first network devices of a first network device classification for deployment in a network stamp of an application;
    determining a second number of second network devices of a second network device classification for deployment in the network stamp of the application;
    determining an expected first service level provided by a first redundant configuration of the first number of first network devices, the expected first service level being determined using first production data reflecting availability or reliability of the first network devices when deployed redundantly;
    determining an expected second service level provided by a second redundant configuration of the second number of second network devices, the expected second service level being determined using second production data reflecting availability or reliability of the second network devices when deployed redundantly; and
    predicting expected application service levels of the application with the first redundant configuration and the second redundant configuration incorporated into the network stamp of the application, the predicting being based at least on the expected first service level and the expected second service level.
2. The method of claim 1, wherein the first network device classification is a first network device model and the second network device classification is a second network device model.

3. The method of claim 1, further comprising:
ranking the first network device classification relative to the second network device classification based at least on the expected application service levels.

4. The method of claim 1, further comprising:
determining a first total number of ports on the first network devices;
determining the first number of first network devices subject to a specified oversubscription ratio based at least on the first total number of ports;
determining a second total number of ports on the second network devices; and
determining the second number of second network devices subject to the specified oversubscription ratio based at least on the second total number of ports.

5. The method of claim 4, further comprising:
determining a first aggregate capacity for the first total number of ports based at least on a first per-port capacity of the ports on the first network devices;
determining a second aggregate capacity for the second total number of ports based at least on a second per-port capacity of the ports on the second network devices; and
outputting the first aggregate capacity, the second aggregate capacity, the first per-port capacity, and the second per-port capacity.

6. A system comprising:
one or more processing devices; and
one or more computer-readable storage devices comprising instructions which, when executed by the one or more processing devices, cause the one or more processing devices to:
obtain first production data reflecting failures of deployed first network devices of a first network device classification;
based at least on the first production data, determine a first expected service level of a first redundant configuration of a first number of the first network devices;
obtain second production data reflecting failures of deployed second network devices of a second network device classification;
based at least on the second production data, determine a second expected service level of a second redundant configuration of a second number of the second network devices; and
predict a first overall network service level provided by a tree of devices incorporating the first redundant configuration and a second overall network service level provided by the tree of devices incorporating the second redundant configuration.

7. The system of claim 6, the first production data comprising first failure events logged by the deployed first network devices and the second production data comprising second failure events logged by the deployed second network devices.

8. The system of claim 7, wherein the instructions, when executed by the one or more processing devices, cause the one or more processing devices to:
filter various first events logged by the deployed first network devices to obtain the first failure events, the various first events being filtered to remove other first events that did not actually impact carrying of network traffic by the deployed first network devices; and
filter various second events logged by the deployed second network devices to obtain the second failure events, the various second events being filtered to remove other second events that did not actually impact carrying of network traffic by the deployed second network devices.

9. The system of claim 7, wherein the instructions, when executed by the one or more processing devices, cause the one or more processing devices to:
filter various first events logged by the deployed first network devices to obtain the first failure events, the various first events being filtered to remove redundant first events that relate to failures identified by the first failure events; and
filter various second events logged by the deployed second network devices to obtain the second failure events, the various second events being filtered to remove redundant second events that relate to failures identified by the second failure events.

10. The system of claim 7, wherein the instructions, when executed by the one or more processing devices, cause the one or more processing devices to:
filter various first events logged by the deployed first network devices to obtain the first failure events, the various first events being filtered to remove first spurious failure events logged while the deployed first network devices are operational; and
filter various second events logged by the deployed second network devices to obtain the second failure events, the various second events being filtered to remove second spurious failure events logged while the deployed second network devices are operational.

11. The system of claim 6, the first redundant configuration and the second redundant configuration being active-active configurations.

12. The system of claim 11, the first redundant configuration comprising first access routers or aggregation switches of a first model, the second redundant configuration comprising second access routers or aggregation switches of a second model.

13. The system of claim 6, the first redundant configuration and the second redundant configuration being active-standby configurations.

14. The system of claim 13, the first redundant configuration comprising first access routers or aggregation switches of a first model, the second redundant configuration comprising second access routers or aggregation switches of a second model.

15. A method comprising:
monitoring deployed first network devices of a first network device classification to detect first failure events logged by the deployed first network devices;
based at least on the first failure events, predicting a first expected service level of a first redundant configuration of a first number of the first network devices;
monitoring deployed second network devices of a second network device classification to detect second failure events logged by the deployed second network devices;
based at least on the second failure events, predicting a second expected service level of a second redundant configuration of a second number of the second network devices;
predicting a first overall network service level provided by a tree of devices incorporating the first redundant configuration and carrying network traffic; and
predicting a second overall network service level provided by the tree of devices incorporating the second redundant configuration and carrying the network traffic.

16. The method of claim 15, further comprising:
determining a specified oversubscription ratio constraint; and
determining the first number and the second number subject to the specified oversubscription ratio constraint.

17. The method of claim 16, wherein the tree of devices carries the network traffic to servers, the first network devices and the second network devices are switches, and the specified oversubscription ratio constraint defines oversubscription of bandwidth capacity of the switches relative to the servers.

18. The method of claim 15, the tree comprising an application stamp carrying the network traffic for a particular application.

19. The method of claim 15, the first network devices and the second network devices being the same network device model with different firmware revisions.

20. The method of claim 15, further comprising:
using the first failure events to determine a first probability of co-occurring failures of the deployed first network devices and using the first probability to predict the first expected service level; and
using the second failure events to determine a second probability of co-occurring failures of the deployed second network devices and using the second probability to predict the second expected service level.

* * * * *